United States Patent
Jiang

(10) Patent No.: US 7,369,848 B2
(45) Date of Patent: May 6, 2008

(54) SIGNALING GATEWAY WITH MULTIPLE IMSI WITH MULTIPLE MSISDN(MIMM) SERVICE IN A SINGLE SIM FOR MULTIPLE ROAMING PARTNERS

(75) Inventor: Yue Jun Jiang, Danville, CA (US)

(73) Assignee: Roamware, Inc., San Jose, CA (US)

(*) Notice: Subject to any disclaimer, the term of this patent is extended or adjusted under 35 U.S.C. 154(b) by 0 days.

(21) Appl. No.: 11/440,206

(22) Filed: May 23, 2006

(65) Prior Publication Data

US 2006/0276226 A1 Dec. 7, 2006

(51) Int. Cl.
*H04Q 7/20* (2006.01)
(52) U.S. Cl. .............. 455/432.3; 455/432.1; 455/435.1; 455/435.2; 455/436; 455/411; 370/331
(58) Field of Classification Search ........... 455/432.3, 455/432.1, 435.1, 435.2, 436, 411; 370/331
See application file for complete search history.

(56) References Cited

U.S. PATENT DOCUMENTS

| | | | |
|---|---|---|---|
| 5,353,328 A | 10/1994 | Jokimies | |
| 5,586,166 A | 12/1996 | Turban | |
| 5,742,910 A | 4/1998 | Gallant et al. | |
| 5,818,824 A | 10/1998 | Lu et al. | |
| 5,854,982 A | 12/1998 | Chambers et al. | |
| 5,901,359 A | 5/1999 | Malmstrom | |
| 5,903,832 A | 5/1999 | Seppanen et al. | |
| 5,930,701 A | 7/1999 | Skog | |
| 5,940,490 A | 8/1999 | Foster et al. | |
| 5,943,620 A | 8/1999 | Boltz et al. | |
| 5,987,318 A | 11/1999 | Alperovich et al. | |
| 5,987,323 A | 11/1999 | Huotori | |
| 5,987,325 A | 11/1999 | Tayloe | |
| 6,014,561 A | 1/2000 | Mölne | |
| 6,052,604 A | 4/2000 | Bishop et al. | |
| 6,058,309 A | 5/2000 | Huang et al. | |
| 6,075,855 A | 6/2000 | Christiansen et al. | |
| 6,085,084 A | 7/2000 | Christmas | |

(Continued)

FOREIGN PATENT DOCUMENTS

CA 2281041 A1 2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner*—Nghi H. Ly
(74) *Attorney, Agent, or Firm*—Arent Fox LLP

(57) ABSTRACT

A method and apparatus for mobile communication in multiple mobile communications networks. Embodiments include installing a SIM that includes at least one IMSI and at least one MSISDN in a mobile communications device. The SIM is used to receive and place calls while the user is in the user's home network and while the user is roaming in another network. In various embodiments, one of a home MSISDN and a local MSISDN is used.

34 Claims, 64 Drawing Sheets

U.S. PATENT DOCUMENTS

| | | | |
|---|---|---|---|
| 6,138,005 A | 10/2000 | Park | |
| 6,138,009 A | 10/2000 | Birgerson | |
| 6,148,197 A | 11/2000 | Bridges et al. | |
| 6,163,701 A | 12/2000 | Saleh et al. | |
| 6,185,295 B1 | 2/2001 | Frederiksen et al. | |
| 6,185,436 B1 | 2/2001 | Vu | |
| 6,192,255 B1 | 2/2001 | Lewis et al. | |
| 6,195,532 B1 | 2/2001 | Bamburak et al. | |
| 6,208,864 B1 | 3/2001 | Agrawal et al. | |
| 6,356,756 B1 | 3/2002 | Koster | |
| 6,456,845 B1 | 9/2002 | Drum et al. | |
| 6,456,859 B1 | 9/2002 | Desblancs et al. | |
| 6,463,298 B1 | 10/2002 | Sorenson et al. | |
| 6,466,786 B1 * | 10/2002 | Wallenius | 455/433 |
| 6,505,050 B1 * | 1/2003 | Brudos et al. | 455/458 |
| 6,574,481 B1 | 6/2003 | Rathnasapathy et al. | |
| 6,603,761 B1 | 8/2003 | Wang et al. | |
| 6,603,968 B2 | 8/2003 | Anvekar et al. | |
| 6,611,516 B1 | 8/2003 | Pirkola et al. | |
| 6,628,934 B2 | 9/2003 | Rosenberg et al. | |
| 6,671,523 B1 | 12/2003 | Niepel et al. | |
| 6,684,073 B1 | 1/2004 | Joss et al. | |
| 6,693,586 B1 | 2/2004 | Walters et al. | |
| 6,738,622 B1 | 5/2004 | Stadelmann et al. | |
| 6,738,636 B2 | 5/2004 | Lielbridis | |
| 6,764,003 B1 | 7/2004 | Martshitsch et al. | |
| 6,782,264 B2 | 8/2004 | Anderson | |
| 6,795,444 B1 | 9/2004 | Vo et al. | |
| 6,856,818 B1 | 2/2005 | Ford | |
| 6,876,860 B1 | 4/2005 | Berg et al. | |
| 6,920,487 B2 | 7/2005 | Sofer et al. | |
| 6,925,299 B1 | 8/2005 | Sofer et al. | |
| 6,961,559 B1 | 11/2005 | Chow et al. | |
| 6,963,543 B2 | 11/2005 | Diep et al. | |
| 6,968,383 B1 * | 11/2005 | Heutschi et al. | 709/228 |
| 6,975,852 B1 | 12/2005 | Sofer et al. | |
| 6,978,156 B1 * | 12/2005 | Papadopoulos et al. | 455/558 |
| 7,020,479 B2 | 3/2006 | Martschitsch | |
| 7,139,570 B2 | 11/2006 | Elkarat et al. | |
| 7,184,764 B2 | 2/2007 | Raviv et al. | |
| 7,231,431 B2 | 6/2007 | Sofer et al. | |
| 2002/0009199 A1 * | 1/2002 | Ala-Laurila et al. | 380/247 |
| 2002/0012351 A1 | 1/2002 | Sofer et al. | |
| 2002/0037708 A1 | 3/2002 | McCann et al. | |
| 2002/0087631 A1 | 7/2002 | Sharma | |
| 2002/0101858 A1 | 8/2002 | Stuart et al. | |
| 2002/0101859 A1 | 8/2002 | Maclean | |
| 2002/0160763 A1 | 10/2002 | Mittal et al. | |
| 2002/0187701 A1 | 12/2002 | Souissi | |
| 2002/0191575 A1 | 12/2002 | Kalavade et al. | |
| 2002/0196775 A1 | 12/2002 | Huotori | |
| 2003/0017843 A1 | 1/2003 | Noblins | |
| 2003/0050047 A1 | 3/2003 | Ala/Luukko | |
| 2003/0051041 A1 | 3/2003 | Kalavade et al. | |
| 2003/0064723 A1 | 4/2003 | Thakker | |
| 2003/0069922 A1 | 4/2003 | Arunachalam | |
| 2003/0129991 A1 | 7/2003 | Allison et al. | |
| 2003/0133421 A1 | 7/2003 | Sundar et al. | |
| 2003/0139180 A1 | 7/2003 | McIntosh et al. | |
| 2003/0208560 A1 | 11/2003 | Inoue | |
| 2003/0224795 A1 | 12/2003 | Wilhoite et al. | |
| 2003/0229791 A1 | 12/2003 | De Jong | |
| 2004/0053610 A1 | 3/2004 | Kim | |
| 2004/0087305 A1 | 5/2004 | Jiang | |
| 2004/0120552 A1 | 6/2004 | Borngraber et al. | |
| 2004/0131023 A1 | 7/2004 | Auterinen | |
| 2004/0132449 A1 | 7/2004 | Kowarch | |
| 2004/0196858 A1 | 10/2004 | Tsai et al. | |
| 2004/0229601 A1 | 11/2004 | Zabawskyj et al. | |
| 2004/0236836 A1 | 11/2004 | Appleman | |
| 2005/0021834 A1 | 1/2005 | Coulombe | |
| 2005/0047378 A1 | 3/2005 | Wuschke et al. | |
| 2005/0064883 A1 | 3/2005 | Heck et al. | |
| 2005/0186939 A1 | 8/2005 | Barnea et al. | |
| 2005/0186979 A1 | 8/2005 | McCann et al. | |
| 2005/0215250 A1 | 9/2005 | Chava et al. | |
| 2005/0232282 A1 | 10/2005 | Silver et al. | |
| 2005/0250493 A1 | 11/2005 | Elkarat et al. | |
| 2006/0003775 A1 | 1/2006 | Bull et al. | |
| 2006/0009204 A1 | 1/2006 | Ophir | |
| 2006/0025129 A1 | 2/2006 | Wolfman et al. | |
| 2006/0052113 A1 | 3/2006 | Ophir et al. | |
| 2006/0068778 A1 | 3/2006 | Della-Torre | |
| 2006/0068786 A1 | 3/2006 | Florence | |
| 2006/0079225 A1 | 4/2006 | Wolfman et al. | |
| 2006/0079236 A1 | 4/2006 | Del Pino et al. | |
| 2006/0148459 A1 | 7/2006 | Wolfman et al. | |
| 2006/0205404 A1 | 9/2006 | Gonen et al. | |
| 2006/0211420 A1 | 9/2006 | Ophir et al. | |
| 2007/0021118 A1 | 1/2007 | Ophir et al. | |
| 2007/0049269 A1 | 3/2007 | Ophir et al. | |
| 2007/0054665 A1 | 3/2007 | Elkarat et al. | |
| 2007/0072587 A1 | 3/2007 | Della-Torre et al. | |
| 2007/0178885 A1 | 8/2007 | Lev et al. | |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/018156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).

Brunen, M. "Roaming im Zugangsnetz Mit OWLAN uberall zu Hause sein,"Net-Zeitschrift Fuer Kommunikationsmangement, Huthig Verlag, Heilderberg, 2002, pp. 39-42 (XP-001122438).

Ostrowski, F., "Roaming und Handover zwischen UMTS und Funk-LA," NTZ (Nachrichtentechnische zeitschrift), 2002, pp. 24-26 (XP-001132263).

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.

GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).

Q 730 (1999), ISDN User Part supplementary services.

Q 711 (1996), Functional description of signaling connection control part.

Q 712 (1996), Definition and function of signaling connection control part messages.

Q713 (1996), Signaling connection control part formats and codes.

Universal Mobile Telecommunications System (UMTS); Multimedia Messaging Service (MMS), Functional description; Stage 2 (3GPP TS 23.140 version 4.2.0 Release 4).

GSM 23122 network selection 3GPP TS 23.122 V3.9.0 (Dec. 2002) Technical Specification; 3rd Generation Partnership Project; Technical Specification Group Core Network; NAS Functions related to Mobile Station (MS) in idle mode (release 1999).

ITU-T Recommendation Q. 769.1 (1999), Signaling system No. 7—ISDN user part enhancements for the support of Number Portability.

* cited by examiner

Persistent and transient data

Transactional mappings at the Signal Gateway

GT and SPC in one possible linkset configuration

ISUPLoopbackcircuits and Signaling

IN architecture and Signaling

Connect time failover using multiple address in tnsnames.ora

```
Failover to a different port                  Failover to a different machine
prod1=                                        prod1=
    (DESCRIPTION =                                (DESCRIPTION =
        (ADDRESS_LIST=                                (ADDRESS_LIST=
            (ADDRESS =                                    (ADDRESS =
                (PROTOCOL = tcp)                              (PROTOCOL = tcp)
                (Host = mach1)                                (Host = mach1)
                (Port = 1523)                                 (Port = 1521)
            )                                             )
            (ADDRESS =                                    (ADDRESS =
                (PROTOCOL = tcp)                              (PROTOCOL = tcp)
                (Host = mach1)                                (Host = mach2)
                (Port = 1521)                                 (Port = 1521)
            )                                             )
        )                                             )
        (CONNECT_DATA =                               (CONNECT_DATA =
            (SID = prod1)                                 (SID = prod1)
        )                                             )
    )                                             )
```

FIG.14

Using Connect Time Failover with TAF

```
prod1=
  (DESCRIPTION=
    (LOAD_BALANCE=on)
    (FAILOVER=on)
    (ADDRESS=
      (PROTOCOL=tcp)
      (HOST=mach1)
      (PORT=1521)
    (ADDRESS=
      (PROTOCOL=tcp)
      (HOST=mach2)
      (PORT=1521) )
    (CONNECT_DATA =
    (SID=prod1)
      (FAILOVER_MODE=
        (TYPE=select)
        (METHOD=basic) ) ) )
```

Where
(FAILOVER_MODE=
  (BACKUP=xxx)
  (TYPE=xxx)
  (METHOD=xxx)
  (RETRIES=xxx)
  (DELAY=xxx)
) is defined as follows:

BACKUP - specifies connection alias to use for backup connection. Used for pre-established backup connections.
TYPE - can be SESSION, SELECT, or NONE. SESSION causes a failed session to reconnect. SELECT causes a failed session to reconnect and attempt to rerun the statement in process at time of failure. This has significant additional overhead to track statements being issued. NONE explicitly disables TAF.
METHOD - can be BASIC or PRECONNECT - specifies how failover occurs. If set to pre-connect, an unused connection to the backup server is established at the same time the primary connection is established.
RETRIES - specifies the number of attempts to reconnect. Defaults to five is DELAY is set.
DELAY - specifies the number of seconds to wait between connection attempts. Defaults to 1 second if RETRIES is set.

FIG.15

Pre-establishing Backup Connections prod1=
  (DESCRIPTION =
    (ADDRESS =
      (PROTOCOL = TCP)
      (Host = mach1) (Port = 1521) )
    (CONNECT_DATA =
      (SID = prod1)
      (FAILOVER_MODE=
        (BACKUP=backup_alias)
        (METHOD=preconnect)
        (TYPE=select) (METHOD=basic) ) ) )
backup_alias=
  (DESCRIPTION =
    (ADDRESS =
       (PROTOCOL = TCP) (Host = mach2)
      (Port = 1521) )
      (CONNECT_DATA =(SID = prod1) ) )

FIG.16

ISUP loopback circuits and Signaling

Update Location Transaction Flow
When SG1 failed after insertSubData

Update Location Transaction Flow without failure

SRI to MSISDN-F Flow without failure when subscriber is in HPMN

SRI to MSISDN-F Flow when SG1 fails after SRI-ACK from HLR-H when subscriber is in HPMN Send Routing Information Transaction Flow without failure
When subscriber is in FPMN SMS to MSISDN-H Flow with failure SMS to MSISDN-F Flow without failure
when subscriber is in FPMN

SIGNALING GATEWAY WITH MULTIPLE IMSI WITH MULTIPLE MSISDN(MIMM) SERVICE IN A SINGLE SIM FOR MULTIPLE ROAMING PARTNERS

RELATED APPLICATIONS

This application claims the benefit of U.S. Provisional Patent application Ser. No. 60/495,202, filed Aug. 13, 2003, which is hereby incorporated by reference in its entirety.

TECHNICAL FIELD

The disclosed embodiments relate to mobile communications networks and devices, and more particularly to providing services for roaming mobile communications device users.

BACKGROUND OF THE DISCLOSURE

Mobile communications device users are increasing dependent on the ability to use their mobile communications devices all over the world. Mobile users who travel out of their "home network" are called roamers. There are many different mobile communications network operators throughout the world, each having its own territories, technical systems, and business systems. Currently, roamers are typically not able to travel freely and have a seamless experience in any operator's network. There are currently disadvantages for both the roaming user and the network operator.

For example, roamers who roam frequently between two countries often have a need for a local phone number in each network; either to enable local users to call them at a cheap rate without worrying about international direct dial (IDD) calls, or to present a multi-national appearance. Such roamers typically buy a local pre-paid subscription from the local network operator and use the local phone number to make outgoing calls. However, if the roamer has a single phone and has swapped out the HPMN SIM card, the roamer will not be able to receive HPMN calls and SMS messages. Also, when the roamer is back in his HPMN, he may not be able to receive calls on their FPMN number. Such roamers must also change the SIM in their mobile handset each time they roam in the local network, which is not convenient. The home network operator is also disadvantaged because the home network operator is not receiving the roaming revenue. It is thus desirable to facilitate roaming, even international roaming with minimum effort on the part of the roaming user, such as eliminating the requirement for different SIMs.

Mobile communications network operators face tremendous challenges in growing their revenue streams in the face of increasing competition and pricing pressures. Roamers are an attractive source of revenue for operators sometimes constituting as much as 8% to 40% of an operator's total revenue. It is thus desirable to be able to influence or control the roamer's network choices in order to maximize the benefits to the operator and to the subscriber user.

BRIEF DESCRIPTION OF THE DRAWINGS

Embodiments of the invention are described with the aid of the drawings, which are not intended to be limiting. In the drawings, similar reference numbers identify similar elements or acts.

FIG. 14 is an illustration of connect time failover using multiple addresses in a TNSNAMES.ORA configuration according to an embodiment.

FIG. 15 is an illustration of load balancing and active/active fail-over according to an embodiment.

FIG. 16 is an illustration of each Signaling Gateway opening a DB connection with the primary DB server which replicates data to the standby DB server according to an embodiment.

ACRONYMS

Figure 1:
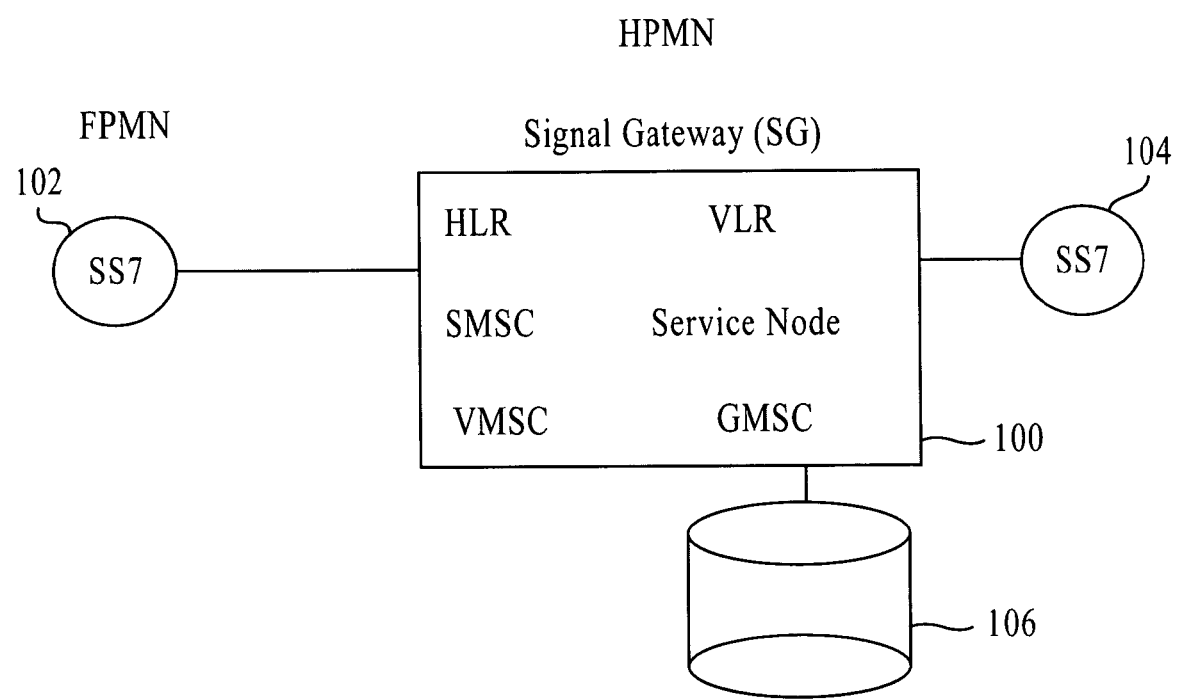
FIG. 1 is a block diagram illustrating an embodiment of a Signaling Gateway.

Following are a list of acronyms used herein.
APMN: Associated Public Mobile Network for SMS Interworking;
AuC: Authentication Center;
BCSM: Basic Call State Model;
CALEA: Communications Assistance for Law Enforcement Act;
CAMEL: Customized Applications for Mobile network Enhanced Logic;
CAP: CAMEL Application Part;
CDMA: Code Division Multiple Access;
CdPA: Called Party Address;
CDR: Call Detail Record;
CFB: Call Forwarding in Busy;
CFNRc: Call Forwarding on Not Reachable;
CFNRy: Call Forwarding on No Reply;
CFU: Call Forwarding Unconditional;
CgPA: Calling Party Address;
CSD: Circuit Switch Data;
CSI: CAMEL Subscription Information;

DB: Database;
D-CSI: Dialled Services CAMEL Subscription Information;
DDF: Digital Distribution Frame;
DP: Detection Point;
DPC: Destination Point Code;
DTN: Deflected To Number;
E1: Wide Area Digital Transmission Scheme used predominantly in Europe;
ECF: Event Charging Function;
EDP: Event Detection Point;
FPMN: Foreign Public Mobile Network who intends to partner with HPMN for Multiple MSISDN Service;
FTN: Forwarded-To-Number typically used in Call Forwarding;
FTP: File Transfer Profile or File Transfer Protocol;
FSMS: Fixed Line SMS;
Ga: Charging data collection interface between a CDR transmitting unit and a CDR receiving functionality;
Gb: Interface between an SGSN and a BSS;
Gc: Interface between a GGSN and an HLR;
Gd: Interface between an SMS-GMSC and an SGSN, and between an SMS-IWMSC and an SGSN;
Gf: Interface between an SGSN and an EIR;
GGSN: Gateway GPRS Service Node;
Gi: Reference point between GPRS and a packet data network;
GMLC: Gateway MLC;
GMSC: Gateway MSC;
GMSC-H: GMSC in HPMN;
GMSC-F: GMSC in FPMN;
GMSC-V: GMSC in VPMN;
Gn: Interface between two GSNs within the same PLMN;
Gp: Interface between two GSNs in different PLMNs;
GPRS: General Packet Radio Service;
GPRS-CSI: GPRS CAMEL Subscription Information;
gprsSSF: GPRS Service Switching Function;
Gr: Interface between an SGSN and an HLR;
GRX: GPRS Roaming Exchange;
Gs: Interface between an SGSN and an MSC/VLR;
GSM: Global System for Mobile Communications;
gsmSCF: GSM Service Control Function;
gsmSRF: GSM Specialised Resource Function;
gsmSSF: GSM Service Switching Function;
GT: Global Title (SS7 parlance);
GTT: Global Title Translation;
HLR: Home Location Register;
HPLMN: Home PLMN;
HPMN: Home Public Mobile Network who intends to provide MSISDN Service;
HSCSD: High Speed Circuit Switched Data;
ID: Identification;
IDD: International Direct Dial;
IDP: Initial DP;
IE: Information Element;
IF: Information Flow;
IMSI: International Mobile Subscriber Identity (of HPMN);
IMSI-H: HPMN IMSI;
IMSI-F: FPMN IMSI;
IN: Intelligent Network;
INAP: Intelligent Network Application Part;
IOSMS: Inter Operator SMS within HPMN;
IP: Intelligent Peripheral;
IPLMN: Interrogating PLMN;
IREG: International Roaming Expert Group;
ISC: IP Multimedia Subsystem Service Control Interface;
ISDN: Integrated Service Digital Network;
ISUP: ISDN User Part message from SS7 stack;
Iu: Interface between the RNS and the core network;
IVR: Interactive Voice Response;
kbit/s: Kilobits per second;
Ki: Authentication Key;
Kc: Ciphering Key;
LAN: Local Area Network;
LCF: Late Call Forwarding;
LCS: Location Services;
LMU: Location Measurement Unit;
LSA: Localised Service Area;
MAP: Message Application Part (from GSM 09.02 GSM Standards);
Mbit/s: Megabits per second (Mbit/s);
M-CSI: Mobility Management event Notification CAMEL Subscription Information;
MF: Mobile Forwarding;
MGT: Mobile Global Title (derived from IMSI);
MIMM: Multiple IMSI Multiple MSISDN Service;
MISM: Multiple IMSI Single MSISDN Service;
MLC: Mobile Location Center;
MMS: Multimedia Messaging Service;
MMSC: Multimedia Messaging Service Centre;
MO: Mobile Originating;
MSC: Mobile Switching Center;
MSISDN: Mobile Subscriber ISDN Number (phone number);
MSISDN-H: MSISDN of the Multiple MSISDN Service allocated by HPMN in HPMN numbering plan;
MSISDN-F: MSISDN of the Multiple MSISDN Service subscriber in the FPMN (Co-operating VPMN) numbering plan;
MSRN: Mobile Station Roaming Number;
MT: Mobile Terminated;
MTP: Message Transfer Part;
NA: North American;
N-CSI: Network CAMEL Service Information;
NNI: Network Node Interface;
OAM&P: Operations, Administration, Maintenance, and Provisioning;
O-BCSM: Originating Basic Call State Model;
OCN: Originally Called Number (same as ODN);
O-CSI: Originating CAMEL Subscription Information;
ODB: Operator Determined Barring;
ODN: Originally Dialed Number (same as OCN);
OM: Outreach Messaging;
OMAP: Operations, Maintenance, and Administration Part (SS7);
OR: Optimized Routing;
OSS: Operator Specific Service;
OTA: Over-the-Air;
PCI: Peripheral Component Interconnect;
PDA: Personal Digital Assistant;
PDP: Packet Data Protocol;
PIC: Point In Call;
PLMN: Public Land Mobile Network;
PMN: Public Mobile Network;
PRN: Provide Roaming Number MAP message;
PSL: Provider Subscriber Location;
R: Reference point between a non-ISDN compatible TE and MT;
RAID: Redundant Arrays of Inexpensive Disks;
SCP: Service Control Point;
SCCP: Signal Control Connection Part;
SG: Signal Gateway;
SGRF: Signal Gateway Relay Framework;
SGSN: Serving GPRS Service Node;
SIM: Subscriber Identity Module;

SIMM: Single IMSI Multiple MSISDN Service;
SLPI: Service Logic Program Instance;
SLR: Subscriber Location Report;
SM: Session Management;
SME: Short Message Entity;
SMF: Service Management Function;
SMLC: Serving MLC;
SMP: Service Management Point;
SMPP: Short Message Peer to Peer;
SMS: Short Message Service;
SMSC: Short Message Service Center;
SMSC-A: SMSC in APMN;
SMSC-F: SMSC in FPMN;
SMSC-H: SMSC in HPMN;
SMS-CSI: Short Message Service CAMEL Subscription Information;
SMTP: Simple Mail Transfer Protocol;
SNMP: Simple Network Management Protocol;
SPC: Signalling Point Code;
SRI: Send Routing Information MAP message;
SS: Supplementary Service;
SS7: Signaling System 7;
SS-CSI: Supplementary Service Notification CAMEL Subscription Information;
STK: Synthesis Toolkit in C++;
STP: Signaling Transfer Point;
T1: Wide Area Digital Transmission Scheme used predominantly in the United States;
TAF: Transparent Application Fail-over;
TAP: Transfer Accounting Procedure;
TADIG: Transfer Accounting Data Interchange Group;
T-BCSM: Terminating Basic Call State Model;
TCAP: Transaction Capability Part;
TCP/IP: Transmission Control Protocol/Internet Protocol;
T-CSI: Terminating CAMEL Subscription Information (in the GMSC);
TDMA: Time Division Multiple Access;
TDP: Trigger Detection Point;
TIF-CSI: Translation Information Flag;
TPDU: Transfer Protocol Data Unit;
TT: Translation Type (SS7 parlance);
U-CSI: USSD CAMEL Subscription Information;
UG-CSI: USSD General CAMEL Service Information;
Um: Interface between the mobile station (MS) and the A/Gb mode network;
UNI: User Network Interface;
USSD: Unstructured Supplementary Service Data;
Uu: Interface between the mobile station (MS) and the Iu mode network;
VHE: Virtual Home Environment;
VLR: Visited Location Register;
VLR-H: Serving VLR in HPMN;
VLR-F: Serving VLR in FPMN;
VLR-V: Serving VLR in VPMN (VPMN is not HPMN/FPMN);
VPLMN: Visited PLMN;
VPMN: Visited Public Mobile Network (other than HPMN or FPMN);
VMSC: Visited Mobile Switching Center;
VMSC-H: Serving VMSC in HPMN;
VMSC-F: Serving VMSC in FPMN;
VMSC-V: Serving VMSC in VPMN (VPMN is not HPMN/FPMN);
VT: Mobile Terminating in VMSC;
VT-CSI: VMSC Terminating CAMEL Subscription Information;
WAN: Wide Area Network;
WAP: Wireless Application Protocol; and
WiFi: Wireless Fidelity.

DETAILED DESCRIPTION

Embodiment of the invention include an improved Signaling Gateway method and apparatus for mobile communication across multiple mobile networks operated by different operators. In one embodiment, the Signaling Gateway method and apparatus include a service targeted toward users, or roamers, who roam frequently between two countries and have a need for a local phone number in each network. A roamer may need a local phone number in each network to enable local users to call them at a cheap rate without worrying about international IDD calls, or to present a multi-national appearance. The particular embodiments described focus on a Multiple IMSI Multiple MSISDN (MIMM) service in a single SIM for multiple roaming partners. The description is simplified to focus only on roaming involving multiple international roaming partners, but is not intended to be limiting. A MIMM service for multiple roaming partners as described herein extends roaming coverage by pooling the roaming relationships of partner networks. This can be limited to national roaming only, or can be applied on a per-country-per-network basis. The MIMM service for multiple roaming partners also provides a local phone number and a local IMSI at the partner network. This option can be easily enabled or disabled based on operator requirements.

Embodiments of the method described may be offered as a service, or services, in collaboration with a participating operator in a foreign country (referred to as FPMN). The HPMN should have bilateral roaming agreements with this operator for Voice and SMS services.

The Multiple IMSI Multiple MSISDN (MIMM) service allows users, or subscribers, to receive calls on both numbers (HPMN and FPMN) without swapping the SIM card. Subscribers can also receive SMS messages addressed to either of these numbers.

Another target market for this service is subscribers who desire extended roaming coverage, whether national or international. When the HPMN IMSI does not have coverage or a roaming relationship with another operator, FPMN IMSI could be used instead. As far as the other operator is concerned, the roamer is coming from the FPMN rather than the HPMN.

Users do not have to do anything in order to use embodiments of the MIMM service other than obtaining a new SIM card. Users can retain their HPMN number, but will receive a new FPMN number. It is possible for a HPMN to enter into agreements with multiple FPMNs in various countries and offer a "set of numbers" on a set of IMSI-Fs. There are no additional changes for the subscribers after they initially change the SIM (if OTA is used and the STK application supports dynamic IMSI replacement). Hence, subscribers can choose to later add local MSISDN numbers and IMSIs for countries that they visit most frequently.

In a country where Mobile Number Portability is supported, it is possible for the operator to acquire subscribers from other operators and offer them this service. It is also possible for subscribers to port-out the existing HPMN and FPMN numbers.

The MIMM solution does not impact the subscriber's GPRS, USSD and SMS services. In most cases, the user appears to these services as a normal user.

The charges for using MIMM related or enabled services can be combined with regular charges or shown as separate charge. The particular presentation option is left to the operator.

In one embodiment, two network operators, one in the home network and one in the network of the visited country, come together and offer a local MSISDN in the visited country on a single SIM card. At least two approaches are possible. Two approaches will be described, as follows:
   a) The two operators co-operate and build a Dual IMSI SIM card and use the IMSI of the country the user is currently in. This approach can include multiple IMSIs with multiple MSISDNs, or multiple IMSIs with a single MSISDN-H; and
   b) The two operators co-operate and map the HPMN MSISDN on the network side to a local MSISDN in the partner foreign network.

Embodiments of the invention include a common Signal Gateway Relay Framework that supports the Multiple IMSI Multiple MSISDN (MIMM) service. The common Signal Gateway Relay Framework is also referred to herein as a Signal Gateway, or a Signaling Gateway (SG). The Signaling Gateway is applicable across GSM and CDMA technologies. Illustrative examples shown in this document involve GSM technology.

Embodiments of the Signaling Gateway described herein have the capability to impersonate various GSM network entities in order to provide Value-Added-Services. One embodiment includes a Signaling Gateway platform that is a pure SS7-based solution. The Signaling Gateway functions as virtual HLR, virtual VLR, virtual GMSC, virtual VMSC, virtual SMSC and virtual service node depending on interactions with various SS7 network elements. The Signaling Gateway is virtual in the sense that it does not store subscription data as in a HLR; it does not have switching support as in a GMSC; and it does not have trigger mechanisms. Nevertheless, the Signaling Gateway can store subscription information about the Signaling Gateway MIMM service and roaming information of MIMM subscribers at an FPMN.

The Signaling Gateway supports both the "a)" approach described above, and the "b)" approach described above. In both cases, the Signaling Gateway functions as a virtual HLR for the users, or subscribers. In the case of a), the Signaling Gateway serves as host for the FPMN IMSI and MSISDN allocated to the HPMN and uses HPMN AuC for authenticating subscribers. In this way, the Multi-IMSI SIM needs only the HPMN Ki and algorithms, eliminating the logistical complexity of security management. The a) solution also makes it easier to bill a user as a local subscriber at an FPMN, since there is a local IMSI involved. Some complexities may be introduced to GPRS and Camel services as a result.

For USSD, messages on a home service code for IMSI-F will not be routed to HLR-F but to the Signaling Gateway, which acts as the HLR of IMSI-F. The Signaling Gateway can then relay a modified message to the real HLR-H. For Camel, on IMSI-F registration at XPMN (FPMN or VPMN), the trigger's GSMSC-F address is dynamically modified to a FPMN address which is then relayed through the Signaling Gateway. "XPMN" is used herein to denote any VPMN other than the HPMN. The SCCP signaling part of Camel and GPRS on IMSI-F at XPMN can be handled via the Signaling Gateway; however for GPRS data sessions, this could introduce complexities in the contexts set-ups APN and PDP. The Signaling Gateway also relays the data session through to the HPMN. SCCP (Signaling Connection and Control Part) is an SS7 protocol that provides additional functions to the Message Transfer Part (MTP)).

In the rare event of failure of the Signaling Gateway, a subscriber under approach a) will not be able to register at the FPMN as a local subscriber. More intelligent SIM applications can register the subscriber as a roamer at the FPMN.

To avoid confusion in billing at a third party operator, both the Signaling Gateway and the SIM application have the option to disable and reject the FPMN IMSI at the VPMN. However, sometimes the FPMN IMSI provides an extended roaming relationship in the third party operator. In this case, if an automatic solution is used in the SIM, the SIM application is switched back to the FPMN IMSI when the HPMN IMSI cannot register with the visiting network. The automatic switch of IMSI may cause some confusion to the user, since the SIM application will not be able to distinguish whether it loses coverage in the FPMN or needs to swap in another home IMSI for registration, unless there is a registration of a network.

There may a possibility of confusion if the user's home IMSI in the user's SIM has the value of the FPMN IMSI, and the subscriber briefly registers as a roamer at a home network. HPMN home operators can be rejected. It is possible, however, to control which home IMSI is used through a STK application on the HPMN network side.

Furthermore in the case of a), the service includes a new type of SIM with an STK application on it. When multiple IMSIs are introduced or extended, the HPMN updates the local IMSI list in the SIM (either via OTA or with a new SIM). In addition, at each location change, the STK application checks to determine whether it is in a network that requires another home IMSI. The STK application also supports manual selection of a network IMSI.

In the case of b), the Signaling Gateway only hosts the FPMN MSISDN allocated to the HPMN. The subscriber always registers with the HPMN IMSI. This simplifies the user experience, as the user need not be concerned as a roamer or a local subscriber when registered with the FPMN network. An intelligent SIM application is not required to automatically detect the FPMN network, which reduces power consumption and associated costs. It is simple for subscribers using the MIMM service to use home services despite having a local phone number. This makes it easier to transparently support GPRS and USSD services in the case of b). The HPMN should gain more roaming revenue under approach b). However, because the subscriber's IMSI is still a HPMN IMSI, a slightly more complex billing solution may be required than under than under approach a) if the FPMN and the HPMN want to make subscribers' calls on par with local calls when subscribers roam in the FPMN.

Both approaches a) and b) are attractive depending on an operator's specific requirements. Solution b) also allows the home operator to offer a service with which the frequent roamer can get MSISDN in more than one country without the need for a new SIM or OTA process to change the SIM values. The roamer is always a HPMN subscriber, which implies that calls (including international calls and roaming calls) made by the subscriber will contribute revenue towards the home operator no matter where the subscriber is. Solution b) has a relatively simple user interface and does not require a change of SIM when a new partner network is added. Solution a) however, can simplify billing (since the FPMN IMSI is used in FPMN network), and extend roaming coverage including international and national roaming, since the roaming relationships are pooled together by the multiple IMSIs or networks.

Architecture: Physical Location of the Signaling Gateway

In the following description, numerous specific details are introduced to provide a thorough understanding of, and enabling description for, embodiments of a Signaling Gateway method and apparatus with a MIMM service. One skilled in the relevant art, however, will recognize that the Signaling Gateway method and apparatus can be practiced without one or more of the specific details, or with other components, systems, etc. In other instances, well-known structures or operations are not shown, or are not described in detail, to avoid obscuring aspects of the Signaling Gateway method and apparatus.

Embodiments of the method and apparatus include a Signaling Gateway, or Signaling Gateway function. In one embodiment, the Signaling Gateway function is a combination of a SCCP node and a Service Node. Referring to FIG. 1, an embodiment of a Signaling Gateway 100 is shown. Although the physical location of the Signaling Gateway 100 can be at the HPMN or FPMN based on operator requirements, the Signaling Gateway 100 is shown at the HPMN.

The Signaling Gateway 100 includes an HLR, a VLR, an SMSC, a Service Node, and a GMSC. The Signaling Gateway 100 has access to a database 106 which stores information including information, including MSISDN-H. MSISDN-F, out-roamer information, and GT mapping per FPMN. The Signaling Gateway 100 also communicates with multiple SS7 nodes such as SS7 nodes 102 and 104.

Whichever entity, or network operator partner, is hosting the Signaling Gateway 100 carries most of the logistic loads. For those partners that do not host the Signaling Gateway 100, routing configurations are used to send ISUP calls (possibly over dedicated leased lines) to the HPMN network and to direct MAP and TCAP (e.g. INAP) signaling to the Signaling Gateway 100 across countries.

In various circumstances, it may be desirable for the FPMN to host a Signaling Gateway 100. The Signaling Gateway 100 is involved when the IMSI-F is used to register a network, or when the MSISDN-F is queried. Hosting the Signaling Gateway 100 at the FPMN seems a natural choice because the Signaling Gateway 100 emulates a FPMN network element when the IMSI-F is used to register a network. In this situation, an explicit agreement of the FPMN facilitates checking of billing records by the HPMN or the FPMN.

The objectives of the MIMM service can affect the location of the Signaling Gateway 100. For example, if an important objective is to increase roaming coverage (national or international) by leveraging partner networks, then the Signaling Gateway 100 is better located in the partner network that has the largest roaming relationships. However, if an important objective is to provide local phone number services that involve minimal logistics of partner networks, the HPMN should be the entity hosting the Signaling Gateway 100, since HPMN is the entity that offers the MIMM service to its own subscribers.

In a group environment, MIMM services can be offered centrally at a headquarters. For example, to offer MIMM services for Singtel™ group, Singtel™ can host the Signaling Gateway 100, although its partners have their own administration interface for their own MIMM subscribers.

For the example embodiments described herein, it is assumed that the Signaling Gateway 100 is hosted at the HPMN unless otherwise indicated. The basic signaling of the architecture is similar irrespective of the location of the Signaling Gateway 100. The responsibility for logistics, however, shifts more towards the hosting PMN when hosting is done by the HPMN. Wherever appropriate in the course of describing various technical details, a preferred location for the Signal Gateway 100 is indicated.

Architecture: Basic Network Architecture

Figure 2:
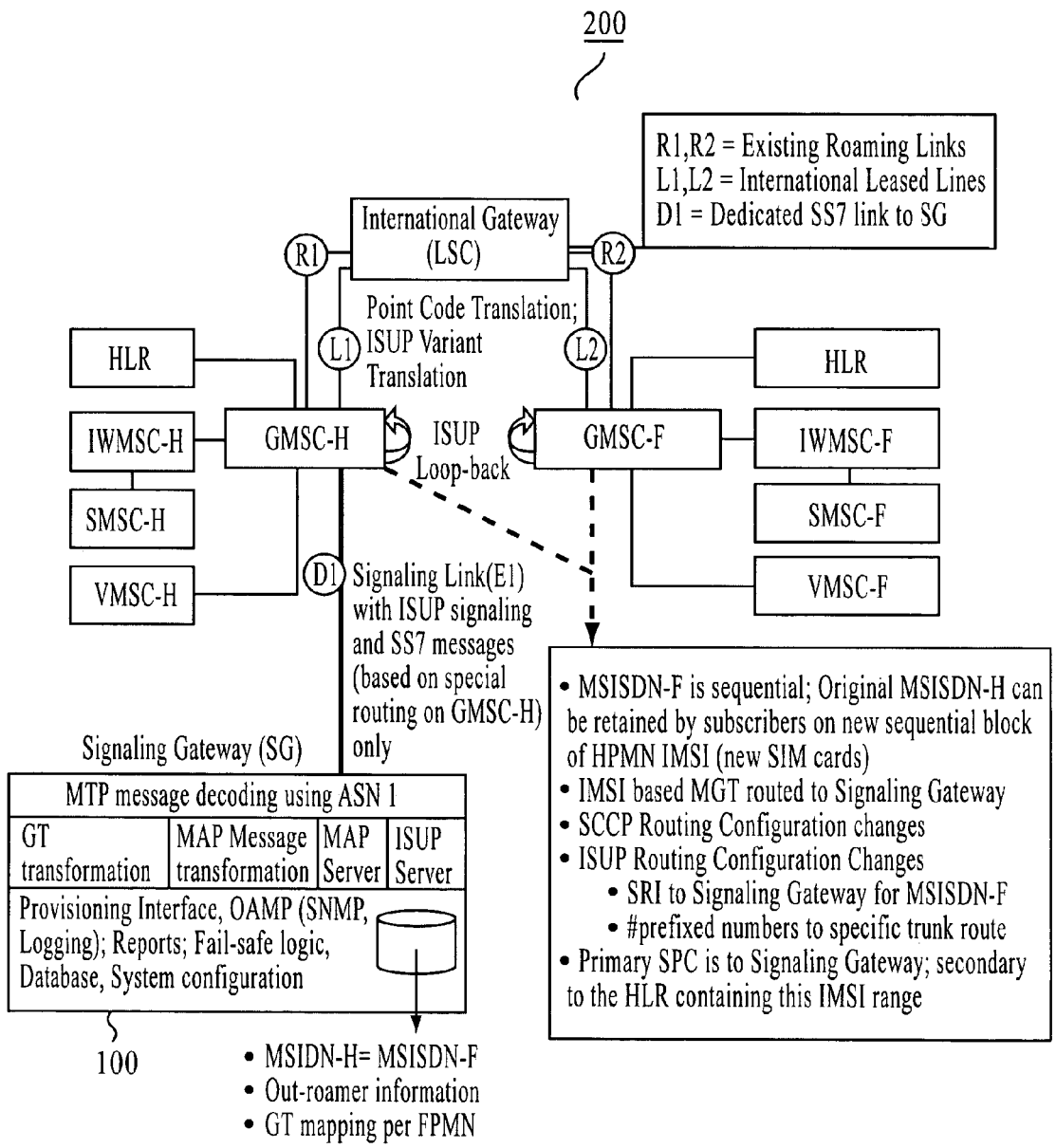
FIG. 2 is a block diagram illustrating an embodiment of a Signaling Gateway for supporting a MIMM service, including a connection to GMSC-H for signaling with Voice loop-back at the GMSC-H.

An embodiment of a network architecture 200 for supporting a MIMM service, including a Signaling Gateway 100, is shown in FIG. 2. As shown in FIG. 2, a Signaling Gateway 100 connects to GMSC-H for Signaling with Voice loop-back at the GMSC-H. The GMSC-H is also connected to the FPMN through a leased line that is provided by an ISC. This leased line is used to carry SS7 signaling as well as voice traffic for Multiple MSISDN subscribers. The Signaling Gateway is also responsible for generating Call Detail Records (CDRS) that are used to enable special billing of calls and SMS messages for the Multiple MSISDN subscribers.

Due to the possible SS7 version differences on the leased line, the HPMN might need to arrange with a vendor and/or an ISC to provide a SS7 converter. The leased line is used to route calls, and their associated ISUP signaling, that involve a call path between FPMN and HPMN. The leased line also provides the signaling path for SCCP routing on any MSISDN-F Global Title (GT).

The Signaling Gateway function is present only in the HPMN, and need not be installed at FPMN or any other VPMN. Hence, the Signaling Gateway imposes minimum operations load on the FPMN.

Architecture: Signaling Gateway Internal Architecture

Figure 3:
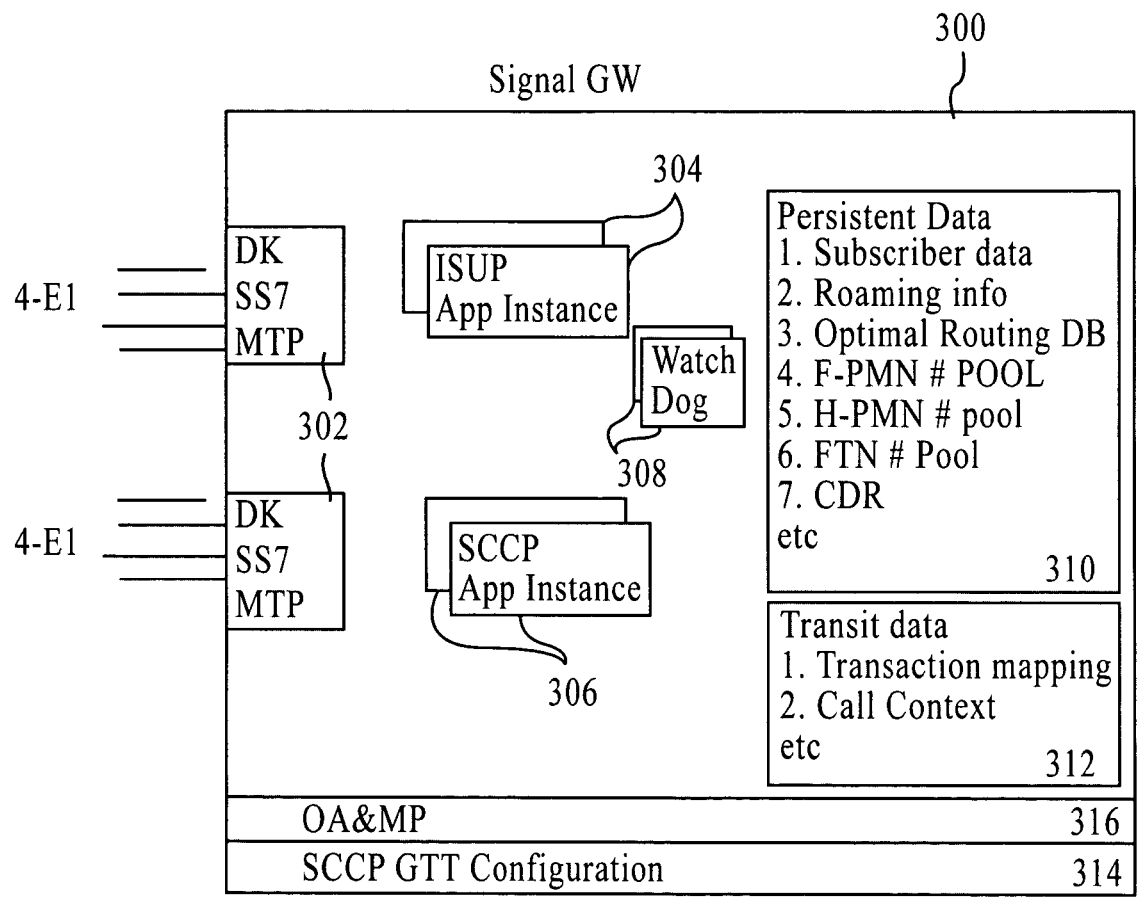
FIG. 3 is block diagram of an embodiment of a Signaling Gateway that consists of two or more Signaling Gateways.

In one embodiment, as illustrated in FIG. 3, the Signaling Gateway 300 consist of two or more Signaling Gateways. In one example configuration, each Signaling Gateway is implemented on a Sun Solaris™ platform. Each Signaling Gateway hosts up to four DataKinetics Septel™ boards, or DK boards 302, each of which has four E1 interfaces. Each board 302 processes SS7 messages up to MTP 2/3. Higher level messages are distributed to two pools of User Part Application Instances 304. One pool 306 (called MAP server) is for processing SCCP messages. The other pool 304 (called ISUP server) is for processing ISUP loopback messages.

A watchdog process 308 oversees the states of each of the application instances 304 and 306. Whenever an application instance is stopped for any reason, the watch dog 308 kills the instance and starts a new one. If all instances of a particular application protocol stop for any reason, the watch dog 308 kills the SS7 stack on each DK board 302 first before it kills all instances of any application protocol. The watch dog 308 then first restarts the application instances of all application protocols before restarting the SS7 stack on each DK board 302.

There are many types of persistent information 310 stored in memory on the Signaling Gateway 300. The memory also contains many types of temporary, or transient, information 312.

The Signaling Gateway 300 also includes an SNMP agent and MIB (not shown). The Signaling Gateway 300 allow SCCP GTT configuration interface 314 and include an MTP3 routing table. An OA&MP interface 316 is a web interface that allows operators to provision new customers and to perform other maintenance functions.

Figure 4:
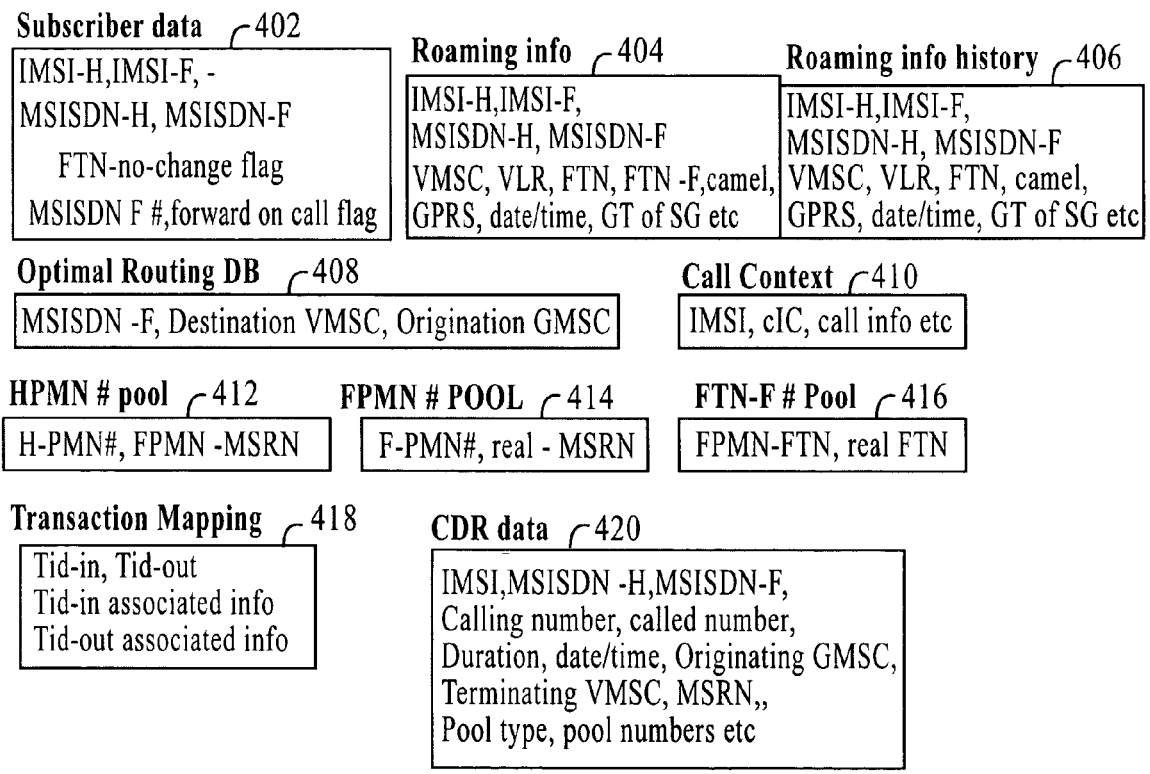
FIG. 4 is a diagram showing various persistent data and transient data.

Architecture: Signaling Gateway Internal Architecture: Persistent and Transient Data Persistent data 310 and transient data 312 are further illustrated in FIG. 4. There are many types of persistent data which are maintained in memory before they are written to an Oracle™ database (DB). In one embodiment, for high-availability, redundancy support, and best performance, the Oracle™ DB best resides in a separate physical box from the Signaling Gateways.

The memory further acts as a cache for a Signaling Gateway database (e.g., database 106 of FIG. 1). A database server may also have another level of cache which hosts a copy of the memory data in the Signaling Gateway and acts as a shared memory to the Signaling Gateway.

Subscriber Data 402 in the Signaling Gateway is provisioned by an operator via a web interface or stored procedures. The Subscriber Data 402 includes an HPMN MSISDN-H number, an IMSI-H, an IMSI-F, and any FPMN MSISDN-F number. The Subscriber Data 402 also includes several flags. An MSISDN-F # forward call flag is to enable/disable call-re-routing when the subscriber is called on the MSISDN-F but is not registered in the FPMN network. The MSISDN-F # CF flag enables/disables call-re-routing to any call forwarding value (e.g. voicemail) when the subscriber is called on the MSISDN-F but not registered in the FPMN network and not reachable for any reason (e.g. ECF or CFU or LCF). In one embodiment, the redirection counter is set to 6 (or the call diversion indicator (CDI) is set to 0) in the IAM message to disallow call-forwarding. The MSISDN-F # forward default number flag enables/disables call-re-routing to an operator controlled default number (e.g. FPMN announcement or customer care) when the subscriber is called on the MSISDN-F but not registered in the FPMN network. In all three of these cases, one objective is to provide flexibility to the MIMM subscribers so as to avoid paying IDD call-rerouting. Also in all of these cases, CFU for MSISDN-F is disabled when any of the three flags is set.

An FTN-no-change flag allows a subscriber to have the option to directly route the late call forwarding call to the FTN without being replaced by a virtual FTN to cause the call to be routed through the Signaling Gateway.

Roamer information 404 for a subscriber is created when the MIMM subscriber successfully registers with a FPMN network. Roamer information 404 includes a VMSC, a VLR and other information (e.g. forwarding values) that are collected from both the VLR during updateLocation and the HLR (e.g. Camel and GPRS info) during insertSubscriberData. In particular, roamer information 404 contains the assignment of a FTN-F pool # to each conditionally forwarded FTN value. The roamer information data 404 is initially maintained in the memory and/or disk before it is sent to an Oracle™ DB (in one embodiment) only after a successful registration.

The roamer information 404 is removed upon receipt of a cancellation from the HLR. However, before this is carried out, a copy of the information is sent to a roamer information history DB 406. This is used to examine the MIMM subscriber roaming behavior, etc. for reporting purposes.

An Optimal Routing DB 408 contains the network information relating to whether calls on the MSISDN-F number ranges can be optimally routed based on the interrogating MSC/GMSC address, and the destination VMSC address. This information is maintained by the HPMN operator via a web interface or stored procedures.

A Call Context DB 410 maintains the current ISUP loopback call (including forwarding) context of a MIMM subscriber. The context is maintained in the memory and is cleared as soon as a call is released/aborted. There is also a flag set to indicate when a current call context has been established or forwarded. This flag is used to control whether a second call to a subscriber registered in the FPMN network will go straight into forwarding mode or not. There are no simultaneous call contexts for a subscriber registered at the FPMN.

The HPMN # pool 412 contains a pool of dedicated HPMN numbers used by the Signal gateway function to ensure GMSC-H will loopback the call through the Signaling Gateway when the subscriber is registered in FPMN but called by the MSISDN-H number. It also contains the mapping of a dedicated HPMN number to the current assigned MSRN-F number obtained by the Signaling Gateway from VLR-F to establish the call. The GMSC-H sets up the call to MSRN-F over the leased line through GMSC-F.

The FPMN # pool 414 contains the pool of dedicated FPMN numbers assigned by the Signal gateway function to ensure the call from the FPMN will be routed over the leased line to GMSC-H, which will then loopback the call through the Signaling Gateway when the subscriber is called by the MSISDN-F number. It also contains the mapping of a dedicated FPMN number to the current assigned MSRN number obtained by the Signaling Gateway from HLR/VLR-F to establish the call.

The FTN # pool 416 contains the pool of dedicated FPMN numbers assigned by the Signal gateway function for a conditionally forwarding value for a MIMM subscriber in the FPMN to ensure the late forwarded call will be routed over the leased line to the GMSC-H which will then loopback the call through the Signaling Gateway when the subscriber is registered in the FPMN and called by the MSISDN-F/MSISDN-H number.

The FPMN# pool 414 and the FTN # pool 416 can share the same dedicated FPMN numbers. The FTN # pool 416 can be eliminated if the FPMN supports OCN capability.

The CDR data 420 contains the call detail records for all the ISUP calls that have been looped through a Signaling Gateway. Other than the standard parameters, a CDR record will contain which VMSC/GMSC the call originated from, what destination VMSC/VLR/MSRN for the call, and what pool type and number has been used for the set up of the call.

Figure 5:
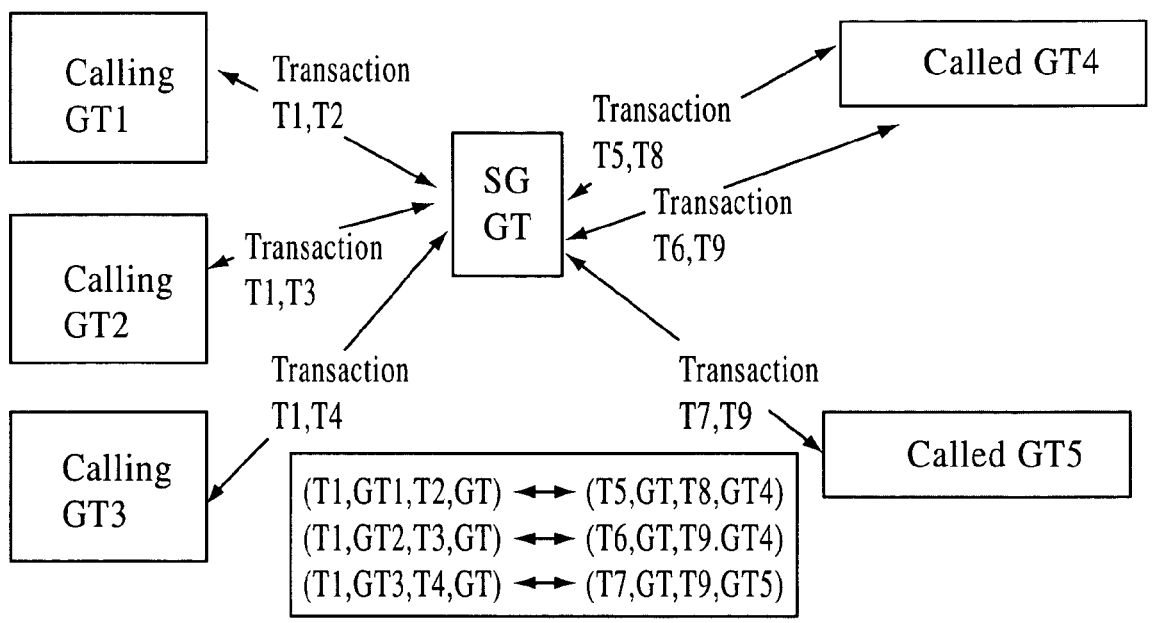
FIG. 5 is an illustration of transaction mapping according to one embodiment.

The transaction mapping 418 contains the mapping of the TCAP transactional dialog of the Signaling Gateway function with the calling GT on one side and the TCAP transactional dialog of the Signaling Gateway function with the called GT on the other side. This is further illustrated in FIG. 5. The Signaling Gateway function can distinguish transactions initiated by the calling GT using the calling GT and its associated originating transaction identifier. However this transaction cannot be relayed to the called GT side since the Signaling Gateway function (with a single GT that does not correspond to any calling GT) cannot determine the corresponding original calling GT from the response from the called GT to relay back the response. The Signaling Gateway to creates a new unique transaction with the called side and relates this transaction with the transaction generated from the calling side. Note that the transaction ID (identification) of the destination or origination need only be unique for the Signaling Gateway function.

However if there is a unique SG GT for each calling GT from the initiating operation of the transaction, the transaction can then be relayed across the called side. Therefore the transaction ID mapping is understood as a logical mapping. Depending on the actual implementation choice, the physical mapping might involve the same transaction ID (since the calling GT could be made unique with a unique SG GT that corresponds to initiating entity of operation of a transaction).

To make the description clearer, we have used a different logical SG GT to correspond to each different network element in the call flows, or signal flows, shown herein to represent a signal gateway global title. The actual physical SG GT used varies according to the implementation choices. It can even be just the original network elements. For example, SG-VMSC might be physically just the VMSC itself.

Architecture: Signaling Gateway Internal Architecture: Deployment Topology

As stated, one embodiment of the Signaling Gateway function in the HPMN is implemented in two physical Signaling Gateways. Each of the two physical Signaling Gateways is connected to a GMSC-H using SS7 links for both SS7 as well as ISUP signaling. One embodiment involves using ISUP loop-back signaling (only ISUP signals are sent to the Signaling Gateway while voice trunks are looped back at the GMSC-H) to handle ISUP calls for billing and call control. This avoids voice trunks being hauled all the way to the Signaling Gateway, and uses the spare port capacity already provisioned on the switch.

Figure 6:
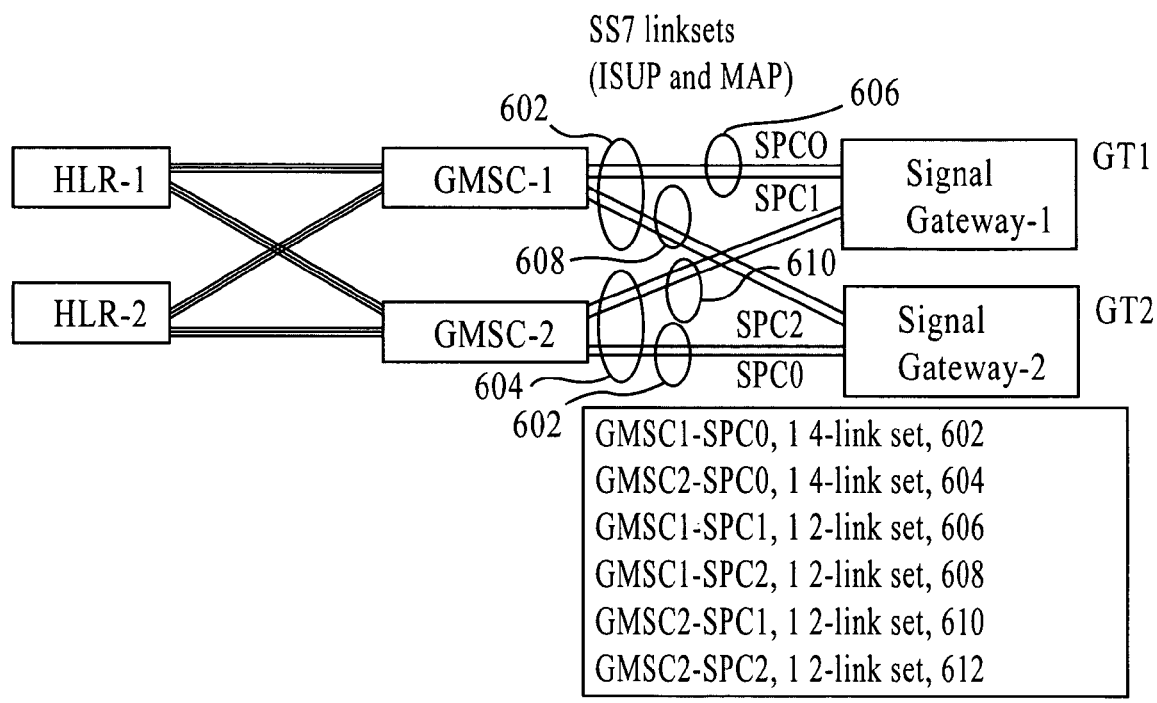
FIG. 6 is an illustration of one embodiment of a link configuration of GT and SPC.

FIG. 6 is an illustration of one embodiment of a link configuration of GT and SPC. Each Signaling Gateway is assigned two Signal Point Codes. One (SPC0) is common across both gateways and one is unique to itself (SPC1 and SPC2). Each gateway is also assigned a distinguishing Global Title, GT1 and GT2 respectively.

The Signal gateways are connected to two GMSCs of the HPMN in a cross-connect manner. However due to the cost of ISUP loopback circuits, one GMSC may also be used. Each GMSC will have two links to each Signaling Gateway. There are six different linksets created, linksets 602, 604, 606, 608, 610, and 612 as shown. A linkset contains links that share the adjacent signal point code. Since the two Signaling Gateways also have a common SPC (SPC0), the GMSC1-SPC0 can have a 4-link linkset across two gateways, resulting in greater fail-over support. Each GMSC also has a two-link linkset with each Signaling Gateway's unique SPC (SPC1, SPC2) respectively. A link can participate in more than one linkset. Each signaling link can contain both MAP and ISUP signaling.

Figure 7:
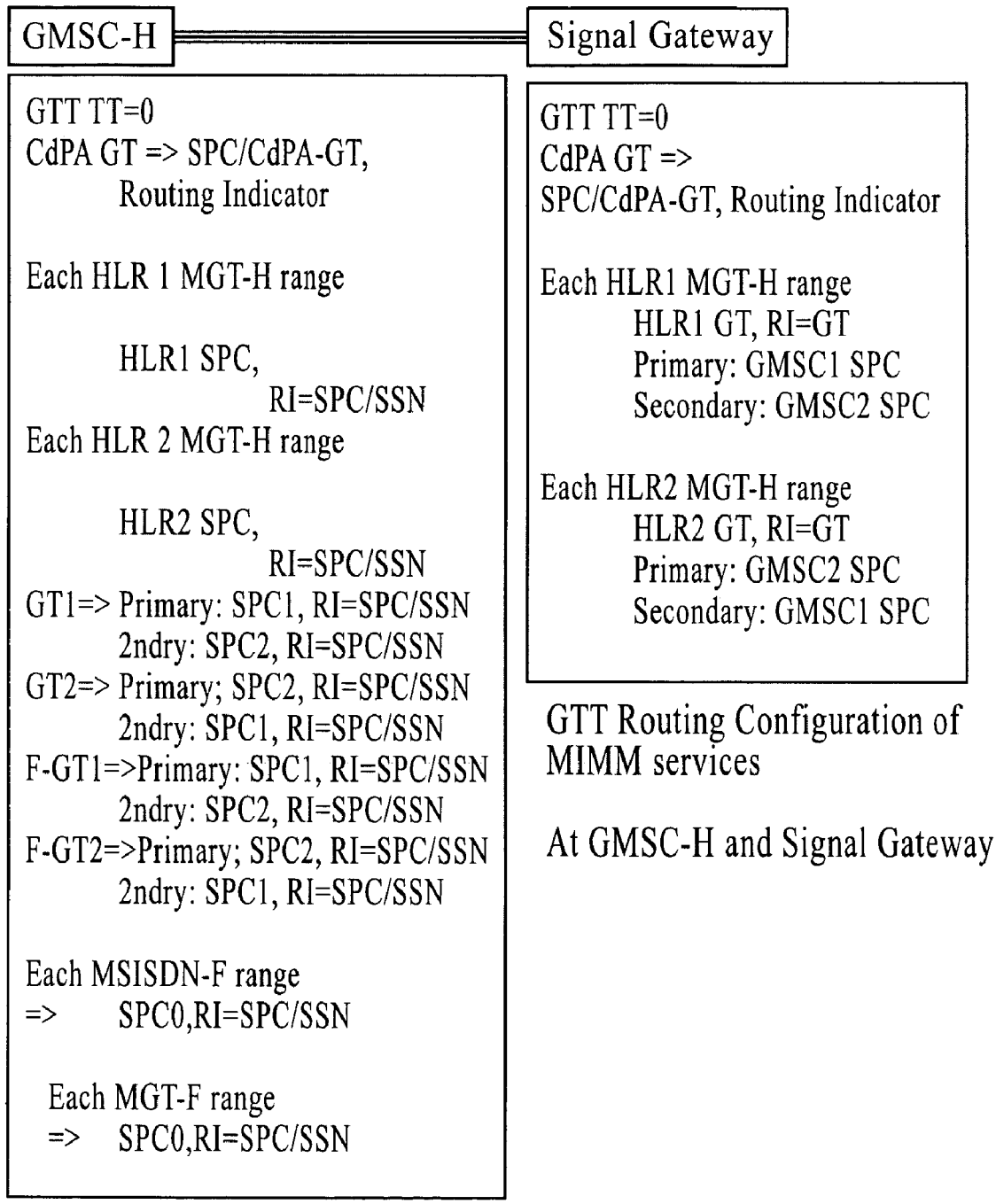
FIG. 7 is a block diagram of an alterative non-cross-connect configuration of one embodiment of a Signaling Gateway.

An alterative non-cross-connect configuration is shown in FIG. 7. To achieve an active/active load-balancing mode, map messages routed on MGT can still be mapped into either gateway via SCCP translation at each GMSC-H. However if the SCCP configuration does not support nested mode such as (Active/Active)/Passive, then one cannot configure GTT to fall back on the real HLR when the gateway function goes down. However, it is possible to configure the GTT at each GMSC in such a way that the direct-connected gateway is the Active SCCP entity, while the real HLR for the MIMM MGTs is the standby/secondary SCCP entity. Since both GMSCs might be traversed evenly, this effectively achieves the load-balance between the Signaling Gateways. However this does not completely solve the fail-over case since if one gateway goes down, and the MGT-based MAP messages reach the direct connected GMSC, the real HLR will take over even though the other Signaling Gateway is still alive.

For ISUP loopback signaling it is possible to loop through the GMSC to a non-direct connected node via the other GMSC using MTP3 routing. To support partial fail-over, each GMSC configures two alternate linksets for its loopback circuits. The primary link set for each GMSC is the one directly connected to a Signaling Gateway. The alternate link set is the one connected to the other gateway via the other GMSC.

The cross-connect configuration for MAP is recommended. For ISUP loopback, both configurations are recommended.

When the HPMN has more than two GMSCs, all the above configurations work well. The additional GMSC is configured to route calls on numbers from different pools in the Signaling Gateway function to the two GMSCs in the cross-connect set-up. The MTP3 routing table and GTT translation on different GMSCs are also modified to reach the Signaling Gateway function.

Figure 8:
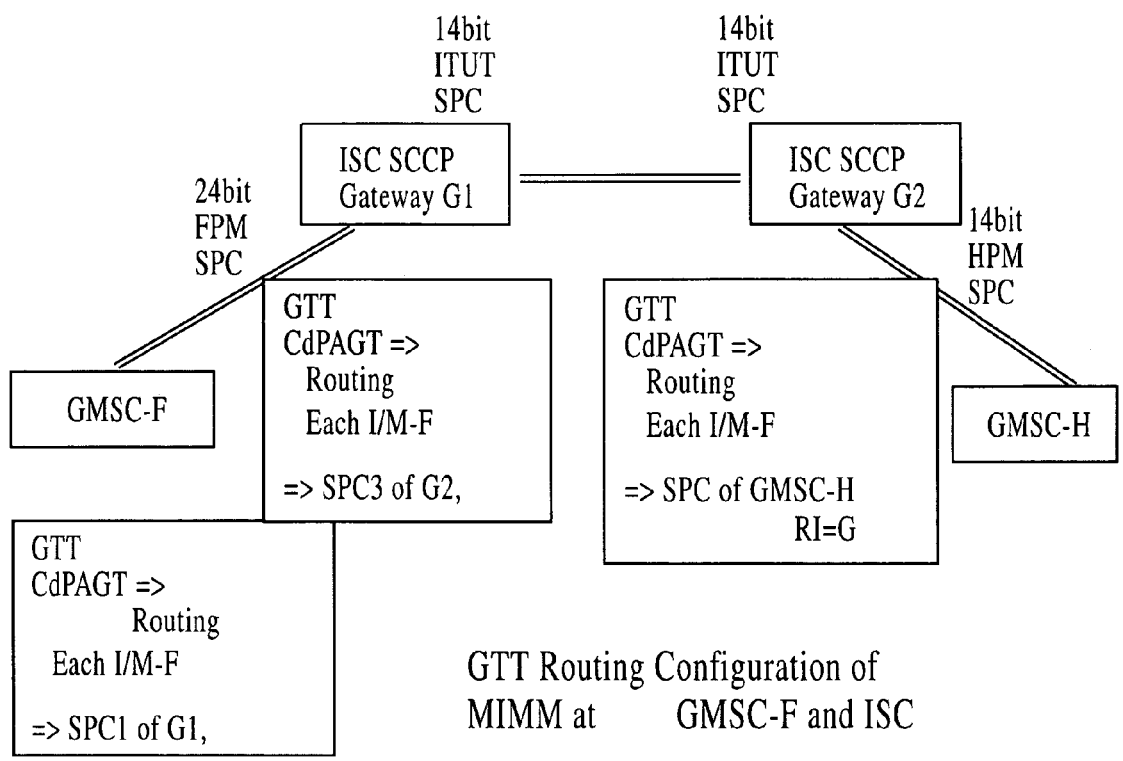
FIG. 8 is a block diagram of an embodiment of a routing configuration including multiple ISC SCCP gateways.

Architecture: Signaling Gateway Internal Architecture: SCCP Addressing, ISUP Trunk Routing and Transformation Capabilities One of the functions of the Signaling Gateway is performing Signaling Connection and Control Part (SCCP). (SCCP is an SS7 protocol that provides additional functions to the Message Transfer Part (MTP). It typically supports Transaction Capabilities Application Part (TCAP)). An embodiment of a routing configuration including multiple ISC SCCP gateways is illustrated in FIG. 8. The Signaling Gateway uses SCCP Global Title based routing to route/re-route messages through the GMSC to which it is connected. TCAP (ITU-T Q.773 compliant) and MAP messages (MAP v1, v2 and v3 as documented in ETSI GSM 09.02) are decoded and certain fields transformed (as required on a case-by-case basis). The specific transformations are described in individual scenarios later in the document.

With reference to FIG. 8, the GMSC-H in the HPMN also configures its GTT function to route MAP messages on global titles of the MIMM subscribers through the Signaling Gateway function.

At the GMSC-H, routing on GT for each E-214 MGT-H range of the MIMM subscribers that correspond to a HLR will not go through the Signaling Gateway. However, GTT routing on MGT-F of MIMM subscribers registering with IMSI-F on a network will need to go through the Signaling Gateway. The SPC of the GTT translation on IMSI-F will be the common SPC (SPC0) of both Signaling Gateways. This effectively achieves an active/active load-balancing and fail-over support across gateways. When both Signaling Gateways break down, the MIMM subscriber is simply reduced to a normal subscriber.

MAP messages on CdPA=MGT-H of the MIMM IMSI-H are routed as normal messages as HPMN roamers when IMSI-H is used to register a network. That is, they can go to the existing ISC providers and get routed in a normal way to the HPMN as a roaming subscriber in a visiting network. No special configuration on FPMN GMSC-F is required for CdPA=MGT-H.

However, MAP messages on CdPA=MGT-F of the MIMM IMSI-F are routed as normal messages to the FPMN first when the IMSI-F is used to register a network. These messages should then be redirected to the HPMN network. Configuration on the FPMN GMSC-F enables the CdPA=MGT-F to redirect the messages to the Signaling Gateway irrespective of its location. The Signaling Gateway translates the IMSI-F to IMSI-H and forwards the message onto the real HLR. On response from the HLR, the Signaling Gateway also translates the MSISDN-H to MSISDN-F.

The Signaling Gateway therefore essentially act as a proxy to the real-network elements in dealing with interactions between the HPMN network elements and the VPMN network elements. However because the HPMN HLR may perform different procedures (e.g. SS such as call barring and ODB services in VLR update, subscriber SS registration etc) based on a MIMM subscriber's network location, the Signaling Gateway has two types of GTs. One type is the HPMN GT, which is what the FPMN VLR will know. The other type is the FPMN GT which is what the HPMN HLR will know when the MIMM subscriber is registered at a the FPMN.

If there are multiple FPMNs involved, each Signaling Gateway will have its own corresponding FPMN GT for each FPMN. If the procedures at the HLR only depend on whether the subscriber is outside the HPMN or not, a pseudo non-HPMN GT might be used by a Signaling Gateway for all FPMNs as long as the HLR procedures will regard such a pseudo GT as a roaming GT.

If the HLR procedures can be configured based on VLR GT ranges, then there is no need to assign two types of GTs (HPMN and for FPMN), to a Signaling Gateway. The HPMN GTs of the Signaling Gateways are simply regarded as roaming GTs by the HLR procedure configuration. As a result, for a Signaling Gateway, its FPMN GT will be the same as its HPMN GT. For example, to support national roaming, a HLR is configured to indicate which address is a roaming GT. The SG GT can be configured as if it is a roaming GT doing national roaming.

Alternatively, if the HPMN network wants to regard a FPMN network as if it is an extended home network, then again there is no need for the FPMN type of GT for the Signaling Gateway function for the FPMN network.

To support the general case, the architecture and system also support a configuration to enable FPMN GT support for the Signaling Gateway function per FPMN. In this case, when the Signaling Gateway function imitates a FPMN VLR, it will present its FPMN GT that corresponds to the FPMN to the HPMN HLR. When the Signaling Gateway function imitates a HPMN HLR, it will present its HPMN GT to the VLR-F or SGSN-F. In this way, the HPMN HLR can then decide the right procedure to apply. When the HPMN HLR responds or initiates a dialog with the FPMN GT associated with a Signaling Gateway, the GMSC must route it to the corresponding Signaling Gateway.

When the subscriber registers with a FPMN network, the MSISDN-F will be used as the calling party in delivering MO-SMS. If the message is intended for a non-FPMN country destination, the sending number is modified to MSISDN-H. A special SMSC address (SMSC-S-H) is used when the IMSI-F is used for registration. The GMSC-H GTT translates the SMSC-S-H to the SPC0 of the Signaling Gateway. The Signaling Gateway determines if it needs to change the sending number MSISDN-F to MSISDN-H.

However, when the HLR-H receives SRI-SM(MSISDN-H), SMS messages will be forwarded to wherever the HLR-H indicates; then when the MIMM subscriber registers at a FPMN, the Signaling Gateway can present one of the following three options.

1. Signaling Gateway HPMN GT to a HPMN HLR for VMSC and SGSN imitations;

2. Signaling Gateway FPMN GT to a HPMN HLR for VMSC and SGSN imitations in which case, the FPMN STP is configured to translate the FPMN GT in CdPA to the HPMN GT of the Signaling Gateway; the FPMN GT for VMSC/SGSN and the FPMN GT for VLR might also be required to be in the same prefix in some FPMNs (e.g. China Mobile); or 3. GT of the VMSC-F and SGSN-F are passed transparently to the HPMN HLR without any change.

Since the IMSI-F and the MSISDN-F are provisioned at the Signaling Gateway on the HPMN side, special SCCP routing is constructed from the FPMN side, and possibly from the HPMN side, also (e.g. in the case of optimal routing).

There are at least three ways to route MAP messages on CdPA=I/M-F or IMSI-F/MGT-F and MSISDN-F. The first two use the existing ISC.

One way to route MAP messages configures GMSC-F/STP-F GTT function on each MSISDN-F/MGT-F (for IMSI-F) range to translate the CdPA=MSISDN-F/MGT-F into the Signaling Gateway function (common GT) GT0 as the CdPA field with Routing Indicator=GT. The GTT translation for GT0 will be the SPC of the ISC SCCP gateway. The rest of the SCCP routing is supported by the ISC in the normal way.

In another way, GMSC-F/STP-F simply configures its GTT function on each MSISDN-F and MGT-F range to set its next SCCP node to the SPC of the ISC SCCP gateway on the FPMN side. The ISC SCCP gateway has two SPCs. One conforms to the 24 bit SPC format of the FPMN side; while the other conforms to the 14-bit SPC format of the ITU-T international standard. In general, both networks use ITU-T format. For generality, we assume they use different formats. The ISC configures this SCCP gateway to route the MAP messages on CdPA=MSISDN-F/MGT-F to the ISC SCCP gateway that corresponds to the HPMN network. The ISC SCCP gateway also has two SPCs. One conforms to the 14-bit SPC format of the HPMN side; while the other conforms to the 14-bit SPC format of the ITU-T international standard. This gateway configures its GTT to route the MAP messages on MSISDN-F/MGT-F to the GMSC-H. All routing is done on global title of MSISDN-F and MGT-F range. GMSC-H does the final translation into a routing indication on SPC/SSN as shown in the above GTT configuration of FIG. 8 at GMSC-H.

Yet another way involves routing MAP messages on MSISDN-F/MGT-F ranges over the dedicated leased line used to route calls between GMSC-F and GMSC-H for the MIMM service. To provide the special tariff for MIMM subscribers and avoid an IDD charge, HPMN and FPMN set up a dedicated leased line between GMSC-F and GMSC-H. By routing MAP messages on CdPA=MSISDN-F/MGT-F on the dedicated leased line, the HPMN can avoid configuring GTT changes on the existing ISC gateways. While the ISC providers can offer routing and trunking as well as SS7 conversions, the HPMN also gets an SS7 conversion over the leased line.

Figure 9:
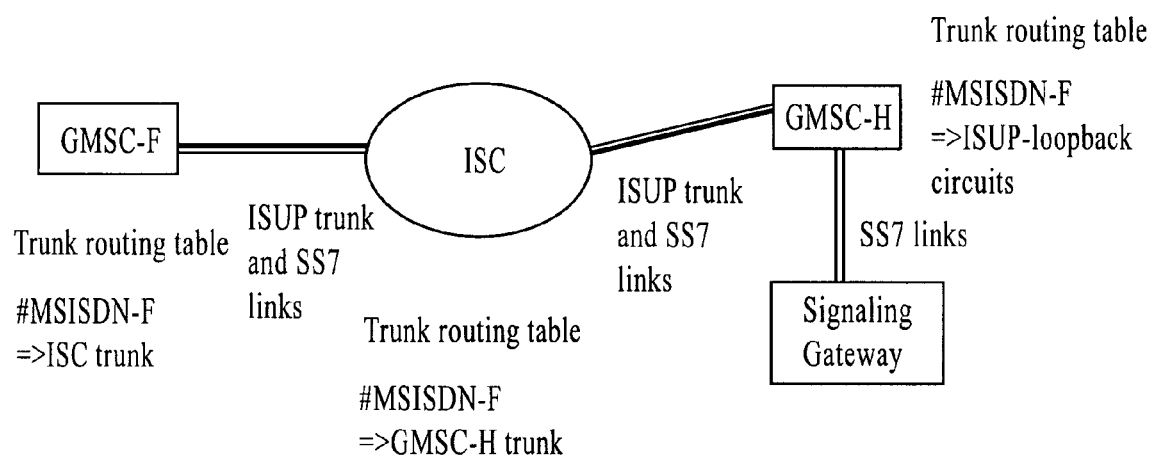
FIG. 9 is a block diagram illustrating GMSC-F configuration of ISUP trunk routing tables in one embodiment.

Similarly, GMSC-F configures its ISUP trunk routing table to route all calls on the special range of FPMN numbers (denoted by #MSISDN-F) allocated for the MIMM service towards an ISC carrier (dedicated or existing one). This is illustrated in FIG. 9. The ISC carrier routes these calls towards the GMSC-H.

Architecture: Signaling Gateway Internal Architecture: Service Node Capabilities Service Node Capabilities are required to generate CDR for voice calls and Mobile Terminated SMS. This CDR is used for appropriate rating, providing discount/rebate, billing and settlement etc. between the HPMN, FPMN and the MIMM subscriber.

The Signaling Gateway supports at least two types of interfaces, including the ISUP loopback interface, and the IN interface.

Architecture: Signaling Gateway Internal Architecture: Service Node Capabilities: ISUP Loopback Interface As mentioned before, the Signaling Gateway has the capability to terminate and generate ISUP signaling. However, it does not have voice ports, and loops-back voice ports at the GMSC by controlling circuit allocations at the GMSC.

Figure 10:
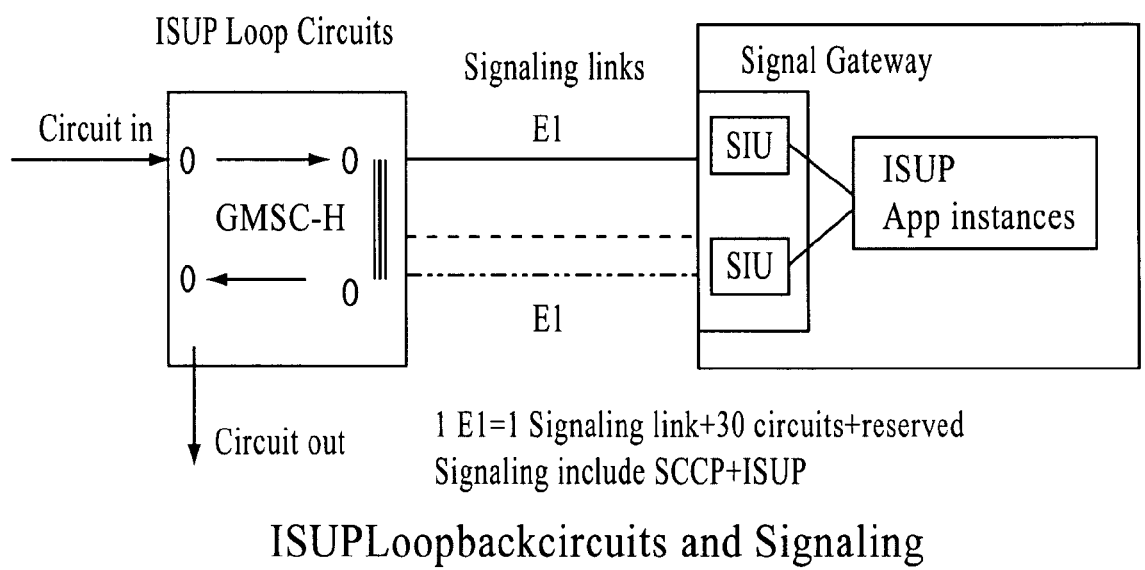
FIG. 10 is a block diagram illustrating the construction of ISUP loopback circuits at GMSC-H with two E1 ports configured as loopback circuits in one embodiment.

As illustrated in FIG. 10, ISUP loopback circuits are constructed at GMSC-H by configuring two E1 ports as loopback circuits. For example, in one embodiment, the 1-30 range of circuit IDs of the first E1 is mapped to the 33-62 range of circuit IDs of the second E1. That is, the voice path coming in on circuit ID 1 will go to circuit 33 and vice versa; the voice path coming in on circuit ID 2 will go to circuit 34 and vice versa; and so on.

While the voice paths are looped between the two E1 ports, the signaling path is constructed at GMSC-H for both ports to be non-associatively looped through the Signaling Gateway function.

The Signaling Gateway can also modify the calling parameter in addition to the called parameter in some cases for ISUP loopback calls. When the MIMM subscriber is called by the subscriber's FPMN number in the FPMN country when the subscriber is in the HPMN/VPMN network, the A party number will be modified by the Signaling Gateway to add an international prefix (e.g. +86 in China) after the national prefix is stripped (e.g. 0 in China). This allows the called party to easily call back. Since all the ISUP loopback calls will also go through the leased line of an ISC carrier, it is possible to for the ISC carrier to perform this function. However, it is recommended to perform this function in the Signaling Gateway to avoid costs and possible ISC complications.

Loopback circuits double the circuits used in setting up a call looped through the GMSC-H with signaling via the Signaling Gateway function. Routing through loopback circuits should be carefully filtered. The different ranges of numbers from different pools of the Signaling Gateway function are configured to use loopback circuits at the GMSC-H.

Architecture: Signaling Gateway Internal Architecture: Service Node Capabilities: IN Interface As mentioned before, the Signaling Gateway also supports an IN interface. An IN interface can be more desirable than an ISUP loopback, since the In interface does not incur double voice trunking, or any voice trunking. However, the switch must support IN, which is often not the case. Sometimes an operator is also unwilling or unable to deploy an IN solution due to possible feature interactions and switch vendor involvement.

Figure 11:
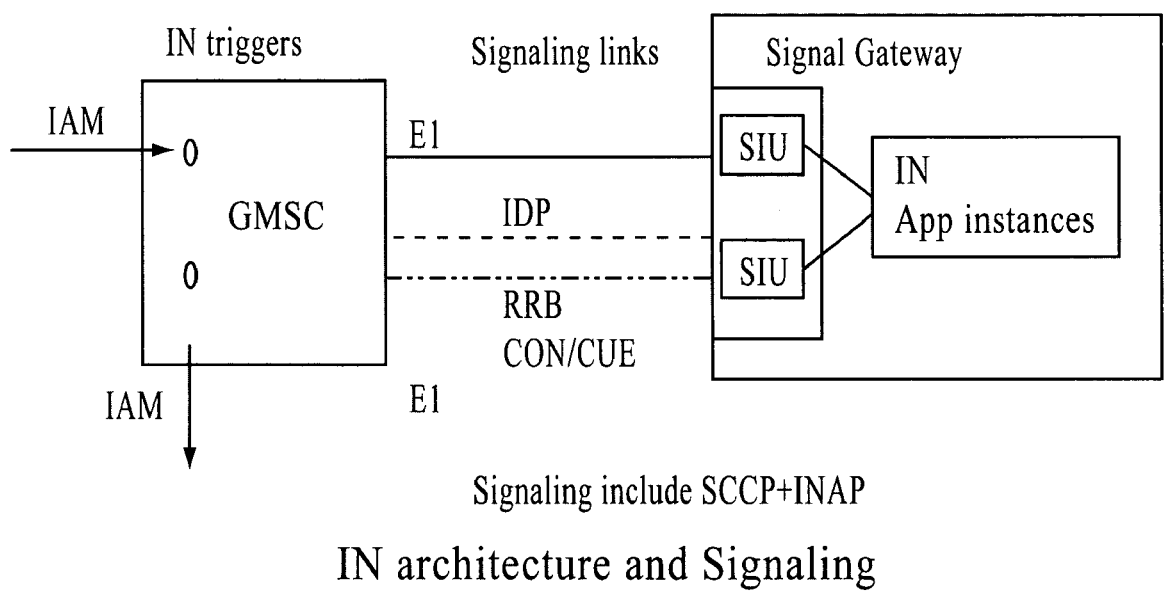
FIG. 11 is a block diagram of an embodiment of a Signaling Gateway including an IN interface.

Throughout the document, we will use ISUP loopback as the basis of the description, since it is probably the most common operator switch. The operator should be aware of the IN option which is a far more scalable solution than the ISUP loopback option. For this reason, we briefly describe the IN interface here with reference to FIG. 11.

The IN architecture involves defining triggers at the GMSC. These triggers could be on special prefixed numbers and could even be dynamically armed from HLR. When the trigger criteria are satisfied, GMSC issues INAP InitialDP (IDP) to the Signaling Gateway. The Signaling Gateway can issue further instructions such as RequestReportBCSM (RRB) to report on call events, CONNECT (CON) to a new number, and CONTINUE (CUE).

Architecture: Signaling Gateway Internal Architecture: Redundancy and Availability of Service Carrier-grade systems require extremely high levels of network uptime. A typical requirement in many systems is to eliminate single points of failure in SS7 links, SS7 boards, and system chassis. Furthermore, systems require the ability to perform hardware and software upgrades without system downtime. There are also redundancy requirements on software applications, data storage, power supplies etc as listed below.

Redundancy in signaling data links (e.g. nominated reserves or switched connections);

Redundancy in signaling terminal devices (e.g. a common pool of terminals for the same signaling point);

Redundancy of signaling links within a link set (typically operating with load sharing);

Redundancy in signaling routes for each destination (possibly operating with load sharing);

Redundancy in signaling boards;

Redundancy in power supplies;

Redundancy in software application instances;

Redundancy in data storage;

Redundancy in LAN connection; and

Redundancy in watch dogs.

One solution as adopted by HLR/MSC, sometimes referred to as the switch design, is to build all the above redundancy requirements within the single chassis completely for the Signaling Gateway function. One advantage of this approach is that a single global title and SPC can be assigned to the Signaling Gateway. There is no need to replicate data across gateways since TCAP transactions always return to the same node. There is also no need to replicate ISUP loopback context and call context. To avoid memory, disk failure and chassis damage, industry grade hardware components should be used.

While such a design might be recommended for core telecommunications services such as voice call and SMS, the design could be overkill for the MIMM service. The failure of the Signaling Gateway function at worst reverts the MIMM subscribers back to a normal home subscriber service (local or roaming).

Figure 12:
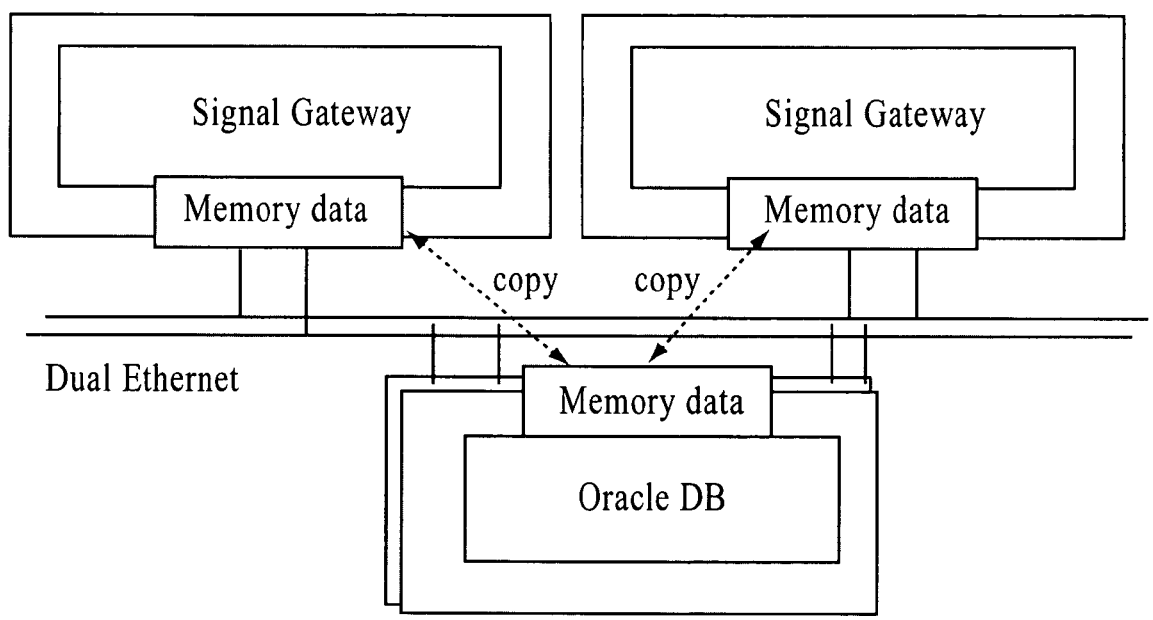
FIG. 12 is a block diagram of an embodiment of a Signaling Gateway including two Signaling Gateway servers performing the Signaling Gateway function.

Given the prohibitive cost nature of the switch design (in millions of US dollar range), another proposed implementation includes placing the Signaling Gateway function in a server farm. For example, a basic set up as illustrated in FIG. 12 consists of two Signaling Gateway servers performing the Signaling Gateway function and a database server that acts as the shared memory and shared disk for the two gateways.

There are at least two basic configurations for an operator depending on the NEBS requirement. One is based the Sun Netra™ family which is NEBS compliant, the other is based on Sun Fire™ family. In either cases, four servers can be used. In the Sun Netra™ case, two Netra™ 20 run the Signaling Gateway function while two Netra™ T140 will host the Oracle™ DB with replication support. In the Sun Fire™ case, two Sun Fire™ V480 run the Signaling Gateway function and two Sun Fire™ V480 host the Oracle™ DB with replication support.

The Netra™ 20 has four PCI slots and up to UltraSparc™ III 2*900 Mhz CPU and up to 16 GB RAM. It is designed to achieve high performance for the Signaling Gateway function. It has AC and dual DC power options and up to 2*36 GB disk. Netra™ 1405 has up to 4*440 Mhz CPU, up to 8 G RAM but up to 4*36 GB hard disk and hot swappable (n+1) AC and DC power options. Netra 1405 is chosen for DB server for its high reliability and hot swappable n+1 power supplies.

The Sun Fire™ V480 server is configured with up to 4*900 MHz UltraSPARC™ III Cu processors with 8 MB of cache per processor. The Sun Fire™ V480 server supports up to 32 GB of memory. All memory is accessible by any processor. The Sun Fire™ V480 server also comes with a DVD-ROM drive, two hot-swappable (N+1) AC and DC power options, two hot-pluggable Fibre Channel disks, two integrated dual 10/100/1000 Mbps Ethernet ports, and six PCI slots, all in a 5 RU, 24-inch deep, rack-optimized chassis. The Signaling Gateway function server also has up to 16 GB-RAM and 2*36 GB disk. The database server has up to 16 GB-RAM and 8*36 GB disk.

Each Signaling Gateway has its own memory data to run the MIMM service. The memory data contains transient information as well as persistent information obtained from the database or to be written to the database. The memory data is also copied to the shared memory space in the database server in the case of full redundancy support. The shared memory can also contain the data from the DB to be accessed by each Signaling Gateway. The architecture thus forms a hierarchical level of data management.

Figure 13:
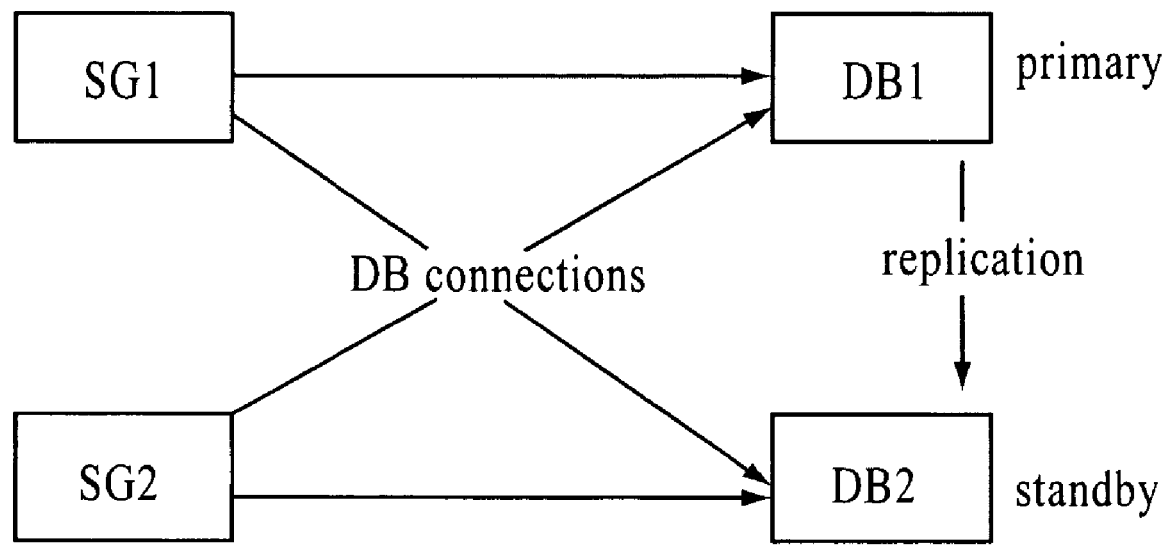
FIG. 13 is a block diagram of an embodiment of a configuration of databases in relation to Signal Gateways in one embodiment.

When a Signaling Gateway looks for data, it first looks at its own memory data. If the desired data is not found in the Signaling Gateway Memory, the Signaling Gateway looks for it in the shared memory on the DB server. The data, once found, is cached in the Signaling Gateway's memory. The DB server loads the data into its memory if the data is in DB, but not in the memory. The DB server's disk is also configured in a mirrored disk structure for data redundancy. One configuration of databases in relation to Signal Gateways is shown in FIG. 13.

When a Signaling Gateway's memory data record has changed, a copy is made to the DB server. This is an option to support full fail-over if necessary. If the DB server already has a copy from the Signaling Gateway, nothing will be done. However, if the DB server last had a copy from another gateway, the DB server will inform the other Signaling Gateway to remove its copy or mark its copy for renewal. This is to avoid potential data consistency problems in a load balancing mode with full fail-over support.

Whether or not copying of the Signaling Gateway memory data into the shared memory occurs, at the end of a transaction (e.g. location update) of a Signaling Gateway, data of persistent type (e.g. roaming information, CDR etc.) are copied to the shared DB server.

If one Signaling Gateway fails, the other gateway can still function by accessing the shared DB server. The redundancy of the DB server is maintained separately and is implemented on a high-availability machine such as Netra™ T1405 or Sun Fire™ V480 which have 3 AC and 3 DC hot swap-able power supplies. The DB server will also have a high memory space 8-32 G RAM to support shared memory for both gateways.

In the unlikely event of a database server failure, the Signaling Gateway function ceases to function (all protocol stacks are automatically shut and all apps stop until a DB connection can be established) and essentially constitutes a failure of the Signaling Gateway function. In this case, normal HLR function will take over. However the shared data redundancy can be supported by having another replicated DB server with Oracle™ redundancy/fail-safe and transparent application failure support in stand-by mode.

One embodiment of the architecture uses Oracle™ Net or Net 8 for transparent application failure (TAF). The configuration supports transparent fail-over across multiple instances of DB on different ports of the same machine or across machines. Connect time fail-over using multiple addresses in a TNSNAMES.ORA configuration is shown in FIG. 14.

This configuration also supports load-balancing and active/active fail-over as further illustrated in FIG. 15.

In one embodiment, the Oracle™ fail-safe with TAF architecture for an operator in active/standby mode is recommended, since the failure of the DB server will render the Signaling Gateway function completely useless. Standby mode is chosen since replication might not be fast enough for normal cases of Signaling Gateway functions, although it is acceptable for exceptional cases (e.g. a fail-over switch). In this architecture, each Signaling Gateway opens a DB connection with the primary DB server which replicates data to the standby DB server. This is illustrated in FIG. 16.

In the event of failure of the primary DB server (so connection error and an alarm will be generated), each gateway will open up a DB connection with the standby DB server. When the original primary DB server is completely restored, it can become the primary server again. This process is automatic. Service will not be interrupted. Oracle™ Enterprise edition, or similar, which supports fail-safe, transparent application fail-over and replication is thus recommended.

The original standby server (now the new primary server) is manually configured to synchronize with, or replicate to, the new standby server (the original primary server). If during the restoration process of the original primary server, the new primary server also goes down, then the whole system fails. There is then another alarm, and no SS7 messages will be accepted. Normal HLRs take over.

The fail-over of the DB connection to the standby server usually takes less than thirty seconds. The restoration of the primary server is only restricted by the hardware recovery (e.g. system reboot) rather than by the Oracle™ DB recovery, which only takes about a couple of minutes. However, restoration of data from the backup server to the primary server could take about ten minutes. Historical data replication can be done separately in the background.

When both DB servers are down, each Signaling Gateway completely shuts down the protocol stacks to reject all SS7 messages. The applications will not proceed until DB connections are re-established. Only after that, protocol stacks and SS7 connections will open again.

To support full fail-over, shared memory data is either copied to both DB servers, or the primary DB server replicates the memory data across the standby DB server.

A full fail-over support for a service is defined as no service interruption being possible as long as one of the two physical gateways is alive.

A partial fail-over support for a service is defined as a current service interruption occurring when the gateway initially chosen to handle the service fails, while a new service is handled by the still-alive gateway.

Each Signaling Gateway has at least four PCI slots (one 33/66 MHz and three 33 MHz) for peripheral IO cards. The SS7 interface cards are housed in these slots. Each server has two disks of 36 GB each. They are configured in mirrored mode and hence provide high resilience.

Referring briefly again to FIG. 6, two GMSC-H are used to cross-connect with two physical Signaling Gateways. As mentioned before, each gateway has its own distinguishing Global Title (GT) (GT1 and GT2), and distinguishing SPC (SPC1 and SPC2). Both gateways also have a common SPC (SPC0). Link-level redundancy is achieved by using linksets which in some cases span across both gateways as mentioned in the deployment topology section above.

Let us now consider ISUP call fail-over handling. Depending on the fail-over requirements, different link sets will be configured at the GMSC-H for non-associated signaling for the ISUP loopback calls. For example, if full fail-over is desired, then the 4-link linkset that spans across 2 physical gateways will be used for a GMSC-H's non-associated ISUP signaling. If partial fail-over is acceptable, then the two 2-link linksets that do not span across the two physical gateways can be used.

Figure 17:
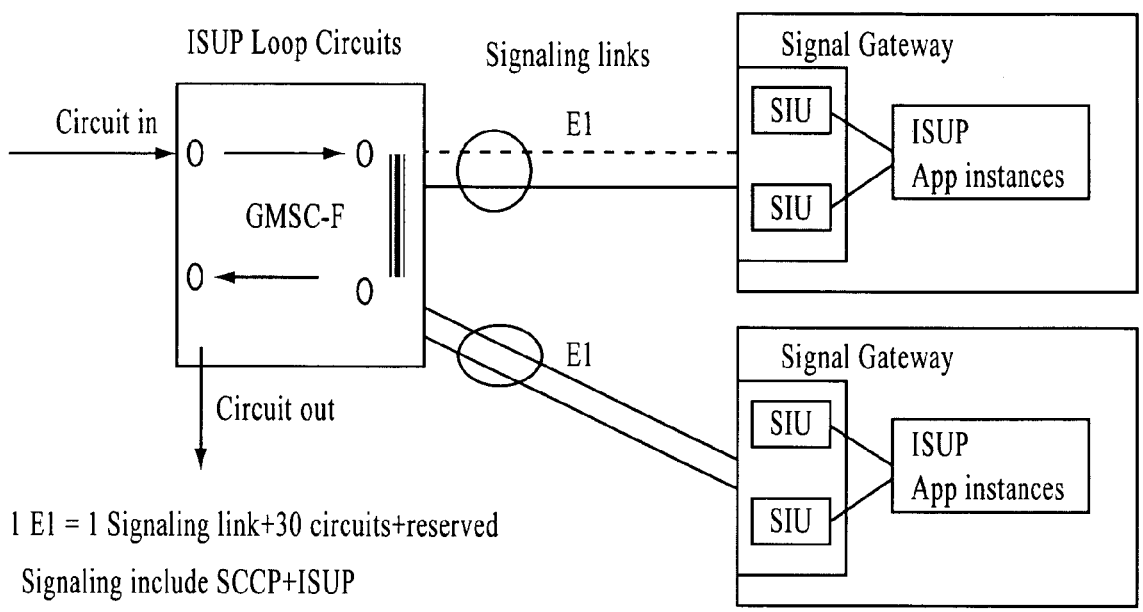
FIG. 17 is a diagram of the configuration of one embodiment in which multiple Signaling Gateways can be connected to one GMSC-H.

To reduce the cost of ISUP loopback circuits, the Signaling Gateways can all be connected to one GMSC-H. FIG. 17 is a diagram of one possible configuration.

ISUP loopback circuits are constructed at GMSC-H by configuring two or more pairs of E1 ports as loopback circuits. For example, the 1-30 range of circuit IDs of the first E1 is mapped correspondingly to the 33-62 range of circuit IDs of the second E1. That is, voice the path coming in on circuit ID 1 will go to circuit 33 and vice versa; the voice path coming in on circuit ID 2 will go to circuit 34 and vice versa; and so on. There may be many pairs of E1s configured at a GMSC-H for ISUP loopback calls, depending on dimensioning requirements.

While the voice paths are looped between the two E1 ports, the signaling path is constructed at GMSC-H for both ports to be non-associatively looped through the Signaling Gateway function using two alternate links sets with SPC1 and SPC2 as the adjacent SPC respectively in the case of partial fail-over support. If GMSC is not directly connected to a gateway as in the non-cross-connect configuration, then the alternate linkset will be the adjacent GMSC. In the case of full fail-over support, a single link set between the GMSC-H and SPC0 can be used. However, call context should be copied to the shared memory of the DB server by each Signaling Gateway.

To ensure data consistency, each time a shared memory of the DB server obtains a copy from a Signaling Gateway that differs from last gateway, the DB server informs the last gateway to remove its copy. For example, during an ISUP loopback call, signaling might first come in one gateway where call context will be created and copied to the shared DB server. It might later go to another gateway which would need to load in the call context from the shared DB server. The copy of the other server must be removed to ensure data consistency. However this could introduce a racing condition since the next message could go back to the original gateway faster than its call context being removed. To avoid this potential problem for ISUP signaling, each Signaling Gateway should attempt to load the latest data from the shared DB server.

Since ISUP signaling runs over the same linksets as MAP signaling between GMSC-H and the Signaling Gateway function, in the case of full fail-over support, ISUP signaling can also be switched physically between two signaling gateways. Calls are switched to the second Signaling Gateway when the first Signaling Gateway fails for some reason. In this way, calls can continue as if nothing had happened.

In both cases, however, to protect against unexpected failures on both nodes and to prevent fraud, ISUP signaling through the gateways are monitored periodically to produce a temporal CDR duration every X seconds (e.g. 6 seconds), where X is configurable. In this way, call durations can be accurate at least within the boundary of X seconds.

However, unlike MAP signaling in which a Signaling Gateway can be addressed by its distinguishing global title for subsequent interactions of a MAP transaction once the gateway is chosen in a fail-over or load-balancing initially, the ISUP signaling interactions for the full fail-over case will span across both physical gateways in an on-going ISUP call session. This means that if the signaling links from a linkset spans across both physical gateways, copying of call context into the shared memory data space of the DB server by each Signaling Gateway should occur.

If the partial fail-over is acceptable (this is recommended for ISUP loopback signaling due to the possible racing condition mentioned earlier), then when the Signaling Gateway that accepted the ISUP signaling for a loopback call dies, there will be no fail-over to the second gateway. The call is simply dropped by the GMSC-H. In this case, no copy of call context to the DB server is required. The linksets used for the ISUP signaling between GMSC-H and the Signaling Gateway function will be two alternate linksets (instead of one across both gateways) using the distinguishing SPC of each gateway in primary and secondary mode. So if the gateway that accepted the initial ISUP signaling fails, the current calls is dropped. However for new ISUP loopback calls, the second gateway will be used.

Note that when a linkset associated with a circuit call completely fails, MTP2 level at GMSC-H of the ISUP loopback calls will inform the higher level—ISUP level which will bring the circuit down. This avoids the case where a call could continue indefinitely when the Signaling Gateways are all down.

Next we consider SCCP signaling fail-over support. With reference again to FIG. 7, at GMSC-H, routing on GT for each E-214 MGT-H range of the MIMM subscribers that correspond to a HLR does not go through the Signaling Gateway. However, GTT routing on MGT-F of MIMM subscribers registering with IMSI-F on a network, goes through the Signaling Gateway. The SPC of the GTT translation on IMSI-F and MSISDN-F is the common SPC (i.e. SPC0) of both Signaling Gateways. This effectively achieves an active/active load-balancing and fail-over support across gateways. When both Signaling Gateway break down, the MIMM subscriber is simply reduced to a normal subscriber.

MAP messages on CdPA=MGT-H of the MIMM IMSI-H are routed as normal messages as HPMN roamers when IMSI-H is used to register a network. That is, they can go to the existing ISC providers, and get routed in a normal way to the HPMN as a roaming subscriber in a visiting network. No special configuration on FPMN GMSC-F is required for CdPA=MGT-H.

However MAP messages on CdPA=MGT-F of the MIMM IMSI-F will be routed as normal messages to FPMN first when IMSI-F is used to register a network. These messages are then be redirected to the HPMN network. Special configuration on FPMN GMSC-F should be made for CdPA=MGT-F to redirect the messages to the Signaling Gateway irrespective of its location. The Signaling Gateway translates the IMSI-F to IMSI-H and forwards the message onto the real HLR. On response from HLR, the Signaling Gateway also translates the MSISDN-H to MSISDN-F.

The SCCP routing of messages (e.g. SRI, SRI-SM etc) based on CdPA=MSISDN-F from FPMN towards HPMN is also supported via an active/active GTT configuration at the GMSC-H. This again achieves load-balancing and fail-over support by the Signaling Gateways. Like MGT-F based routing, there is no secondary backup for MSISDN-F based routing. In the rare condition of the entire system failing, the MIMM subscribers roam as normal HPMN users and can only get home services (calls and SMS etc) on the HPMN number, but not on the FPMN number.

Unlike the SCCP routing of messages based on MGT-F and MSISDN-F as CdPA, the SCCP routing of messages (e.g. insertSubData from HLR, or ack from a VLR, or forwardSMS from a SMSC) towards a GT of a Signal gateway at the GMSC-H is configured in an active-standby mode in the case of full fail-over support. The primary DPC of the translation in this case is the distinguishing SPC corresponding to the HPMN (if towards VLR-F) or FPMN (if towards the Signaling Gateway) GT of the Signaling Gateway; while the secondary DPC is the SPC corresponding to the HPMN (if towards VLR-F) or FPMN (if towards the Signaling Gateway) GT of the other gateway. In the event of the targeted gateway going down, the second gateway communicates with the originating global title using the global title of the first gateway.

Figure 18:
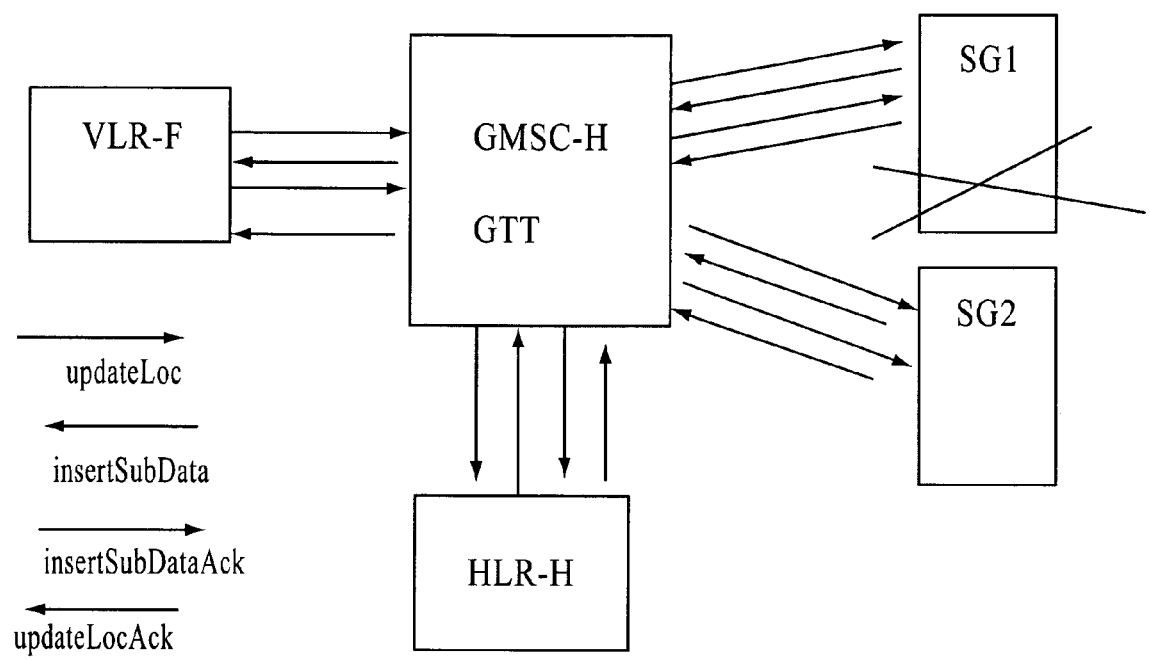
FIG. 18 is a block diagram of a configuration showing Update Location Transaction flow upon SG1 failure.

For example, with reference to FIG. 18, on receiving the VLR-F's Ack to insertSubData from HPMN GT1 of the SPC1 Signaling Gateway, GMSC-H switches over to the SPC2 of the Signaling Gateway when SPC1 fails. SPC2 assumes HPMN GT1 as the calling GT when sending Ack to updateloc to VLR-F since VLR-F will only accept the updateLoc Ack if the calling GT is the same one as before in the transaction.

The routing of messages on GT of a Signaling Gateway is not based on active/active set up but on active/standby setup. This is because the current transaction context is first established at the chosen Signaling Gateway when messages are routed through the gateway based on MGT and MSISDN-F. Even if each gateway copies the transaction context as fast as it can over 100 Mbps Ethernet, it might not be as fast as the messages routed on GT of a Signaling Gateway (which could be milliseconds). This could create a racing condition (similar to the ISUP signaling). When the original gateway is not chosen on the current transaction context, the still-alive gateway takes longer to load the data from the shared memory.

Therefore even in the case of full fail-over support, the transaction still goes back to the originally chosen gateway as long as it is possible to avoid shared DB server access. This makes it particularly efficient for some signaling flows (e.g. SRI messaging). For cases where the switchover cannot be avoided, the extra overhead introduced is still efficient enough for fail-over handling.

In the event of a failure of the targeted gateway, the second gateway takes over in a full fail-over support. The second gateway loads the latest data from the shared DB server. In the partial fail-over support case, the transaction is simply dropped, an a new call by the original calling SCCP entity is issued.

In general, stand-alone transactions (e.g. PurgeMS, non-framed insertSubdData etc) on the GT of a Signaling Gateway as CdPA do not need to go back to the gateway, since the context from the gateway will have already been copied to the shared DB server. However since the chosen GT in CdPA of stand-alone transactions is usually the result of a load-sharing transaction based on MGT and MSISDN-F as CdPA (e.g. updateLoc), the stand-alone transactions towards a particular Signaling Gateway will effectively be load-balanced.

It is possible to always set the GT of the Signaling Gateway in the MAP content as a common GT between 2 Signaling Gateways in the case of full fail-over support. This would require each gateway to be associated with both a distinguishing GT and a common GT. While either gateway will have the same GT in the MAP context, the calling party or called party is the distinguishing GT of the gateway for the new transaction initiated by the Signaling Gateway. For example, when the chosen Signaling Gateway, say GT1, relays the updateLoc messages to a HLR-H, the calling GT will be GT1 but the VLR content in the message is replaced by the common GT, GT0. This approach should achieve slightly better load-balancing than the approach of a distinguishing GT in the MAP content for stand-alone MAP transactions. However as mentioned before, since the set of GTs of stand-alone transactions in CdPA is usually the result of evenly distributed transactions on MGT and MSISDN-F, the final distribution is still fairly even. The common GT is thus not necessary.

The GTT configuration at GMSC-H does not require translation from a global title into another global title. The translation capability from a global title to a SPC is sufficient. The GTT configurations does not assume any new translation type. Only translation type 0 is used.

Restating the previous definitions of full fail-over and partial fail-over support, a full fail-over support for a service type (e.g. MAP or ISUP) is defined as no interruption of current services of the service type as long as one of the (two or N) physical gateways is alive. A partial fail-over support for a service type is defined as possible interruption of the current services of the service type when the gateway initially chosen to handle the service fails, while new services of the service type are handled by the still-live gateway(s).

For example, if location-update fails as a result of a Signaling Gateway failure, the MS/VLR can do a retry which will be handled correctly by the still-alive Signaling Gateway. Similarly for SMS, if the MT-SMS fails as a result of a Signaling Gateway failure, the SMSC-X can initiate another transaction (SRI-SM followed by MT-SMS) which can then be taken over by the still-alive gateway.

For ISUP loopback calls, when a Signaling Gateway fails, with partial fail-over support, the call simply gets dropped. New ISUP loopback calls can be handled by the still-alive gateway.

If IN architecture is used, when a Signaling Gateway fails, with partial fail-over support, the call simply gets dropped. New InitialDP requests can be handled by the still-alive gateway.

By using the shared memory and shared DB architecture between load-balancing gateways, the Signaling Gateway function is also able to support full fail-over depending on the racing conditions. However due to the possibility of racing conditions, the following are recommended:

Partial fail-over support for ISUP loopback call;
Partial fail-over support for MAP transactions; and
Primary and standby DB servers with replication.

This means that copying of memory data records from the Signaling Gateway function to the database server will not be necessary in the case of partial fail-over support. In one embodiment, this copying is an option for the case of full fail-over support.

Even in the case of partial fail-over support, at the end/completion of a transaction involving data of a persistent nature (e.g. roaming information, CDR etc.) in a Signaling Gateway, the data is saved into the shared DB server. This means that at a later stage where a transaction is initiated by a VLR-F (e.g. SS registration, SendAuthentication etc) or by a HPMN HLR (e.g. PRN query, FSMS etc), even the Signaling Gateway stored in these registers failed, based on the standby configuration of GTT, the still alive gateway can still handle the transaction by using the shared DB server(s).

For example, if a MIMM subscriber MSISDN-H is called when he is registered at FPMN, the HPMN HLR will query the stored Signaling Gateway (since it is the VLR-F to the HLR). If the gateway fails for any reason, the still alive gateway can still access the shared DB server(s) to locate the real VLR-F to get the MSRN information. For SMS to MSISDN-H of a MIMM subscriber at FPMN, the HPMN HLR will return the stored Signaling Gateway as VMSC/SGSN where it will receive the forwarded SMS from the SMSC. If the stored gateway fails for any reason, the still alive gateway can still use the shared DB server(s) to handle SMS forwarding.

As another example, if a MIMM subscriber performs a SS operation when he is registered at FPMN, the FPMN VLR-F will query the stored Signaling Gateway (since it is the HLR to the VLR-F). If the gateway fails for any reason, the still alive gateway can still access the shared DB server(s) to handle the transaction.

Therefore partial fail-over really means ongoing transactions will not be handled when the Signaling Gateway that was processing it fails. However for completed transactions, full fail-over is supported. Data server redundancy is assumed here.

Referring again to FIG. 3, in addition to the signal board redundancy across both gateways, it is also possible to have board redundancy within each gateway. Each gateway can host one board per PCI slot. Up to six boards are possible with the Sun Fire™ V-480 family. Each board can distribute messages to a pool of user part application instances in a round robin load-sharing and fail-safe mode. Whenever an instance fails, the watch dog restarts the instance. There is also a UNIX™ cron that oversees the watch dog and re-starts the watch dog when it dies. The watch dog periodically monitors app instances. When an application instance fails, it is automatically removed from the configuration, and further traffic is processed by other application instances. After the application instance is automatically restarted, the application instance can be re-integrated in the platform, without interrupting traffic. Similarly, new application instances, CPU, memory, and SS7 board(s) can be added as capacity requirements increase.

When all application instances for any SS7 application protocol die, the watch dog kills the SS7 stack on each DK board before it kills all application instances of any SS7 application protocol. This forces the GSMC-H to apply SS7-based switchover. The watch dog then re-starts all application instances of all SS7 application protocols before re-starting the SS7 stack on each DK card. This whole process may take a couple of minutes. If an instance is not dead, but fails to properly handle the SS7 messages intended for it, the DK board will not be able to distribute its messages. Buffers (e.g., 64 k bytes) will overflow within approximately ten seconds. All links are eventually brought down very quickly. The other Signaling Gateway is then automatically switched over by the GSMC-H in this case.

Figure 19:
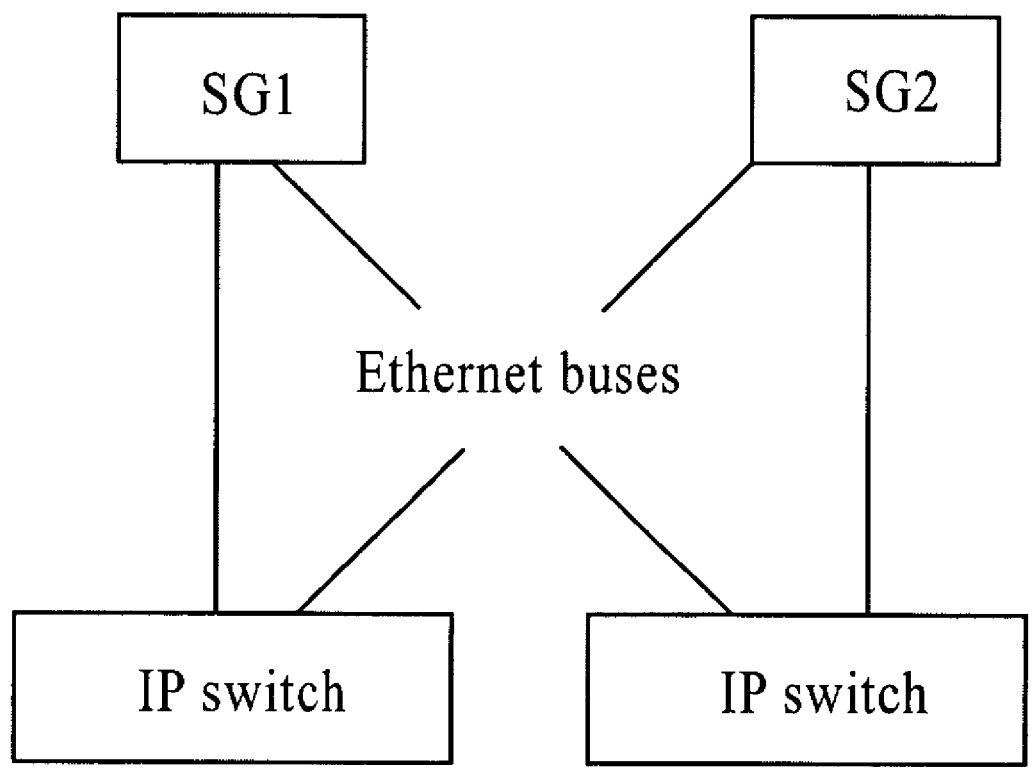
FIG. 19 is a block diagram of a Signaling Gateway embodiment including two Ethernet buses.

To deal with potential Ethernet failure, two Ethernet buses can be configured as shown in FIG. 19. Each machine can have two IP addresses connected to the different segments of a LAN. Under normal operation, traffic is shared between them. If one fails, all traffic is routed onto the remaining Ethernet. The Ethernet buses are also preferably configured in a cross-connect manner with HPMN's IP switches.

In normal operation, all components of the Signaling Gateway function share traffic. This provides major advantages over the "standby" approach, in which spare components stand idle until primary components fail. For example, the spare capacity configured into a platform can be used to handle traffic during peak traffic periods. In addition, when all the components are functioning, their health can be monitored. On the other hand, when spare components stand idle, monitoring and preventive maintenance may not occur.

Each gateway also functions as a VLR-F to HLR-H and HLR-H to VLR-F. In the event of both servers going down, and records becoming corrupted in the signaling gateway, the information is rebuilt using stored information in the signaling gateways, HLR and VLR, using GSM MAP messages. In particular, the Signaling Gateways perform a periodic tape-drive backup.

Unlike a HLR or a VLR whose corruption or loss of data will only trigger either a HLR restoration or a VLR restoration but not both, the corruption or loss of Signaling Gateway data will trigger restoration at both locations. Restoration begins with a restart. After restoring from backup, all affected IMSI records set the purged flag and initiate reset-VLR MAP messages to the list of VLR-Fs recorded by the backup. Normal updateLocation procedures will be triggered by the VLR-F to automatically establish roaming data in the gateways. However, providing a roaming number from HLR-H to a Signaling Gateway, forwarding an SMS to the Signaling Gateway, or SRI/SRI-SM on MSISDN-F, will not trigger MAP-Restore-Data by the Signaling Gateway to the HLR-H, or MAP-reset to a VLR-F. These messages will be mapped by the Signaling Gateway function to the real destinations VLR-F/VMSC-F/SGSN-F, which can then initiate a restore data process.

In addition, the requirements of optimal routing of Late-Call-Forwarding require maintenance of state information (mapping between FTN and temporary FTN). Hence, the in-memory information is shared across the different application servers by copying the data into the shared DB server.

Logistics

In one embodiment, the following logistical arrangements between the HPMN and FPMN are implemented in the deployment of the MIMM service.

FPMN reserves one or more sequential blocks of FPMN MSISDN-F and IMSI-F to be used by HPMN for MIMM subscribers. MIMM service subscribers change their SIM cards. The HPMN IMSI-H does not need to be in a special range. The MIMM subscribers can still keep their old IMSI-H if they wish. The MIMM subscribers do not need to change their phone number's MSISDN-H.

GMSC-F is configured to route IMSI-F based MGT(s) (E.214 Numbering Plan) and MSISDN-F based Global Titles (GT based on E.164 Numbering Plan) to the Signaling Gateway. If the Signaling Gateway is hosted at HPMN, the MGT-F or MSISDN-F based routing to GMSC-H can use either leased line (if the leased line option is required for routing MGT-H and MGT-F messages), or global title modification or translation types. The GMSC-F/STP-F/GTT is configured to generate a MAP Send Routing Info (SRI) message on receiving an ISUP with MSISDN-F as the called number/address. In essence, the Signaling Gateway acts like a HLR to the MSISDN-F and IMSI-F for FPMN.

Depending on where the Signaling Gateway is hosted, the hosting PMN reserves four unique PMN GTs and one SPC for each Signaling Gateway. If the Signaling Gateway is hosted at HPMN, HPMN should also reserve four unique FPMN GTs for each Signaling Gateway for each FPMN supported in case the FPMN GT option is set. This is to ensure that the Signaling Gateway can imitate as a roamer network element. HPMN needs to provide also a common Signaling Point Code for all Signaling Gateways and map several Sub System Numbers—SSN—(e.g. 6, 7, 8 etc) to each Signaling Gateway. The number four is chosen to represent HLR/SCP, VLR, VMSC/SGSN/SSP, GMSC/SMSC/SSP. For each type of GT, the Signaling Gateway will append about four digits to create a pool of GTs to be dynamically assigned to corresponding network elements. This dynamic assignment is to avoid maintaining state information about VLR/VMSC and HLR in current and future transactions.

GMSC-H defines routes for all SCCP (MAP) messages having CdPA as the GTs assigned above, MSISDN-F, MGT-H and MGT-F corresponding to reserved IMSI-F range to a Signaling Gateways.

FPMN provides a pool of MSISDN-F numbers to HPMN. These numbers are used to route calls through the leased line between FPMN and HPMN in late call forwarding and call rerouting for MIMM subscribers.

GMSC-F is configured to route calls on this pool of MSISDN-F towards GMSC-H through the leased line.

GMSC-H is configured to route calls on this pool using ISUP loopback circuits or IN architecture with signaling through a Signaling Gateway.

GMSC-H is configured to route calls over the leased line for called numbers that belong to FPMN. GMSC-H is further configured in a primary and secondary mode such that if the leased line is down, the call routing can still proceed over normal ISC providers.

HPMN also provides a pool of MSISDN-H. This pool is used by a Signaling Gateway to control call-rerouting towards FPMN. GMSC-H routes all calls on this pool using loopback circuits with signaling through a signaling gateway.

GMSC-H configures IN signaling or ISUP loopback circuits which are used on routing all pools of numbers via ISUP loopback or INAP IDP.

If IN architecture is deployed, then IN triggers is defined at the GMSC-H to send InitialDP to the Signaling Gateway In HPMN, for GT corresponding to FPMN the message is routed to GMSC-F through leased line. On the FPMN side, if the GT is that of a Signaling Gateway, the message is routed via the leased line. This is not necessary if the requirement of not changing normal ISC routing supersedes this requirement. This is applicable only if the leased line option is to be applied to all messages.

FPMN assigns a SPC representing GMSC-H. All messages towards this SPC go over the leased line. HPMN also assigns a SPC representing GMSC-F. All messages towards this SPC also go over the leased line.

If existing ISC providers to be used for MAP signaling on CdPA=MSISDN-F/MGT-F, GMSC-F configures GTT on CdPA=MSISDN-F/MGT-F in SCCP routing to set the next SCCP destination node to the ISC providers. The ISC providers configure their GTT on CdPA=MSISDN-F/MGT-F to finally route to the GMSC-H which routes the messages to a signal gateways.

Alternatively, GMSC-F/STP-F configures its GTT in such a way that for CdPA=MSSDN-F/MGT-F translates it to CdPA=HPMN-Common-GT-of-Signal-GW. The HPMN network should be able to assign a common GT to both signal gateways. It is just used logically in the translation to the common SPC of both signal gateways.

If the leased line is to be used for MAP signaling on CdPA=MSISDN-F/MGT-F, GMSC-F configures GTT on CdPA=MSISDN-F/MGT-F in SCCP routing to set the next SCCP destination node to the FPMN SPC that corresponds to the GMSC-H over the leased line ISC is required to carry signaling and voice traffic between the HPMN and FPMN. ISC STP for each side of the participating operators of the Multiple MSISDN service is configured to route GT on FPMN numbers (including ported-in numbers) towards the HPMN Signaling Gateway. SS7 variant translation (including ISUP and MAP) is performed by a conversion function.

HPMN assigns a special SMSC address SMSC-S-H to MIMM subscribers. This address is the SMSC address in the SIM when IMSI-F is used to register with a network. It is the same for all FPMNs or IMSI-Fs.

The GMSC-H/STP-H GTT translates SMSC-S-H to the SPC of a signal gateway

If IW-MSC is not same as GMSC-F, then IW-MSC is configured to route messages (in particular MAP SRI SM) to GMSC-F that in turn routes messages to GMSC-H through leased line.

Roamer Information

Based on the messages that get routed via the Signaling Gateway, various pieces of roamer information are extracted and maintained. Table 1 below lists roamer information elements extracted and maintained by the Signaling Gateway in the following scenarios. "XPMN" is used herein to denote any VPMN other than the HPMN.

TABLE 1

| MAP MESSAGE | Information Elements Extracted |
| --- | --- |
| Update Location | IMSI, Serving MSC Address, Current VLR Address, LMSI |
| Insert Subscriber Data | IMSI, MSISDN-H, Forwarding Number Information |
| Update Location Response and Insert Subscriber Data Response | Error messages, if any |
| SRI for Short Message | Inter-working MSC address |

Based on the logistics and roamer information above, we shall now consider the following GSM scenarios in detail:

Update Location and Insert Subscriber Data between HPMN, FPMN and VPMN;

Mobile Originated Calls from MIMM subscriber in HPMN, FPMN and VPMN;

Mobile Terminated Calls to MIMM subscriber in HPMN, FPMN and VPMN when called on MSISDN-H;

Mobile Terminated Calls to MIMM subscriber in HPMN, FPMN and VPMN when called on MSISDN-F;

Unconditional Call Forwarding with IMSI detached for subscriber registered with IMSI-H and IMSI-F;

Conditional Call Forwarding with IMSI attached for subscriber in HPMN, FPMN and VPMN;

Mobile Terminated SMS to MSISDN-H when MIMM subscriber has IMSI-H;

Mobile Terminated SMS to MSISDN-H when MIMM subscriber has IMSI-F;

Mobile Terminated SMS to MSISDN-F when MIMM subscriber has IMSI-H;

Mobile Terminated SMS to MSISDN-F when MIMM subscriber has IMSI-F;

Mobile Originated SMS from MIMM subscriber in HPMN, FPMN and VPMN; and

SMS Redelivery Management.

Location Update: MIMM Subscriber in HPMN or XPMN with IMSI-H

When IMSI-H is used to register with any network (HPMN or XPMN), normal signaling takes place. The signal gateway is not involved at all.

Location Update: MIMM Subscriber in FPMN with IMSI-F

Figure 20:
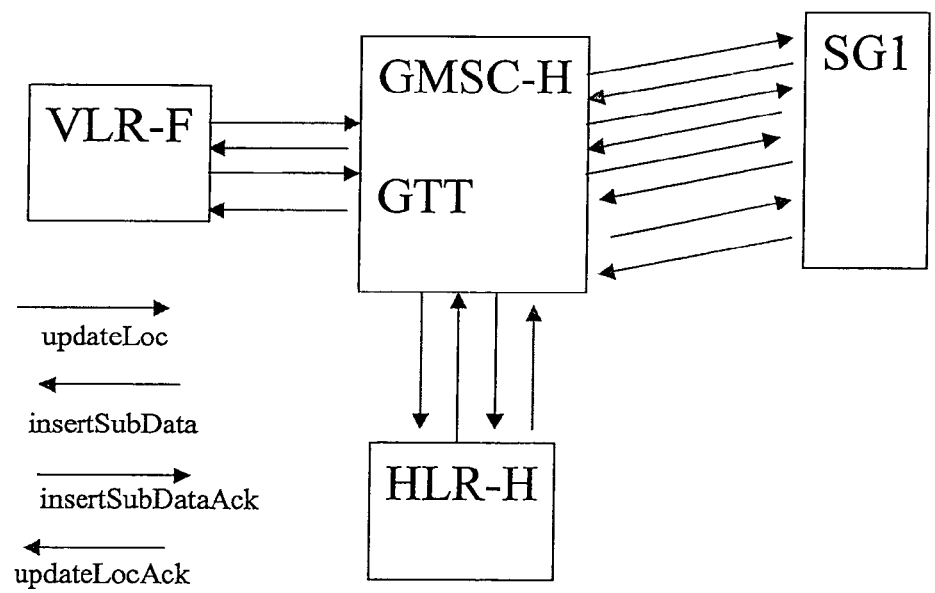
FIG. 20 is a block diagram of a configuration showing the flow of Update Location Transaction without SG failure.

Assuming the MIMM subscriber can register with FPMN using IMSI-F. FIG. 20 illustrates a general flow of update location transaction without failure. A signal gateway is involved in all directions of MAP messages. We omit GMSC-F for simplicity. We also assume HPMN hosts the signal gateway.

VMSC/VLR-F initiates MAP Update Location message by deriving MGT-F (E.214) based on IMSI-F. Due to routing defined at FPMN for this MGT-F, the message is routed to GMSC-H, which in turn routes it to the Signaling Gateway. On receipt of Update location, the Signaling Gateway carries out the transformation as shown in Table 2 below.

TABLE 2

| Update Location from VLR-F | | Message from Signaling Gateway1 to HLR1 | |
|---|---|---|---|
| SCCP Called Address: | | SCCP Called Address: | |
| GT: | MGT-F | GT: | HLR1-H |
| SSN: | 6 | SSN: | 6 |
| TT: | 0 | TT: | 0 |
| SCCP Calling Address: | | SCCP Calling Address: | |
| GT: | VLR-F | GT: | SG1-VLR-F |
| SSN: | 7 | SSN: | 7 |
| TT: | 0 | TT: | 0 |
| MAP level parameters: | | MAP level parameters: | |
| IMSI: | IMSI-F | IMSI: | IMSI-H |
| MSC address | VMSC-F | MSC address: | SG1-VMSC-F |
| VLR address | VLR-F | VLR address: | SG1-VLR-F |

Where SG1-VLR-F and SG1-VMSC-F represent the GT of the physically chosen Signaling Gateway (SG1) that corresponds to the VLR-F and VMSC-F. Thus, in HLR, a Signaling Gateway GT is stored as MSC and VLR address instead of the actual addresses. This ensures that all MAP INSERT SUBSCRIBER DATA messages pass through the Signaling Gateway, and hence its contents can be modified appropriately (for example, the MSISDN-H can be changed to MSISDN-F apart from performing routing level address changes). It also allows easy transaction from the signal gateway GTs to the real VMSC/VLR address by looking at the dynamic assignment pool as mentioned in the logistics.

Note that SG1-VLR-F and SG1-VMSC-F could be a HPMN GT or a FPMN GT reserved for the signal gateway. This is because HPMN HLR procedure could be based on subscriber network location. For example, Barring for outgoing calls while roaming will become simply Barring for all outgoing calls to the VLR in the roaming network. If SG GT were a HPMN GT, then the HLR might still think the roamer is not roaming. Another example is sometimes call forwarding and call barring services registration may be not allowed while roaming. This problem will not arise if the signal gateway is hosted at FPMN since the signal gateway will be a roaming network element to HPMN in this case.

To support the general case, one configuration option enables FPMN GT support for the signal gateway function per FPMN.

However, since SMS will be forwarded to wherever HLR-H indicates when it is queried by SRI-SM(MSISDN-H), then when the MIMM subscriber registers at a FPMN, the signal gateway can choose one of the following three options.

a) present HPMN GT to a HPMN HLR for VMSC imitations;
b) present FPMN GT to a HPMN HLR for VMSC imitations in which case, the FPMN STP is configured to translate the FPMN GT in CdPA to the common HPMN GT of the signal gateway; or
c) pass GT of VMSC-F transparently to HPMN HLR without any change.

Lets now look at MAP InsertSubscriberData. The message must come back through the Signaling Gateway so MSISDN-H can be modified to MSISDN-F, as shown in Table 3.

TABLE 3

| Insert Subscriber Data from HLR-H | | Message from Signaling Gateway to VLR-F via GMSC-H | |
|---|---|---|---|
| SCCP Called Address: | | SCCP Called Address: | |
| GT: | SG1-VLR-F | GT: | VLR-F |
| SSN: | 7 | SSN: | 7 |
| TT: | 0 | TT: | 0 |
| SCCP Calling Address: | | SCCP Calling Address: | |
| GT: | HLR1-H | GT: | SG1-HLR1-H |
| SSN: | 6 | SSN: | 6 |
| TT: | 0 | TT: | 0 |
| MAP level parameters: | | MAP level parameters: | |
| MSISDN: | MSISDN-H | MSISDN: | MSISDN-F |
| FTN: | FTN | FTN: | SG1-FTN |

The message is routed to the FPMN VLR. SCCP Calling Party Address is replaced with the Signaling Gateway GT. This guarantees that when the reply for this message is sent, GMSC-H can route it to the Signaling Gateway.

Figure 21:
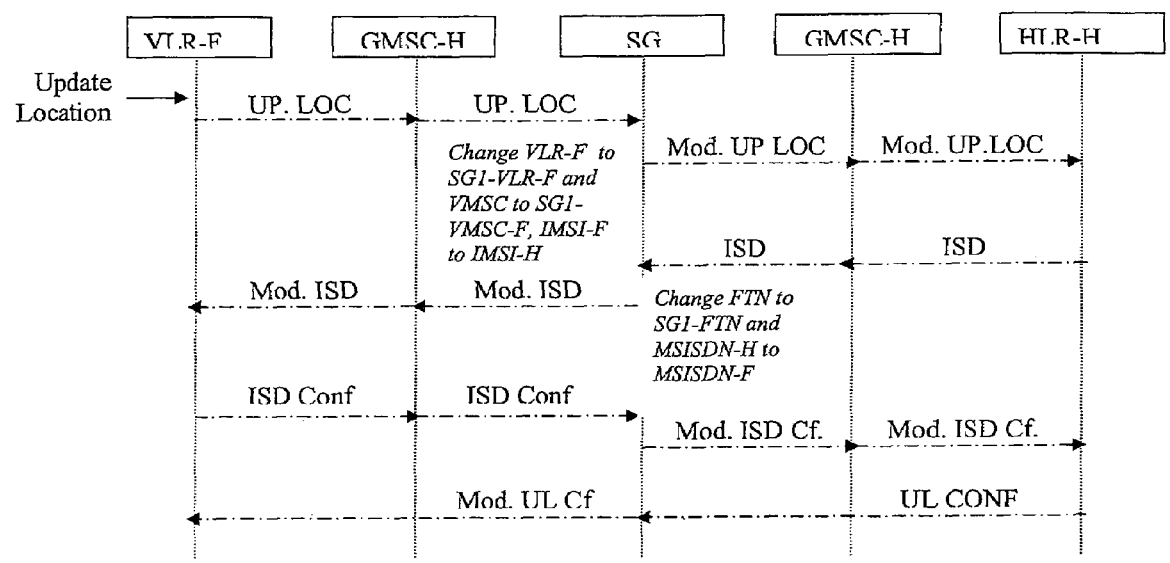
FIG. 21 is an illustration of an Update Location flow of one embodiment.

If the Forward-To-Numbers present in the Insert Subscriber Data are not of the FPMN country (as described in more detail below) then they can also be modified as per policy defined for the particular FPMN. The various mechanisms for handling LCF are described in the logistics and Conditional Call Forwarding section of this document. An Update Location flow is shown in FIG. 21.

With brief reference again to FIG. 18, the flow when SG1 fails after insertSubData is shown. In this case, GMSC-H via its GTT will switch over to SG2 in the full fail-over case. This will not be supported in the partial fail-over case.

TABLE 4

| ISD ack from VLR-F | | Message from SG2 to HLR1 | |
|---|---|---|---|
| SCCP Called Address: | | SCCP Called Address: | |
| GT: | SG1-HLR1-H | GT: | HLR1-H |
| SSN: | 6 | SSN: | 6 |
| TT: | 0 | TT: | 0 |
| SCCP Calling Address: | | SCCP Calling Address: | |
| GT: | VLR-F | GT: | SG1-VLR-F |
| SSN: | 7 | SSN: | 7 |
| TT: | 0 | TT: | 0 |

As shown in Tables 4 and 5, SG2 will continue the transaction from the context loaded from the shared memory data of the DB server which was copied by SG1 each time its memory data record has changed. From the context, SG2 will still use the SG1-HLR1-H and SG1-VLR-F GT in communicating back with HLR1-H and VLR-F. UpdateLoc Ack proceeds from HLR1-H to SG1-VLR-F and SG1-HLR1-H to VLR-F as if nothing happened to SG1 although the physical gateway to handle the transaction now is really associated with SG2.

TABLE 5

| Update LOC ack from HLR-H | | Message from SG2 to VLR-F via GMSC-H | |
|---|---|---|---|
| SCCP Called Address: | | SCCP Called Address: | |
| GT: | SG1-VLR-F | GT: | VLR-F |
| SSN: | 7 | SSN: | 7 |
| TT: | 0 | TT: | 0 |

TABLE 5-continued

| Update LOC ack from HLR-H | | Message from SG2 to VLR-F via GMSC-H | |
| --- | --- | --- | --- |
| SCCP Calling Address: | | SCCP Calling Address: | |
| GT: | HLR1-H | GT: | SG1-HLR1-H |
| SSN: | 6 | SSN: | 6 |
| TT: | 0 | TT: | 0 |

Figure 22:
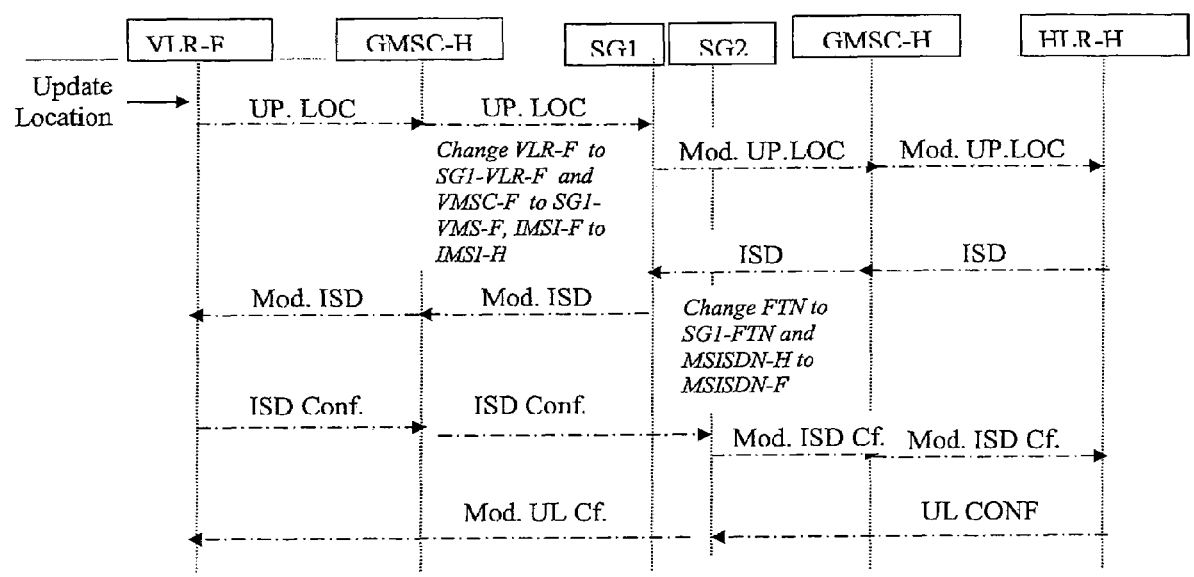
FIG. 22 is an illustration of message flow in the event of SG1 failure in one embodiment.

The message flow in the event of SG1 failure is depicted in FIG. 22.

After a successful location update transaction, the context is removed from the memory after roamer information is extract into roamer DB.

One reason that a signal gateway which physically associated with GT, such as SG1-X, is chosen is that this ensures the transaction (particularly the current transaction) will go back to the same physical node to distribute the load and more importantly to access the memory context of the physical node since replication across the other physical node is going to take time. When a physical node fails during the current transaction, the still-alive physical node might fail some transactions. However new transactions will succeed.

Location Update: MIMM Subscriber in XPMN with IMSI-F

The VMSC/VLR-V generates MGT-F based on IMSI-F in MAP Update Location message. The message is always routed to GMSC-F first. If FPMN is the hosting network for the signal gateway, then the message is redirected by GMSC-F to the signal gateway which will then send the modified message to HPMN. If HPMN is the hosting network for the signal gateway, the message is redirected by GMSC-F to GMSC-H which then routes the message to a Signaling Gateway which will then send the modified message to HLR-H.

Here we assume the operator allows IMSI-F to be used in a third operator, for example to pool roaming relationships of IMSI-F and IMSI-H (e.g. to achieve extended national roaming and international roaming coverage for HPMN subscribers). The operator can limit the application to national roaming only or in FPMN network. This is controlled by the Forbidden XPMN table.

The Forbidden XPMN Table 6 consists of records involving IMSI-prefix, country and VPMN prefixes. For example, if HPMN can get discount for one specific IMSI range from FPMN, this range will not register with any operators other than FPMN in the same country as FPMN. For example, if Optus is the HPMN, and Singtel is the FPMN, Optus can restrict the MIMM subscribers to use Singtel IMSI when in Singapore to avoid registering with StarHub or M1. The IMSI range is a prefix and can also indicate whether IMSI-F is allowed or not in a country (e.g. where IMSI-H has a roaming relationship with an operator there).

TABLE 6

| Logical Table: Forbidden XPMN | | |
| --- | --- | --- |
| IMSI-prefix | Country | VLR-prefix |

The Signaling Gateway checks if the user is allowed to roam in VPMN/VLR. If the user is not allowed to roam in this VPMN/VLR (in a country with FPMN, for example) with the corresponding IMSI, the Update Location request will be rejected and not forwarded or responded to. The Signaling Gateway can also have a flexible logic to accept initially rejected VPMN/VLR based on retry attempts and interval between attempts.

Note that the Forbidden XPMN table can even be applied to FPMN network with IMSI-F depending on operator requirements. For example, if the goal is simply to use IMSI-F only when there is no roaming relationship in a coverage (whether it is nationally or internationally), then even if the subscriber is in the country of FPMN, as long as there is already a roaming relationship in a national coverage with IMSI-H, the IMSI-F might be forbidden. For example, an Optus MIMM subscriber visiting Singapore could be restricted to use IMSI-H (or Optus IMSI). On the other hand, when the Optus MIMM subscriber is in a Telstra coverage area where Optus has no coverage, Singtel IMSI (or IMSI-F) can then be used. The Forbidden XPMN tables controls all these different conditions.

If the user is allowed to roam in this VPMN (in a country with HPMN, for example, to extend national roaming coverage) with IMSI-F, the Signaling Gateway will process the message as if MIMM subscriber is registering at a FPMN network with IMSI-F. That is, MSISDN-F will be used at the VLR-V and there will be SG1-VMSC-V and SG1-VLR-V corresponding to the real VMSC-V and VLR-V respectively.

Figure 23:
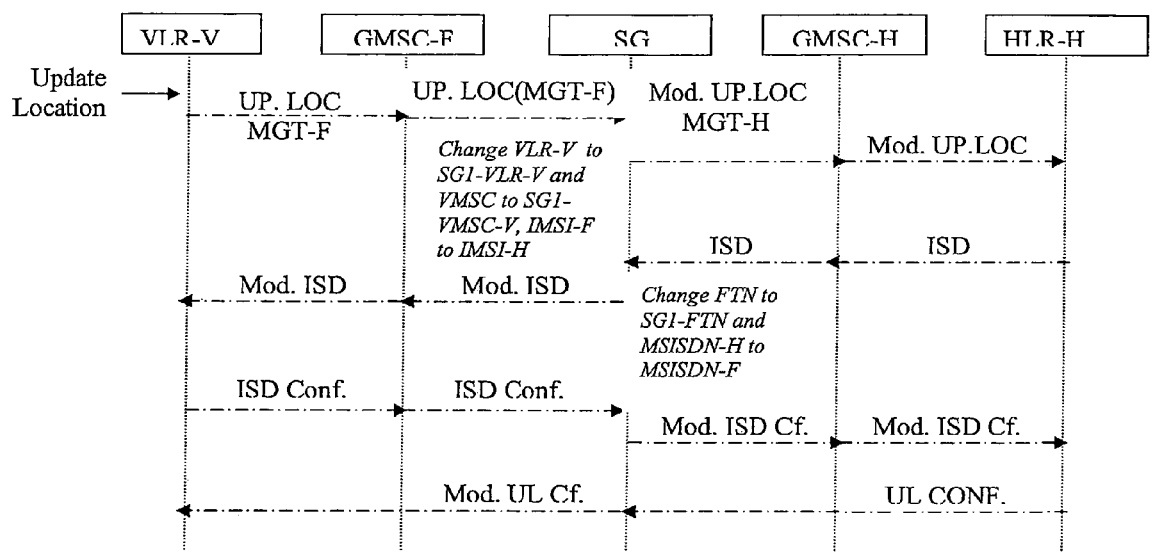
FIG. 23 is a signaling flow for the case of a location update (MIMM subscriber in XPMN with IMSI-F) with the Signaling Gateway being hosted at FPMN.

If SG is hosted at FPMN, then the signaling flow is as shown in FIG. 23.

Figure 24:
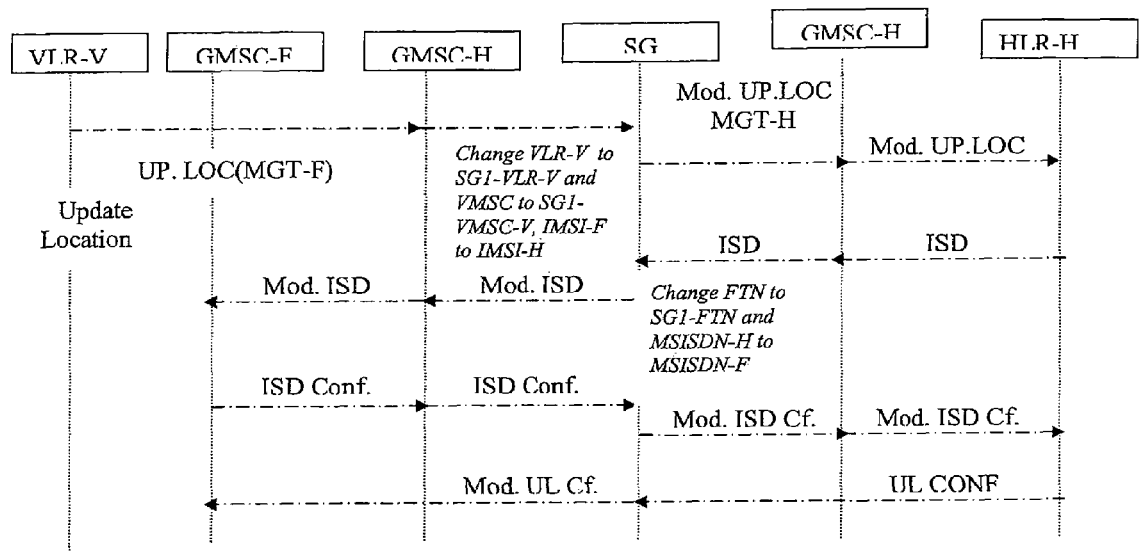
FIG. 24 is a signaling flow for the case of a location update (MIMM subscriber in XPMN with IMSI-F) with the Signaling Gateway being hosted at HPMN.

If SG is hosted at HPMN, then the signaling flow is as shown in FIG. 24.

Mobile Originated Calls: MIMM Subscriber in HPMN

There is no change in normal GSM procedures in this scenario.

Mobile Originated Calls: MIMM Subscriber in FPMN

The MAP INSERT SUBSCRIBER DATA message that was sent from HLR to VLR-F via the Signaling Gateway was modified to have MSISDN-F as the caller Id. Thus, all calls and SMS that originate in FPMN will send MSISDN-F as CLI.

In order to make best utilization of the leased line, if possible, GMSC-F should be configured to route calls to HPMN via the leased line. The routing criteria could be based on caller IMSI range and destination number in HPMN. Additionally, it is possible to configure the system such that if the Caller ID is guaranteed over the leased line and the destination number is a HPMN country number, the SS7 converter of an ISC carrier can change the CLI from MSISDN-F to MSISDN-H during ISUP variant conversions between FPMN and HPMN. This provides the subscriber the privacy they may desire in not letting people know that they are roaming in FPMN. Perhaps more importantly, the HPMN recipients can recognize who called since they are more familiar with the HPMN numbers.

For general cases, this requires the both HPMN and FPMN support Camel and the subscriber has O-CSI. The gsmSCF address of the O-CSI will be the GT of the Signaling Gateway. The O-CSI need only be loaded when the subscriber registered with FPMN. In this way, every time, the subscriber at FPMN makes a call, the O-CSI trigger issues InitialDP to the Signaling Gateway which checks against the destination number and issues Connect with a new calling party if the caller ID need be changed to MSISDN-H. Otherwise, if the subscriber calls a FPMN number, CONTINUE will be issued.

The originating MSC will generate CDR with IMSI-F and MSISDN-F. The FPMN billing system should be able to rate these CDR in a special way (e.g. via direct CDR exchanges rather than TAP files). In case there is a Signaling Gateway outage before an Update Location, the CDR will contain MSISDN-H along with the IMSI-H. The records are rated by FPMN and sent in TAP files to HPMN in a normal way.

Mobile Originated Calls: MIMM Subscriber in FPMN: Calls to a Voicemail-F or any Other Special Number When the MIMM subscriber is in FPMN country, he can call a FPMN-F number to check home voicemail which the GMSC-F will route the call over the dedicated leasedline to the GSMC-H which can loopback the call signaling through the signal gateway function if billing by the signal gateway is desired. The signal gateway will add the corresponding voicemail number (e.g. 19xxx, in the case of CSL internal voicemail routing) to route back to the GSMC-H.

Caller ID will also be altered by the signal gateway function to MSISDN-H. If caller ID is received by the voicemail system at HPMN, only pin is asked (if set) otherwise voicemail box number is also prompted.

Similar ideas will also be applied to other special numbers (e.g. customer care, directory service etc).

Mobile Originated Calls: MIMM Subscriber in VPMN

No change in normal GSM procedures is necessary whether IMSI-F or IMSI-H is used.

Mobile Terminated Calls: MIMM Subscriber in HPMN

Calls to MSISDN-H are normally routed. The subscriber is charged local MT call charges.

Calls to MSISDN-F are routed via the leased line. GMSC-F is configured to issue or transfer a MAP SRI request towards the Signaling Gateway using MSISDN-F as SCCP Called Party Address. Note the word "transfer' used, this is to accommodate the case where the originating MSC (e.g. VMSC-F) might directly issue SRI itself although that will be routed to GMSC-F. The Signaling Gateway transforms the SRI message as shown in Table 7.

TABLE 7

| Send Routing Info from GMSC-F | | Message from Signaling Gateway to HLR-H via GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG-GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The calling address of the signal gateway should be a HPMN SG GT not a FPMN SG GT since it is imitating a HPMN GMSC in this case.

The SRI message is hence re-routed to the HLR that has information on MSISDN-H. HLR issues a MAP PRN message directed to VLR-H and gets MSRN in response. HLR returns MSRN-H in the SRI response back to the Signaling Gateway. Signaling Gateway transforms the message as shown in Table 8.

TABLE 8

| Send Routing Info Response from HLR-H | | Message from Signaling Gateway to GMSC-F via GMSC-H | |
|---|---|---|---|
| SCCP Called Address: | | SCCP Called Address: | |
| GT: | SG-GMSC-F | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG-GMSC-F |
| SSN: | 6 | SSN: | 6 |
| TT: | 0 | TT: | 0 |
| MAP level parameters: | | MAP level parameters: | |
| MSRN: | MSRN-H | MSRN: | #MSRN-H |

Here #MSRN-H is simply a notation that denotes a number whose mapping to MSRN-H is maintained in the signal gateway function. The actual number could just be that where the symbol "#" is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of the number of FPMN numbers, the actual use of a prefix for the notation #MSRN-H could be logistically challenging in cases where every VMSC (e.g. for calls originated in FPMN network) can issue SRI query (e.g. China Mobile) since there might be hundreds if not thousands of VMSCs will is configured to route the call via the leased line. The FPMN # pool approach on the other hand will cause the SRI-issuing VMSC (if not the GMSC-F itself, including those with optimal routing capability) to route the call at least to the GMSC-F for the chosen number from the pool. Only GMSC-F then needs be configured to route the call over the leased line.

Another challenge for the prefixed based approach that is not present in the pool-based approach is that it might exceed both MAP and ISUP length for a FPMN.

If VMSC-F is the SRI-issuing node, then VMSC-F will route the call to GMSC-F. GMSC-F is configured to route the call via the leased line to GMSC-H based on #MSRN-H. GMSC-H is configured to send ISUP IAM message to the Signaling Gateway based on the destination number. The voice trunks are held at GMSC-H. Signaling Gateway maps the destination number to the real MSRN and routes the call back to the GMSC-H. GMSC-H routes the call to the terminating VMSC-H.

The signaling gateway also examines the A-party number after receiving the ISUP loopback signaling from GMSC-H. If the A party number is a national number and the SRI-issuing node is a FPMN node, then if the A party has a national prefix, it is stripped before prefixing the rest of A with the international prefix of FPMN; otherwise prefixing A directly with the international prefix of FPMN. For example, assuming FPMN is China Mobile, the following modifications will be performed.

1. If the first digit of the A party is 0—the national prefix, the first digit is stripped off and the rest of A is prefixed with +86 (i.e. change address indicator to international and prefix with 86 as addressing signal digits).

2. If the first digit of the A party is 1, A is prefixed with +86 (i.e. change address indicator to international and prefix with 86 as addressing signal digits).

Figure 25:
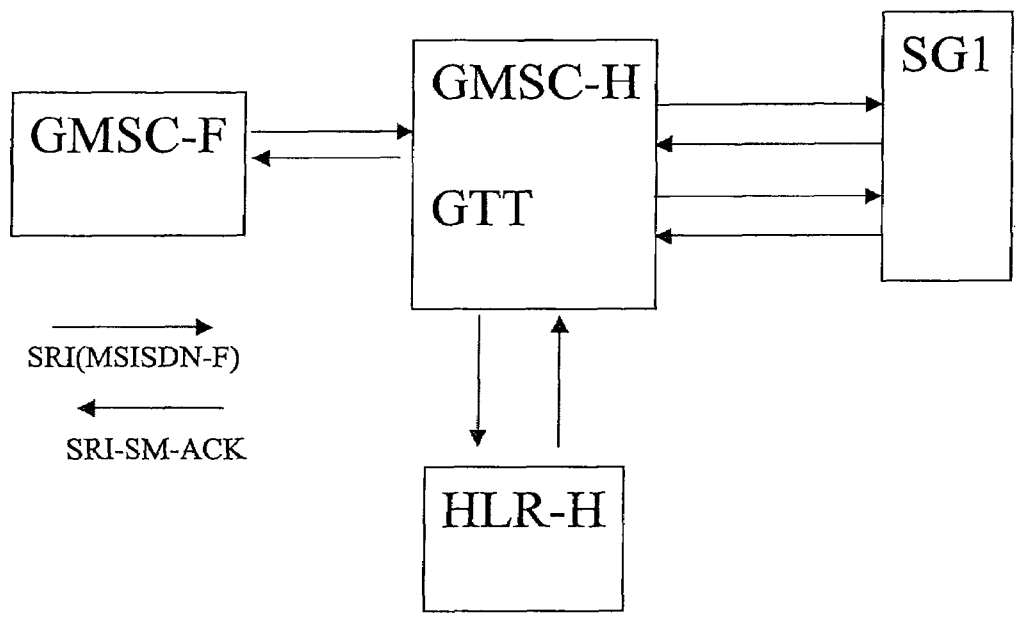
FIGS. 25 and 26 show a signaling trace for a mobile terminated call (MIMM subscriber in HPMN) for a call involving a normal flow of SRI.
Figure 26:
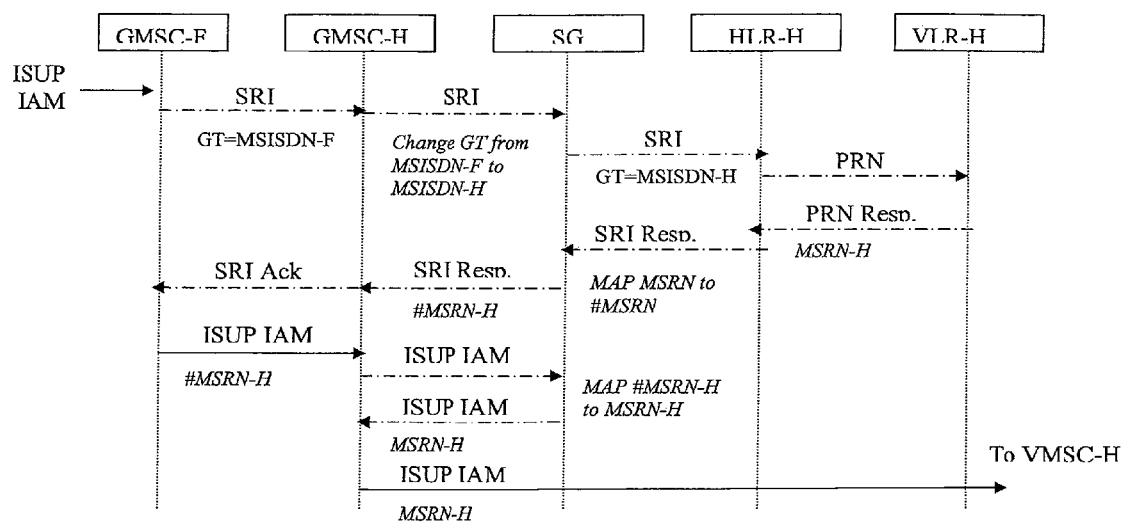

The signaling trace for the call involving a normal flow of SRI is shown in FIGS. 25 and 26. We have not tried to show signaling traces for different failure points. For example, we have not shown here the case where the signal gateway used to route ISUP signaling goes down in the middle of a call. This is described in another example. We have spread the cases of different failure points across all examples.

Figure 27:
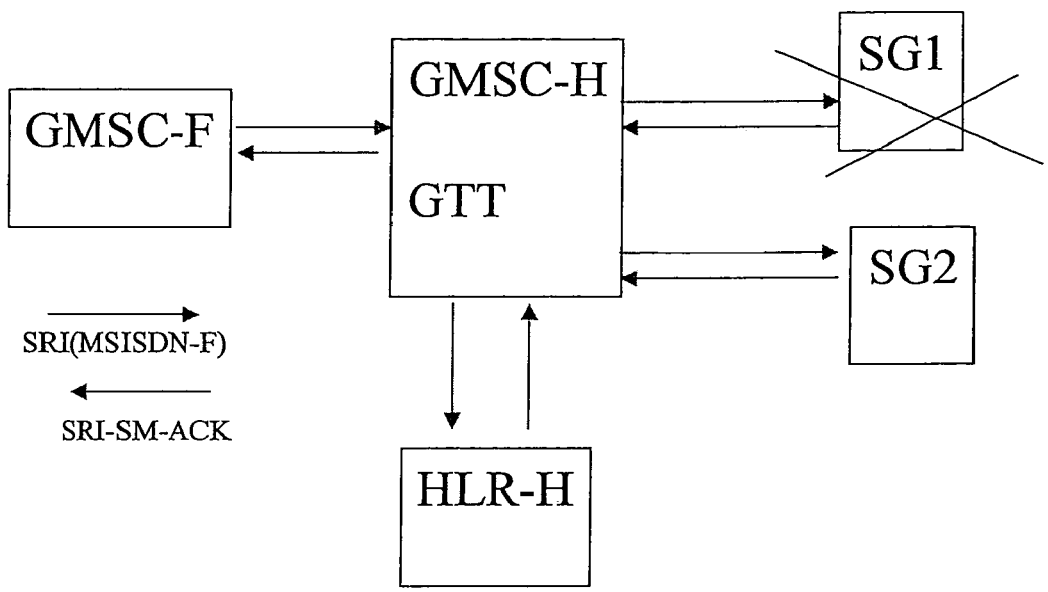
FIGS. 27 and 28 show a SRI flow when SG1 breaks down after SRI-ACK is issued from HLR-H in the case of a mobile terminated call (MIMM subscriber in HPMN).
Figure 28:
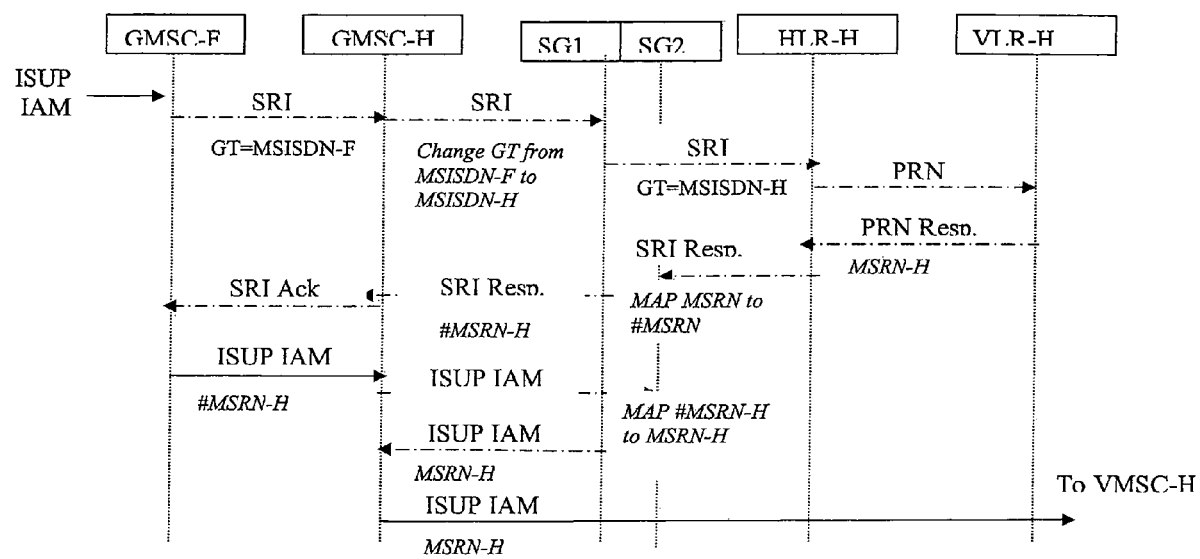

The originating MSC will generate a Mobile Originated CDR. VMSC-H will generate a MT CDR and use it to compute local air-time charges for the MIMM subscriber. GMSC-F and GMSC-H will generate additional transit CDR. Signaling Gateway will also generate CDR that will be used by the HPMN billing system in order to add special roaming re-routing charges to the MIMM subscriber's bill over and above charges computed using VMSC MT CDR. If there are multiple FPMN, it will be possible to identify which FPMN the call is originated since the CDR contains the chosen FPMN number and/or the SRI-issue VMSC-F/GMSC-F address. In addition, HPMN and FPMN may settle charges for calls routed via the leased line. FIGS. 27 and 28 depicts the SRI flow when SG1 breaks down after SRI-ACK is issued from HLR-H. The signal trace is shown in the case of full fail-over support.

However, at the end of MAP transaction before the ISUP transaction, the data (e.g. #MSRN, MSRN) associated with the MAP transaction is written to the shared DB server. There is a grace period for this data maintained in the transit in the gateway in case the ISUP loopback signaling indeed goes back to the gateway. However because the data is also shared in the DB server, the ISUP signaling can also go to the other server in which case, the data will be read from the shared DB server.

Figure 29:
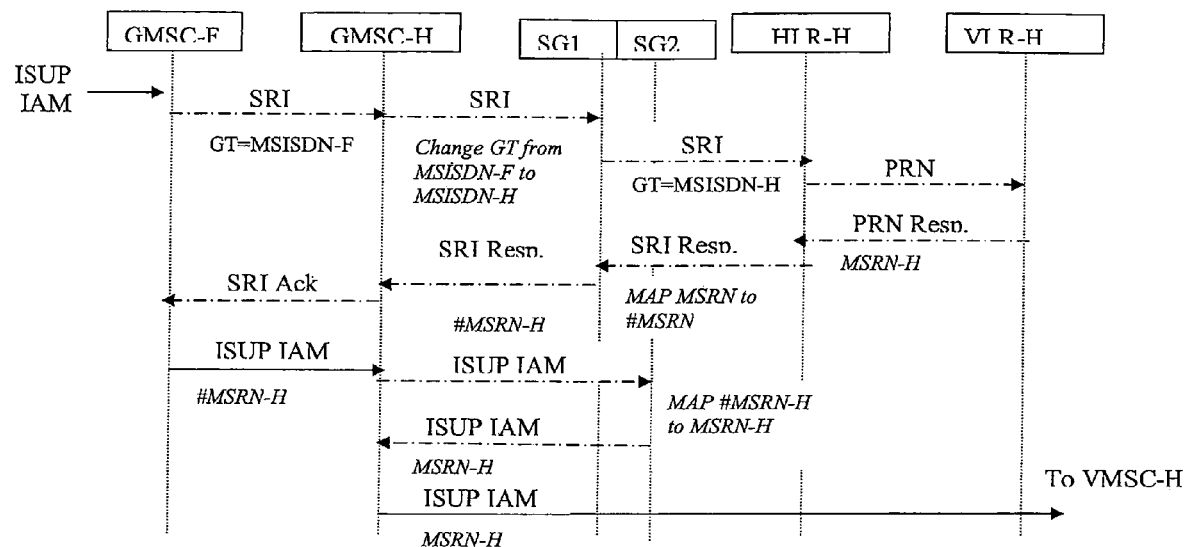
FIG. 29 shows a SRI flow when SG1 breaks down (partial fail-over) after SRI-ACK is issued from HLR-H in the case of a mobile terminated call (MIMM subscriber in HPMN).

Thus even in the case of partial fail-over, when SG1 died after completing the MAP transaction but just before the ISUP loopback case, SG2 can continue to function by reading the data (e.g. #MSRN, MSRN) from the DB server. This is illustrated in FIG. 29.

Note also that the pool of #MSRN-H is shared not split by SG1 and SG2. Besides, it is assumed MSC will route all ISUP and SCCP with called number=dedicated range of MSISDN-F and #MSRN-H to SG1/SG2.

So just to avoid doubt, the described embodiments do not send any ISUP or SCCP message with called number=same range of MSISDN-F or #MSRN-H back to MSC.

Mobile Terminated Calls: MIMM Subscriber in HPMN: Location of the Signal Gateway The use of #MSRN is introduced to control the routing between FPMN and HPMN network to save cost. Otherwise, MSRN can be used and the location of the signal gateway will not matter.

To save cost when the signal gateway is hosted in FPMN, #MSRN is also useful. Here the call on #MSRN will be routed to the GMSC-F first. The GMSC-F can then ISUP loop through the signal gateway before it goes out on MSRN. GMSC-F can be configured to route the call on HPMN MSRN over the leased line.

Mobile Terminated Calls: MIMM Subscriber in FPMN: Mobile Terminated Call on MSISDN-H Calls to MSISDN-H will be routed from GMSC-H to VMSC-F via the leased line. GMSC-H will issue a MAP SRI command to the HLR with SCCP Called Party Address as MSISDN-H. Note that during the Update Location from FPMN, the message was routed via the Signaling Gateway and the HLR contains the address of the Signaling Gateway rather than the true VLR address. Hence, the HLR issues a MAP PRN request to the Signaling Gateway. Signaling Gateway transforms the PRN as shown in Table 9.

TABLE 9

| Provide Roaming Number from HLR-H | | Message from Signaling Gateway to VLR-F via GMSC-H | |
|---|---|---|---|
| SCCP Called Address: | | SCCP Called Address: | |
| GT: | SG-VLR-F | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP-level parameters: | | MAP-level parameters: | |
| IMSI: | IMSI-H | IMSI: | IMSI-F |
| VMSC: | SG-VMSC-F | VMSC: | VMSC-F |
| MSISDN: | MSISDN-H | MSISDN: | MSISDN-F |

The message is routed to the FPMN and the Signaling Gateway modifies the PRN response as shown in Table 10.

TABLE 10

| Provide Roaming Number Response from VLR-F | | Message from Signaling Gateway to HLR-H via GMSC-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | SG-VLR-F |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Again #MSRN-F is simply a notation that denotes a number whose mapping to MSRN-F is maintained in the signal gateway function. The actual number could just be that where the symbol "#" is again a logical notation that can denote "#", "999" or some prefixes. The actual number could also be that of the pool of HPMN MSISDN-H.

While reducing the use of the number of HPMN numbers, the actual use of a prefix for the notation #MSRN-F could introduce length issues to both MAP and ISUP messages since MSRN-F is issued by the FPMN network. The HPMN # pool choice does not present length issues, but it does consume more HPMN numbers.

GMSC-H is configured to send ISUP IAM message to the Signaling Gateway based on the #MSRN-F destination number. The voice trunks are held at GMSC-H. Signaling Gateway maps the destination number to the real MSRN-F and routes the call back to the GMSC-H.

The signaling gateway also examines the A-party number after receiving the ISUP loopback signaling from GMSC-H. If the A party number is a national number and the PRN-issuing node is a HPMN node, then if the A party has a national prefix, it is stripped before prefixing the rest of A with the international prefix of HPMN; otherwise prefixing A directly with the international prefix of HPMN. For example, assuming HPMN is CSL, since there is no such thing as a national prefix, A is prefixed with +852 (i.e. change address indicator to international and prefix with 852 as addressing signal digits). This might not be necessary if GMSC-H will automatically append +852 for internationally routed calls.

GMSC-H is configured to route the call via the leased line to GMSC-F based on MSRN-F being a number in FPMN. GMSC-F then routes the call to the terminating VMSC-F.

Note that GMSC-H here did not distinguish MSRN-F generated as a result of MIMM roamers from normal roamers in FPMN. GMSC-H is configured to route all calls to FPMN numbers using the leased line. This is to increase the use of the leased line to cut down costs associated with IDD charges paid to the ISC providers.

Figure 30:
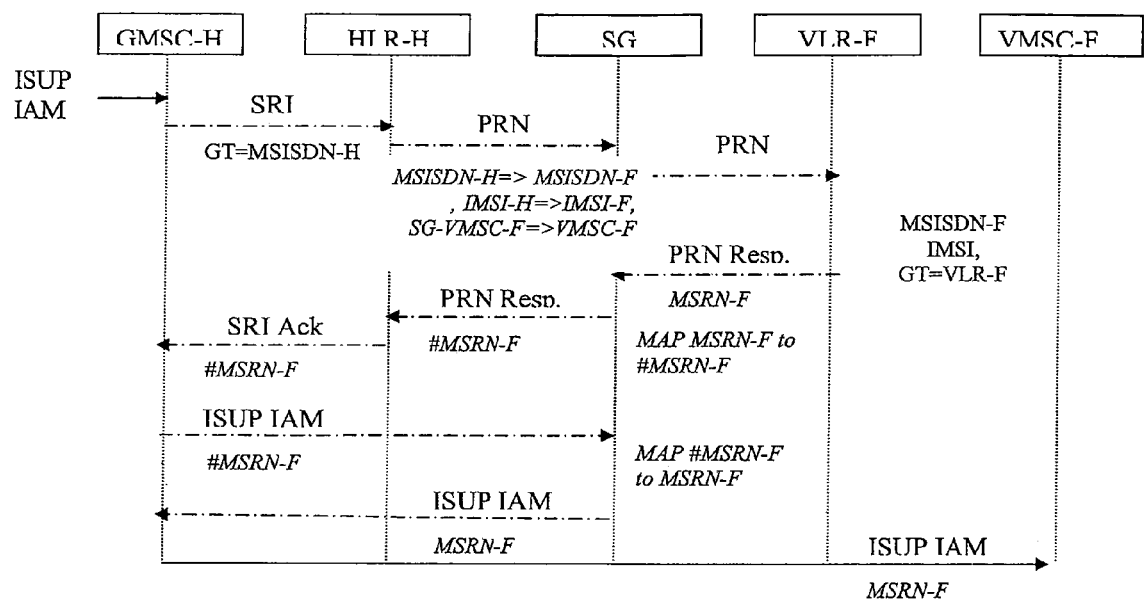
FIG. 30 shows a signal flow for a mobile terminated call with the MIMM subscriber in FPMN: Mobile Terminated Call on MSISDN-H.

To avoid congestion and to support fail-over, the GMSC-H should configure the routing towards FPMN side using a primary/secondary setting. The primary route in this case will be the leased line; while the secondary standby route will be that of the existing ISC providers. A signal flow for a mobile terminated call with the MIMM subscriber in FPMN: Mobile Terminated Call on MSISDN-H is shown in FIG. 30.

Note also that the pool of #MSRN-F is shared not split by SG1 and SG2. Besides, it is assumed MSC will route all ISUP and SCCP with called number=dedicated range of #MSRN-F to SG1/SG2.

So just to avoid doubt, embodiments do not send any ISUP or SCCP message with called number=same range of #MSRN-F back to MSC.

FPMN VMSC generates MT CDR using IMSI and MSISDN-F. It is billed at a special pre-negotiated rate and sent via TAP. The CDR generated by Signaling Gateway is used for adding roaming call re-routing charges. The CDR has the record of the assigned HPMN # from the HPMN # pool which indicates the call origination side and the destination MSRN-F which indicates the call destination side.

Mobile Terminated Calls: MIMM Subscriber in FPMN: Mobile Terminated Call on MSISDN-F Calls to MSISDN-F are routed to GMSC-F. GMSC-F is configured to issue or transfer a MAP SRI query to the Signaling Gateway with SCCP Called Party Address as MSISDN-F. Note the word "transfer' used, this is to accommodate the case where the originating MSC (e.g. VMSC-F) might directly issue SRI itself although that will be routed to GMSC-F.

GMSC-F routes the message to GMSC-H which then passes on to the Signaling Gateway SG1 via GTT. SG1 then forwards the SRI query to the real HLR. Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

Figure 31:
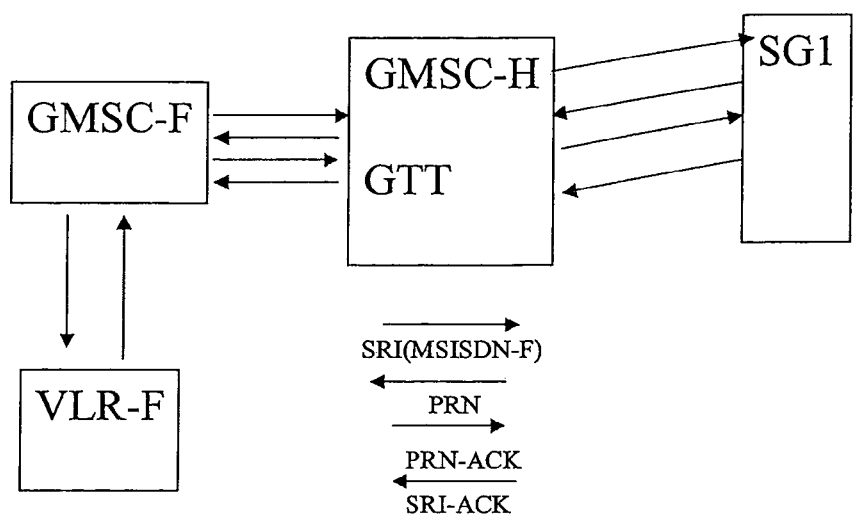
FIG. 31 shows a successful flow of SRI in the case of MOBILE TERMINATED CALLS: MIMM subscriber in FPMN: Mobile Terminated Call on MSISDN-F.

A successful flow of SRI is shown in FIG. 31.

Note that during the Update Location from FPMN, the message was routed via the Signaling Gateway and the HLR contains the address of the Signaling Gateway rather than the true VLR address. Hence, the HLR issues a MAP PRN request to the Signaling Gateway. The Signaling Gateway transforms the PRN as shown in Table 11.

TABLE 11

| Provide Roaming Number from HLR-H | | Message from Signaling Gateway to VLR-F via GMSC-H | |
|---|---|---|---|
| SCCP Called Address: | | SCCP Called Address: | |
| GT: | SG-VLR-F | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP-level parameters: | | MAP-level parameters: | |
| IMSI: | IMSI-H | IMSI: | IMSI-F |
| VMSC: | SG-VMSC-F | VMSC: | VMSC-F |
| MSISDN: | MSISDN-H | MSISDN: | MSISDN-F |

The message is routed to the FPMN and the Signaling Gateway modifies the PRN response as shown in Table 12.

TABLE 12

| Provide Roaming Number Response from VLR-F | | Message from Signaling Gateway to HLR-H via GMSC-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | SG-VLR-F |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Here #MSRN-F is simply a notation that denotes a number whose mapping to MSRN-F is maintained in the signal gateway function. The actual number could just be that where the symbol "#' is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of the number of FPMN numbers, the actual use of a prefix for the notation #MSRN-F could be logistically challenging in cases where every VMSC (e.g. for calls originated in FPMN network) can issue SRI query (e.g. China Mobile) since there might be hundreds if not thousands of VMSCs will is configured to route the call via the leased line. The FPMN # pool choice on the other hand will cause the SRI-issuing VMSC (if not the GMSC-F itself, including those with optimal routing capability) to route the call at least to the GMSC-F for the chosen number from the pool. Only GMSC-F will then is configured to route the call over the leased line.

Another challenge for the prefixed based approach that is not present in the pool-based approach is that it might exceed both MAP and ISUP length for a FPMN.

GMSC-F is configured to route the call via the leased line to GMSC-H based on #MSRN-F. GMSC-H is configured to send ISUP IAM message to the Signaling Gateway function based on the destination number. The voice trunks are held at GMSC-H. The chosen Signaling Gateway maps the destination number to the real MSRN-F and routes the call back to the GMSC-F. GMSC-H routes the call to GMSC-F which will then route the call to the terminating VMSC-F.

Figure 32:
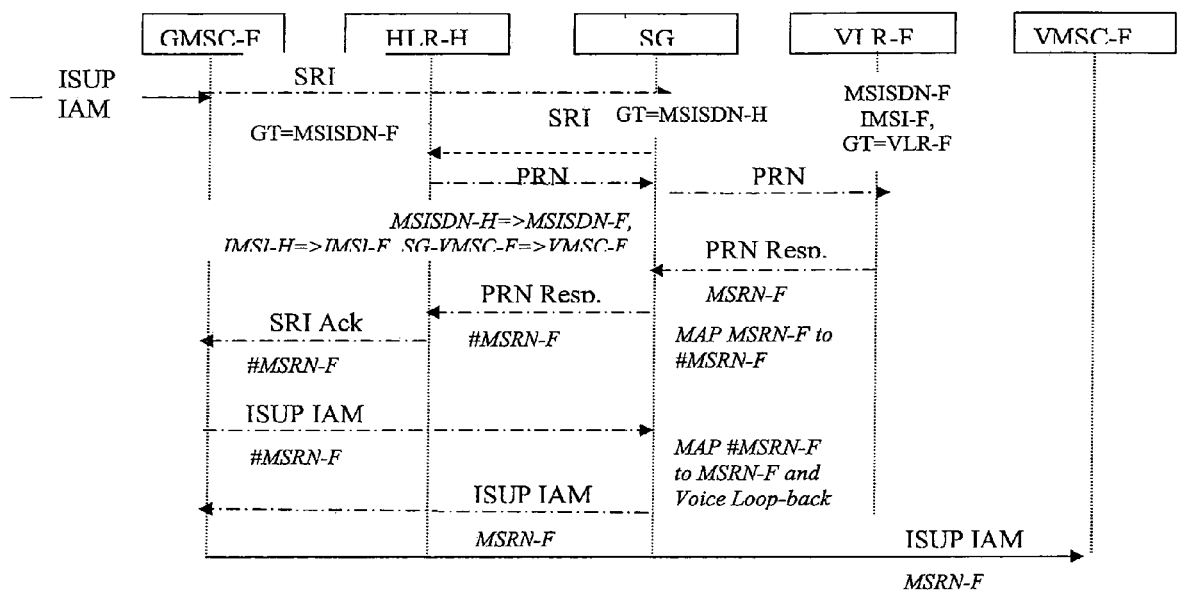
FIG. 32 shows a signal flow for a mobile terminated call with the MIMM subscriber in FPMN: Mobile Terminated Call on MSISDN-F.

In this case, the signal gateway leaves A-party information unchanged. A signal flow for a mobile terminated call with the MIMM subscriber in FPMN: Mobile Terminated Call on MSISDN-F is shown in FIG. 32.

FPMN VMSC generates MT CDR using IMSI and MSISDN-F. It is billed at a special pre-negotiated rate and sent via TAP. The CDR generated by Signaling Gateway is used for adding roaming call re-routing charges.

Since roamer information (e.g. VMSC-F, VLR-F, IMSI-H) at FPMN is maintained in the Signaling Gateway, the Signaling Gateway can also directly issue PRN to VLR-F when receiving SRI/SRI-SM query on the FPMN MSISDN-F number under certain conditions (e.g. CFU indicator is not set, there is no incoming call barring, there is no T-CSI service) rather than looped back through the HLR-H. However if any of the special conditions mentioned is true for the MIMM subscriber, the Signaling Gateway will not have the HLR-H knowledge for those conditions since they will not be sent to the Signaling Gateway when functioning as a VLR to HLR-H. In that case, Signal gateway will need to relay SRI to HLR-H and cannot directly issue PRN query to VLR-F even if it knows the VLR-F.

If Optimal Routing of voice calls is configured and applicable for the particular MSRN-F range, and if billing arrangement is made, the Signaling Gateway can choose to return the real MSRN-F rather than #MSRN-F based on whether the current VLR-F is permitted for an optimally routed call. Route will be made directly to the terminating VMSC-F from the SRI-issuing VMSC-F/GMSC-F. There will be no route to GMSC-H and no loopback signaling through the signal gateway. The signal gateway will still generate a roaming call CDR of type (HLR interrogation HLRI) except that there is no duration, no trunking and no MSRN-2 in the CDR MT CDR generated by VMSC-F will contain IMSI and MSISDN-F. When special billing is applied, the user will be charged FPMN local airtime. In addition, the duration-less CDR generated by the Signaling Gateway will be used to add special charges for routing the call from FPMN to HPMN and HPMN to FPMN over the leased line.

Mobile Terminated Calls: MIMM Subscriber in FPMN: Location of the Signal Gateway The use of #MSRN is introduced to control the routing between FPMN and HPMN network for billing purpose. Otherwise, MSRN can be used and the location of the signal gateway will not matter.

In this particular case, the signal gateway is better hosted in FPMN since optimal routing and billing can both be achieved. The use of #MSRN is also useful. Here the call on #MSRN will be routed to the GMSC-F first. The GMSC-F can then ISUP loop through the signal gateway before it goes out on MSRN. This will allow the signal gateway performs proper billing function.

Mobile Terminated Calls: MIMM Subscriber in VPMN with IMSI-H: Subscriber Called on MSISDN-H Mobile Terminated Calls: MIMM Subscriber in VPMN with IMSI-H: Subscriber Called on MSISDN-F This relates to a call that originates from VMSC-F or reaches GMSC-F. SRI-issuing VMSC-F or GMSC-F issues a MAP SRI message to the Signaling Gateway with SCCP Called Party Address as MSISDN-F. Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

The Signaling Gateway transforms this request as shown in Table 13.

TABLE 13

| Send Routing Info from GMSC-F | | Message from Signaling Gateway to GMSC-H | |
| --- | --- | --- | --- |
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG-GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The request is routed to the HPMN HLR. It issues a PRN request to VLR-V. The MSRN returned is routed back to the HLR and is returned in the SRI response. The message goes via the Signaling Gateway and is transformed as shown in Table 14.

TABLE 14

| Send Routing Info Response from HLR-H | | Message from Signaling Gateway to GMSC-F via GMSC-H | |
| --- | --- | --- | --- |
| SCCP Called Address: | | SCCP Called Address: | |
| GT: | SG-GMSC-F | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSRN: | MSRN-V | MSRN: | #MSRN-V |

Here #MSRN-V is simply a notation that denotes a number whose mapping to MSRN-V is maintained in the signal gateway function. The actual number could just be that where the symbol "#" is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of the number of FPMN numbers, the actual use of a prefix for the notation #MSRN-V could be logistically challenging in cases where every VMSC (e.g. for calls originated in FPMN network) can issue SRI query (e.g. China Mobile) since there might be hundreds if not thousands of VMSCs will be configured to route the call via the leased line to get the special re-routing tariff (otherwise normal IDD routing charges will be applied). The FPMN # pool choice on the other hand will cause the SRI-issuing VMSC (if not the GMSC-F itself, including those with optimal routing capability) to route the call at least to the GMSC-F for the chosen number from the pool. Only GMSC-F will then is configured to route the call over the leased line.

Another challenge for the prefixed based approach that is not present in the pool-based approach is that it might exceed both MAP and ISUP length for a FPMN.

GMSC-F is configured to route the call via the leased line to GMSC-H based on #MSRN-V. GMSC-H is configured to send ISUP IAM message to the Signaling Gateway based on the destination number. The voice trunks are held at GMSC-H. Signaling Gateway maps the destination number to the real MSRN-V and routes the call back to the GMSC-H. GMSC-H routes the call to the terminating VMSC-V.

The signaling gateway also examines the A-party number after receiving the ISUP loopback signaling from GMSC-H. If the A party number is a national number and the SRI-issuing node is a FPMN node, then if the A party has a national prefix, it is stripped before prefixing the rest of A with the international prefix of FPMN; otherwise prefixing A directly with the international prefix of FPMN. For example, assuming FPMN is China Mobile, the following modifications will be performed.

3. If the first digit of the A party is 0—the national prefix, the first digit is stripped off and the rest of A is prefixed with +86 (i.e. change address indicator to international and prefix with 86 as addressing signal digits).
4. If the first digit of the A party is 1, A is prefixed with +86 (i.e. change address indicator to international and prefix with 86 as addressing signal digits).

Figure 33:
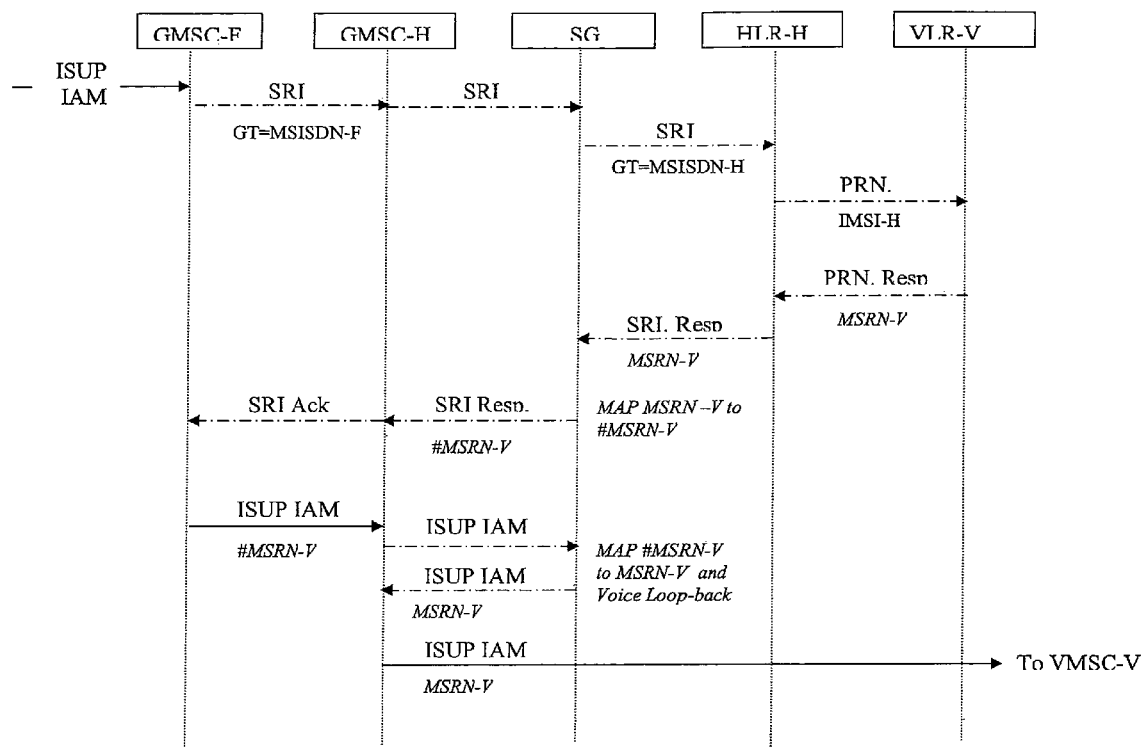
FIG. 33 shows a signal flow for a mobile terminated call with the MIMM subscriber in VPMN with IMSI-H: Subscriber called on MSISDN-F.

A signal flow for a mobile terminated call with the MIMM subscriber in VPMN with IMSI-H: Subscriber called on MSISDN-F is shown in FIG. 33.

VMSC generates MT CDR and bills HPMN normal roaming rates through TAP arrangement. CDR generated by Signaling Gateway will be used to bill the subscriber for one way reroute IDD from FPMN to HPMN at a special rate since the call is routed over the leased line.

Mobile Terminated Calls: MIMM Subscriber in VPMN with IMSI-H: Location of the Signal Gateway The use of #MSRN is purely introduced to control the TAP billing between HPMN and VPMN since IMSI-H is used to register with VPMN. If the FPMN is allowed to directly route the call on MSRN to VPMN, it will be difficult to relate the right rerouting IDD leg when the MT TAP on IMSI-H is presented to HPMN by VPMN. This is especially true when there are multiple FPMNs involved.

For this particular case, the signal gateway is better located at HPMN. When the signal gateway is hosted in FPMN, the use of #MSRN is also useful. Here the call on #MSRN will be routed to the GMSC-F first. The GMSC-F can then ISUP loop through the signal gateway before it goes out on MSRN. The signal gateway will simply perform billing function.

When MT TAP on IMSI-H is presented to HPMN by VPMN, HPMN must recognize that the IMSI-H is a MIMM subscriber because the subscriber has an associated IMSI-F. The call then must be reconciled with the rerouted CDR presented by FPMN or the signal gateway to determine the correct re-routed IDD leg charge.

Mobile Terminated Calls: MIMM Subscriber in VPMN with IMSI-F Subscriber Called on MSISDN-H This relates to a call that originates from VMSC-H or reaches GMSC-H. SRI-issuing VMSC-H or GMSC-H issues a MAP SRI message to HLR. HLR issues PRN with IMSI-H, MSISDN-H (optional) and SG-VMSC-V the Signaling Gateway with SCCP Called Party Address as SG-VLR-V.

The Signaling Gateway transforms this request as shown in Table 15.

TABLE 15

| PRN from HLR-H to SG-VLR-V | | PRN from SG-VLR-V to VLR-V | |
|---|---|---|---|
| SCCP Called Address: | | SCCP Called Address: | |
| GT: | SG-VLR-V | GT: | VLR-V |
| SSN: | 7 | SSN: | 7 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSISDN: | MSISDN-H | MSISDN: | MSISDN-F |
| IMSI: | IMSI-H | IMSI: | IMSI-F |
| VMSC: | SG-VMSC-V | VMSC: | VMSC-V |

The MSRN returned is routed back to the HLR as shown in Table 16.

If VPMN is in a different country from HPMN (i.e. international roaming), then MSRN will not be modified. This is because routing to MSRN internationally will not be blocked.

TABLE 16

| PRN Response from VLR-V to SG-HLR-H | | PRN Response from SG-VLR-V to HLR-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-V | GT: | SG-VLR-V |
| SSN: | 7 | SSN: | 7 |
| TT: | 0 | TT: | 0 |
| MAP level parameters: | | MAP level parameters: | |
| MSRN: | MSRN-V | MSRN: | MSRN-V |

However if VPMN is in the same country as HPMN (i.e. use MIMM for national roaming), then MSRN must be modified as shown in Table 17, since national routing on MSRN is usually blocked between operators. Of course if this is not the case for HPMN country, then the MSRN modification will not be needed.

TABLE 17

| PRN Response from VLR-V to SG-HLR-H | | PRN Response from SG-VLR-V to HLR-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-V | GT: | SG-VLR-V |
| SSN: | 7 | SSN: | 7 |
| TT: | 0 | TT: | 0 |
| MAP level parameters: | | MAP level parameters: | |
| MSRN: | MSRN-V | MSRN: | #MSRN-V |

Here #MSRN-V is simply a notation that denotes a number whose mapping to MSRN-V is maintained in the signal gateway function. The actual number could just be that where the symbol "#" is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping.

While reducing the use of the number of FPMN numbers, the actual use of a prefix for the notation #MSRN-V could be logistically challenging in cases where every VMSC (e.g. for calls originated in FPMN network) can issue SRI query (e.g. China Mobile) since there might be hundreds if not thousands of VMSCs will is configured to route the call via the leased line to get the special re-routing tariff (otherwise normal IDD routing charges will be applied). The FPMN # pool choice on the other hand will cause the SRI-issuing VMSC (if not the GMSC-H itself, including those with optimal routing capability) to route the call at least to the GMSC-H for the chosen number from the pool. Only GMSC-H will then be configured to route the call over the leased line.

Another challenge for the prefixed based approach that is not present in the pool-based approach is that it might exceed both MAP and ISUP length for a FPMN.

GMSC-H is configured to route the call via the leased line to GMSC-F based on #MSRN-V. GMSC-F is configured to send ISUP IAM message to the Signaling Gateway based on the destination number. The voice trunks are held at GMSC-F. Signaling Gateway maps the destination number to the real MSRN-V and routes the call back to the GMSC-F. GMSC-F routes the call to the terminating VMSC-V.

The signaling gateway also examines the A-party number after receiving the ISUP loopback signaling from GMSC-H. If the A party number is a national number and the SRI-issuing node is a HPMN node, then if the A party has a national prefix, it is stripped before prefixing the rest of A with the international prefix of HPMN; otherwise prefixing A directly with the international prefix of HPMN. For example, assuming HPMN is China Mobile, the following modifications will be performed.

5. If the first digit of the A party is 0—the national prefix, the first digit is stripped off and the rest of A is prefixed with +86 (i.e. change address indicator to international and prefix with 86 as addressing signal digits).
6. If the first digit of the A party is 1, A is prefixed with +86 (i.e. change address indicator to international and prefix with 86 as addressing signal digits).

Figure 34:
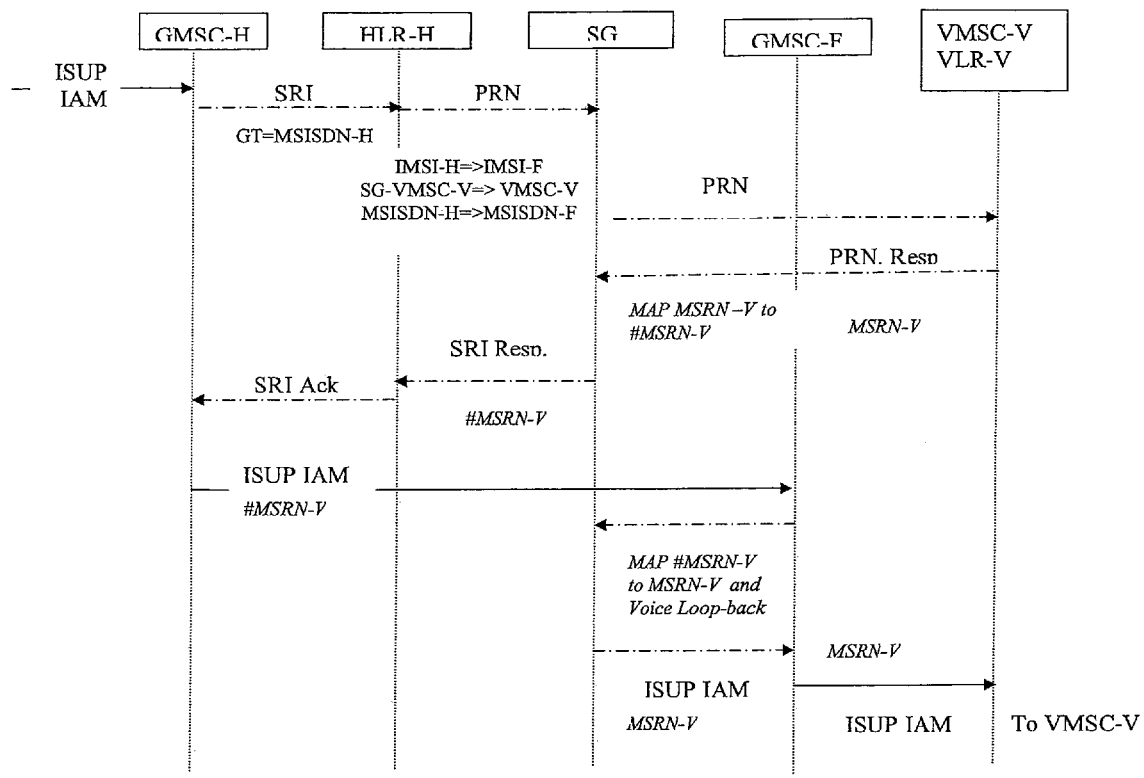
FIG. 34 shows a signal flow for a mobile terminated call with the MIMM subscriber in VPMN with IMSI-F: Subscriber called on MSISDN-H.

A signal flow for a mobile terminated call with the MIMM subscriber in VPMN with IMSI-F: Subscriber called on MSISDN-H is shown in FIG. 34.

VMSC generates MT CDR and bills FPMN normal roaming rates through TAP arrangement. CDR generated by Signaling Gateway will be used to bill the subscriber for one way reroute IDD from HPMN to FPMN and then from FPMN to VPMN at a special rate since the call is routed over the leased line between HPMN and FPMN.

Mobile Terminated Calls: MIMM Subscriber in VPMN with IMSI-F: Subscriber Called on MSISDN-F This relates to a call that originates from VMSC-F or reaches GMSC-F. SRI-issuing VMSC-F or GMSC-F issues a MAP SRI message to the Signaling Gateway with SCCP Called Party Address as MSISDN-F. Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

Signaling Gateway transforms this request as shown in Table 18.

TABLE 18

| Send Routing Info from GMSC-F | | Message from Signaling Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG-GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The request is routed to the HPMN HLR. It issues a PRN request to VLR-V as shown in Table 19.

TABLE 19

| PRN from HLR-H to SG-VLR-V | | PRN from SG-VLR-V to VLR-V | |
|---|---|---|---|
| SCCP Called Address: | | SCCP Called Address: | |
| GT: | SG-VLR-V | GT: | VLR-V |
| SSN: | 7 | SSN: | 7 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSISDN: | MSISDN-H | MSISDN: | MSISDN-F |
| IMSI: | IMSI-H | IMSI: | IMSI-F |
| VMSC: | SG-VMSC-V | VMSC: | VMSC-V |

The MSRN is returned to the signal gateway in the PRN response which is routed back to the HLR. The HLR returns the MSRN back to the signal gateway in the SRI response. The message goes via the Signaling Gateway back to GMSC-F unchanged as shown in Table 20.

TABLE 20

| Send Routing Info Response from HLR-H | | Message from Signaling Gateway to GMSC-F via GMSC-H | |
|---|---|---|---|
| SCCP Called Address: | | SCCP Called Address: | |
| GT: | SG-GMSC-F | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSRN: | MSRN-V | MSRN: | MSRN-V |

Here the MSRN-V is unchanged because IMSI-F is used at VPMN.

Figure 35:
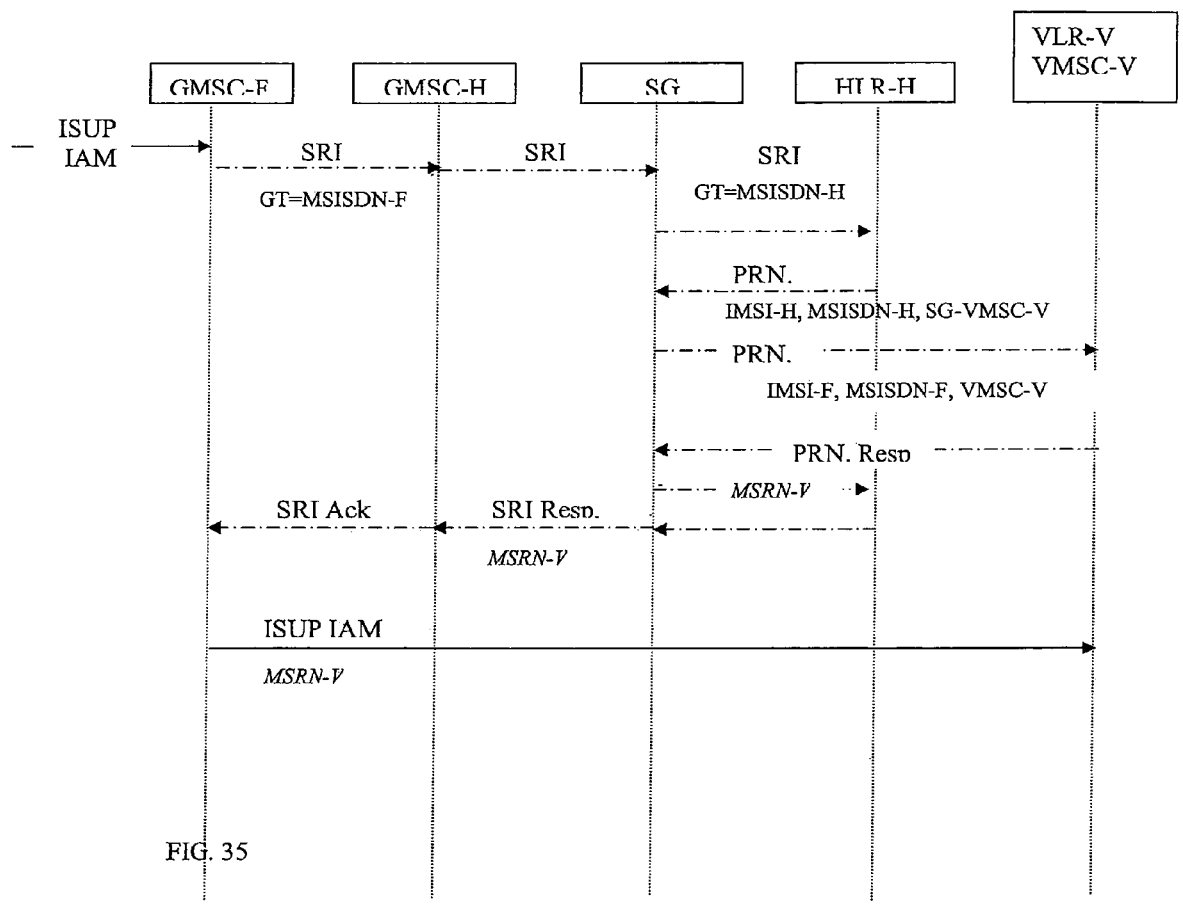
FIG. 35 shows a signal flow for the situation of mobile terminated calls with the MIMM subscriber in VPMN with IMSI-F: Subscriber called on MSISDN-F.

A signal flow for the situation of mobile terminated calls with the MIMM subscriber in VPMN with IMSI-F: Subscriber called on MSISDN-F is shown in FIG. 35.

VMSC generates MT CDR and bills FPMN normal roaming rates through TAP arrangement. CDR/TAP generated by FPMN can be used to bill HPMN for the call rerouting directly from FPMN.

Mobile Terminated Calls: MIMM Subscriber in VPMN with IMSI-F: Location of the Signal Gateway The use of #MSRN (e.g. for national roaming) is introduced to avoid the blocking of MSRN by competing operators of HPMN. In many countries, operators (e.g. D2) cannot block MSRN from national network since their partner IDD operators often use national trunks to route MSRN calls. If this is the case, then there is no need for #MSRN. Calls can be directly routed from HPMN to VPMN MSRN.

Assuming this is not the case, the signal gateway is better located at FPMN (otherwise ISUP loopback signaling will need be defined from FPMN to HPMN). When the signal gateway is hosted in FPMN, the use of #MSRN is very useful. Here the call on #MSRN will be routed to the GMSC-F first. The GMSC-F can then ISUP loop through the signal gateway before it goes out on MSRN. The signal gateway can also perform the billing function.

When MT TAP on IMSI-F is presented to FPMN by VPMN, FPMN must recognize that the IMSI-F is a MIMM subscriber of HPMN because it is in a special range. The MT TAP then must be relayed to HPMN. VPMN charges FPMN. FPMN charges HPMN. HPMN charges the subscriber. The subscriber at VPMN registered with IMSI-F thus incurs two international legs of charges even though VPMN is in the same country as HPMN.

Unconditional Call Forwarding: IMSI Detached

The MIMM subscriber has the option of setting a single CFU or CFNRc ECF (Early Call Forwarding) Forward-To-Number for both MSISDN-H and MSISDN-F. The FTN is returned in MAP SRI response.

If at the signal gateway function, the received FTN is the same as MSISDN-F, either the default number (e.g. voicemail) is chosen or error is returned to SRI query whether the call is started on MSISDN-F or MSISDN-H.

This exception handling mechanism is assumed in the following discussions and will not be explicitly addressed any further.

Unconditional Call Forwarding: IMSI Detached: Subscriber is Registered with IMSI-H: Calls to MSISDN-H In this situation, the GMSC-H routes the call to the FTN directly without involving the Signaling Gateway.

Unconditional Call Forwarding: IMSI Detached: Subscriber is Registered with IMSI-H: Calls to MSISDN-F In this situation, the SRI-issuing VMSC-F or GMSC-F issues a MAP SRI request to the Signaling Gateway function with SCCP Called Party Address as MSISDN-F.

Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway, as shown in Table 21.

TABLE 21

| Send Routing Info from GMSC-H | | Message from Signaling Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG-GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

GMSC-H now routes this message to the HLR in HPMN. HLR sends the FTN in the SRI response that is routed back via Signaling Gateway and is modified as shown in Table 22.

TABLE 22

| Send Routing Info Response from HLR-H | | Message from Signaling Gateway to GMSC-F via GMSC-H | |
|---|---|---|---|
| SCCP Called Address: | | SCCP Called Address: | |
| GT: | SG-GMSC-F | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| FTN: | FTN | FTN: | #FTN |

Here #FTN is simply a notation that denotes a number whose mapping to FTN is maintained in the signal gateway function. The actual number could just be that where the symbol "#" is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping. Note that the pool # assignment is only made when CFU happens, not in registration time. It is immediately freed when the call has been forwarded.

While reducing the use of the number of FPMN numbers, the actual use of a prefix for the notation #FTN could be logistically challenging since every SRI-issuing VMSC-F (of hundreds if not thousands of VMSCs) will is configured to route the call via the leased line to get the special re-routing tariff. Otherwise normal IDD routing charges will be applied.

The FPMN # pool choice on the other hand will cause the SRI-issuing VMSC (if not the GMSC-F itself, including those with optimal routing capability) to route the call at least to the GMSC-F for the chosen number from the pool. Only GMSC-F will then is configured to route the call over the leased line.

Another challenge for the prefixed based approach that avoided by the pool-based approach is that it might exceed both MAP and ISUP length for a FPMN.

GMSC-F is configured to route the call via the leased line to GMSC-H based on #FTN. GMSC-H is configured to use loopback circuits to send ISUP IAM message to the Signaling Gateway based on the destination number. The voice trunks are held at GMSC-H. Signaling Gateway maps the destination number to the real FTN and routes the call back to the GMSC-H. GMSC-H routes the call to FTN The MIMM subscriber will be charged for the 1-way reroute IDD (from FPMN to the Signaling Gateway function) at a certain special rate, plus the charge for the CF-Leg to FTN, based on the CDR from the Signaling Gateway.

Figure 36:
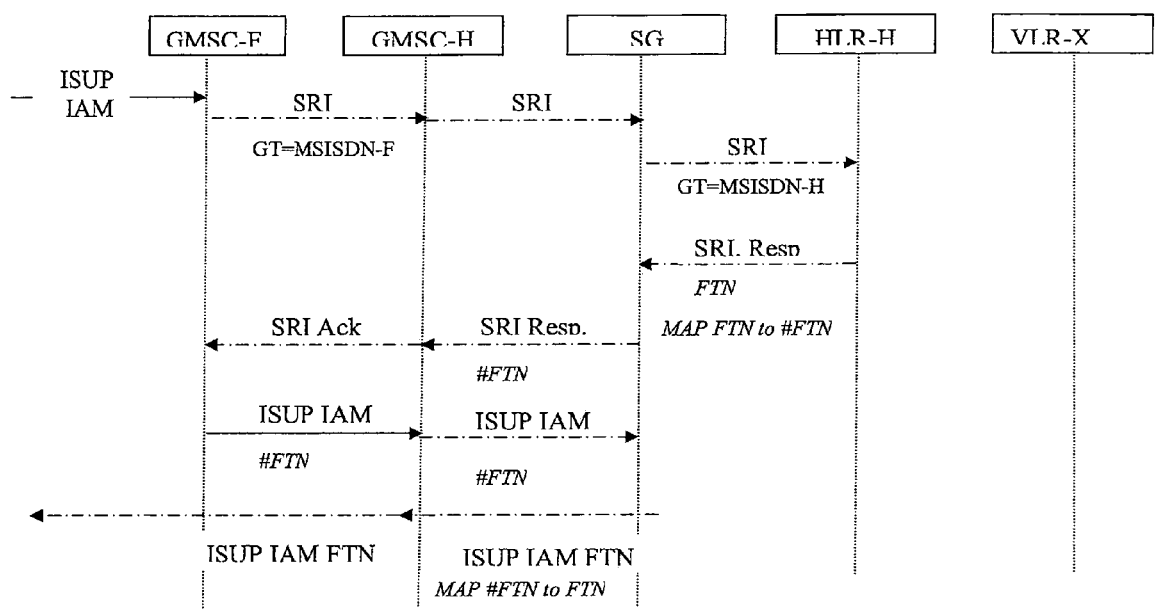
FIG. 36 shows a signal flow for unconditional call forwarding with IMSI detached and subscriber registered with IMSI-H.

A signal flow for unconditional call forwarding with IMSI detached and subscriber registered with IMSI-H is shown in FIG. 36.

Unconditional Call Forwarding: IMSI Detached: Subscriber is Registered with IMSI-F: Calls to MSISDN-H The GMSC-H issues SRI to HLR-H which either returns FTN immediately or issues PRN to the Signaling Gateway with IMSI-H, MSISDN-H and SG-VMSC-X. In the PRN case, the Signaling Gateway replaces the PRN parameters with IMSI-F, MSISDN-F and VMSC-X and send the modified PRN on to VLR-X. The response returns IMSI-detached to HLR-H via the signal gateway. Since the HLR-H SRI-response does not go back to the signal gateway, the subscriber's ECF FTN will be returned to GMSC-H. The FTN is not modified and GMSC-H routes the call to FTN. This is similar to the case where the subscriber is registered with IMSI-H except that the PRN query from HLR-H goes through the signal gateway in this case.

Unconditional Call Forwarding: IMSI Detached: Subscriber is Registered with IMSI-F: Calls to MSISDN-F The SRI-issuing VMSC-F or GMSC-F issues a MAP SRI request to the Signaling Gateway function with SCCP Called Party Address as MSISDN-F.

Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

Referring to Table 23, the Signaling Gateway changes the MSISDN-F to MSISDN-H and issues the SRI message to HLR-H. HLR will eventually returns FTN to the signal gateway.

TABLE 23

| Send Routing Info from GMSC-H | | Message from Signaling Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG-GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

GMSC-H now routes this message to the HLR in HPMN. HLR sends the FTN (PRN might be involved too) in the SRI response that is routed back via Signaling Gateway and is modified as shown in Table 24.

TABLE 24

| Send Routing Info Response from HLR-H | | Message from Signaling Gateway to GMSC-F via GMSC-H | |
|---|---|---|---|
| SCCP Called Address: | | SCCP Called Address: | |
| GT: | SG-GMSC-F | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| FTN: | FTN | FTN: | #FTN |

Here #FTN is simply a notation that denotes a number whose mapping to FTN is maintained in the signal gateway function. The actual number could just be that where the symbol "#" is again a logical notation that can denote "#", "999" or some prefixes. The actual number could also be that of the pool of FPMN MSISDN-F that corresponds to the MSISDN-F called. For example, if the MSISDN-F is a Beijing Mobile number, the pool should be filtered to present a Beijing Mobile number to establish the mapping. Note that the pool # assignment is only made when CFU happens, not in registration time. It is immediately freed when the call has been forwarded.

While reducing the use of the number of FPMN numbers, the actual use of a prefix for the notation #FTN could be logistically challenging since every SRI-issuing VMSC-F (there might be hundreds if not thousands of VMSCs) will is configured to route the call via the leased line to get the special re-routing tariff (otherwise normal IDD routing charges will be applied).

The FPMN # pool choice on the other hand will cause the SRI-issuing VMSC (if not the GMSC-F itself, including those with optimal routing capability) to route the call at least to the GMSC-F for the chosen number from the pool. Only GMSC-F will then is configured to route the call over the leased line.

Another challenge for the prefixed based approach that avoided by the pool-based approach is that it might exceed both MAP and ISUP length for a FPMN.

GMSC-F is configured to route the call via the leased line to GMSC-H based on #FTN. GMSC-H is configured to use loopback circuits to send ISUP IAM message to the Signaling Gateway based on the destination number. The voice trunks are held at GMSC-H. Signaling Gateway maps the destination number to the real FTN and routes the call back to the GMSC-H. GMSC-H routes the call to FTN The MIMM subscriber will be charged for the 1-way reroute IDD (from FPMN to the Signaling Gateway function) at a certain special rate, plus the charge for the CF-Leg to FTN, based on the CDR from the Signaling Gateway.

Figure 37:
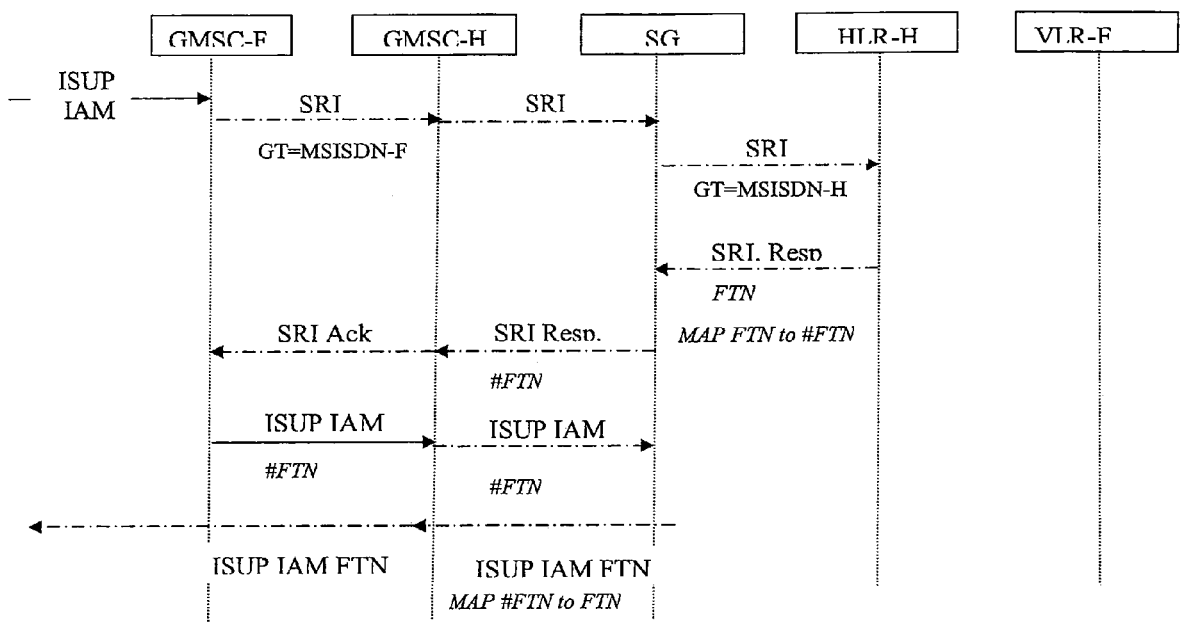
FIG. 37 shows a signal flow for unconditional call forwarding with IMSI detached and subscriber registered with IMSI-F.

A signal flow for unconditional call forwarding with IMSI detached and subscriber registered with IMSI-F is shown in FIG. 37.

Since we ignore the PRN query, this looks similar to the flow when IMSI-H is used to register with a VPMN-X.

Conditional Call Forwarding: IMSI Attached

If at the signal gateway function, the received FTN is the same as MSISDN-F, either the default number (e.g. voicemail) is chosen or error is returned to ISUP query whether the call is started on MSISDN-F or MSISDN-H.

This exception handling mechanism is assumed in the following discussions and will not be explicitly addressed any further.

Conditional Call Forwarding: IMSI Attached: MIMM Subscriber in HPMN: Calls to MSISDN-H The calls to MSISDN-H are routed normally to VMSC-H without going through the Signaling Gateway. When a conditional call forwarding event triggers (CFNRc, CFNRy and CFB), the VLR contains the FTN for these numbers and routes the call to the FTN directly.

VMSC generates Call Forwarding CDR and the subscriber is billed for the CF leg.

Conditional Call Forwarding: IMSI Attached: MIMM Subscriber in HPMN: Calls to MSISDN-F The calls to MSISDN-F are routed by SRI-issuing VMSC-F or GMSC-F to the Signaling Gateway function with SCCP Called Party Address as MSISDN-F. The Signaling Gateway function transforms the message as shown in Table 25.

TABLE 25

| Send Routing Info from GMSC-H | | Message from Signaling Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | SG-GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

GMSC-H routes the request to HPMN HLR. HLR issues a PRN to VLR-H and gets the MSRN in response. It sends it back in SRI response to the Signaling Gateway. The message is transformed as shown in Table 26.

TABLE 26

| Send Routing Info Response from HLR-H | | Message from Signaling Gateway to SRI-issuing VMSC-F or GMSC-F via GMSC-H | |
|---|---|---|---|
| SCCP Called Address: | | SCCP Called Address: | |
| GT: | SG-GMSC-F | GT: | GMSC-F |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSRN: | MSRN-H | MSRN: | #MSRN-H |

Note that #MSRN-H is just a number that represents a mapping to the MSRN-H as explained before. The SRI-issuing VMSC-F or GMSC-F routes the ISUP IAM message via the leased line to the Signaling Gateway. The loopback circuit is used with signaling going through the signal gateway. The Signaling Gateway maps #MSRN-H to MSRN-H and loops back the signal at GMSC-H. Call is routed to VMSC-H.

On trigger of a Late Call Forwarding event (CFB, CFNR, CFNRy), VMSC-H routes the call to the corresponding FTN number, if any.

The CDR generated at the signal gateway is no different from a normal roaming call CDR as if LCF did not happen, i.e. the B party answered the call.

Conditional Call Forwading: IMSI Attached: MIMM Subscriber in FPMN

When a MIMM subscriber registers at HPMN or VPMN with IMSI-H, the real FTN values of the subscriber will be stored in the VLR. However during the location update for MIMM subscriber at FPMN with IMSI-F, the Signaling Gateway can change the FTN value based on the FTN value, subscriber's FTN flag and MIMM subscriber's current location (VLR-F) and the subscriber's MSISDN-F. The FTN value will not be substituted by the Signaling Gateway when issuing insertSubData to a FPMN VLR-F for a MIMM subscriber with MSISDN-F if the VLR-F network, FTN network, and MSISDN-F network has a corresponding entry in Table 27 as maintained by HPMN or the subscriber's FTN-no-change flag is set. In this case, late call forwarding will be directly routed to FTN without going through the signal gateway.

TABLE 27

| FTN-no-change-at-FPMN. | | |
|---|---|---|
| MSISDN-F network range | VLR-F network range | FTN network range |

For example, the entry could be for all FPMN networks, e.g. China Mobile. Then as long as FTN is a China Mobile number, it will not be changed by the signal gateway. Another example could be that only provincial networks have the entries in the table. Then if the Beijing MSISDN-F is used by the MIMM in a Beijing VLR-F but the FTN is a Guang Dong Mobile number, FTN will be replaced by the signal gateway. The exact network entry in the table depends on the billing arrangement HPMN with FPMN (and provincial FPMNs).

The following will only focus on the case where FTN has been changed. In this case, forwarding call need be routed back to the signal gateway which can then generate CDR for billing purpose.

Conditional Call Forwarding: IMSI Attached: MIMM Subscriber in FPMN: Calls to MSISDN-H GMSC-H issues a SRI request to HPMN HLR with SCCP Called Party Address as MSISDN-H. The HLR issues a PRN to the Signaling Gateway since the Update Location was routed via it. The PRN message is transformed as shown in Table 28.

TABLE 28

| Provide Roaming Number from HLR-H | | Message from Signaling Gateway to VLR-F via GMSC-H | |
|---|---|---|---|
| SCCP Called Address: | | SCCP Called Address: | |
| GT: | SG-VLR-F | GT: | VLR-F |
| SSN: | 7 | SSN: | 7 |
| TT: | 0 | TT: | 0 |

TABLE 28-continued

| Provide Roaming Number from HLR-H | | Message from Signaling Gateway to VLR-F via GMSC-H | |
|---|---|---|---|
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP Parameters: | | MAP Parameters: | |
| MSISDN: | MSISDN-H | MSISDN: | MSISDN-F |
| IMSI: | IMSI-H | IMSI: | IMSI-F |
| VMSC: | SG-VMSC-F | VMSC: | VMSC-F |

The PRN response is also routed back to the HPMN HLR via the Signaling Gateway. The message is transformed as shown in Table 29.

TABLE 29

| Provide Roaming Number Response from VLR-F | | Message from Signaling Gateway to HLR-H via GMSC-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | SG-VLR-F |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

Again #MSRN-F is just a notation that represents a number that maps to MSRN-F in the signal gateway function. GMSC-H routes the call through the loopback circuits with signaling going through the Signaling Gateway. Signaling Gateway maps #MSRN-F to MSRN-F and loops back the signaling with the voice ports established at GMSC-H. GMSC-H routes the call over the leased line. Note that the routing criterion is such that all calls from GMSC-H to a FPMN number will be routed over the leased line to the GMSC-F that corresponds to the FPMN number.

In order to detect and handle Late Call Forwarding, Roamware offers the following two solutions. In both cases, special care is taken to make sure that only one Unanswered Call is in progress at any point in time; otherwise Signaling Gateway will not able to determine which incoming leg to be connected with the actual FTN when LCF event triggers. To achieve this, a call state is maintained for each subscriber roaming in FPMN when a call has been routed through to FPMN side. There is also a flag in the call state that indicates if the call has been handled (connected or forwarded etc) or not.

When a new call is routed through the Signaling Gateway for the same subscriber, if such a state exists and the flag is set, the call is immediately forwarded based on the CFB condition unless optimal routing takes place. The flag is cleared when the call is connected or released or LCF event is handled. In this way, call waiting and conference call in LCF can be supported by the signal gateway. If the SRI or PRN request is received at the Signal gateway when the flag is set and the subscriber is registered at FPMN, then:

if it is the MSISDN-F of the MIMM subscriber that gets called, then, a) if the optimal routing is not allowed, the request will not be returned with a new #MSRN (no MSRN will be requested by the Signal gateway), instead early call forwarding will be triggered with ECF value if it is not empty or with the CFB value if the ECF value is empty; and b) if optimal routing is allowed, then #MSRN will be assigned; but if it is the MSISDN-H of the MIMM subscriber that gets called, the request will not be returned with a new #MSRN (no MSRN will be requested by the Signal gateway), instead early call forwarding will be triggered with ECF value if it is not empty or with the CFB value if the ECF value is empty.

In both cases, the default CF value can also be used in place of the ECF value (whether it is empty or not).

If the subscriber is registered at FPMN and the optimal routing is not allowed, the request will not be returned with a new #MSRN (no MSRN will be requested by the Signal gateway), instead early call forwarding will be triggered with ECF value if it is not empty or with the CFB value if the ECF value is empty.

Figure 38:
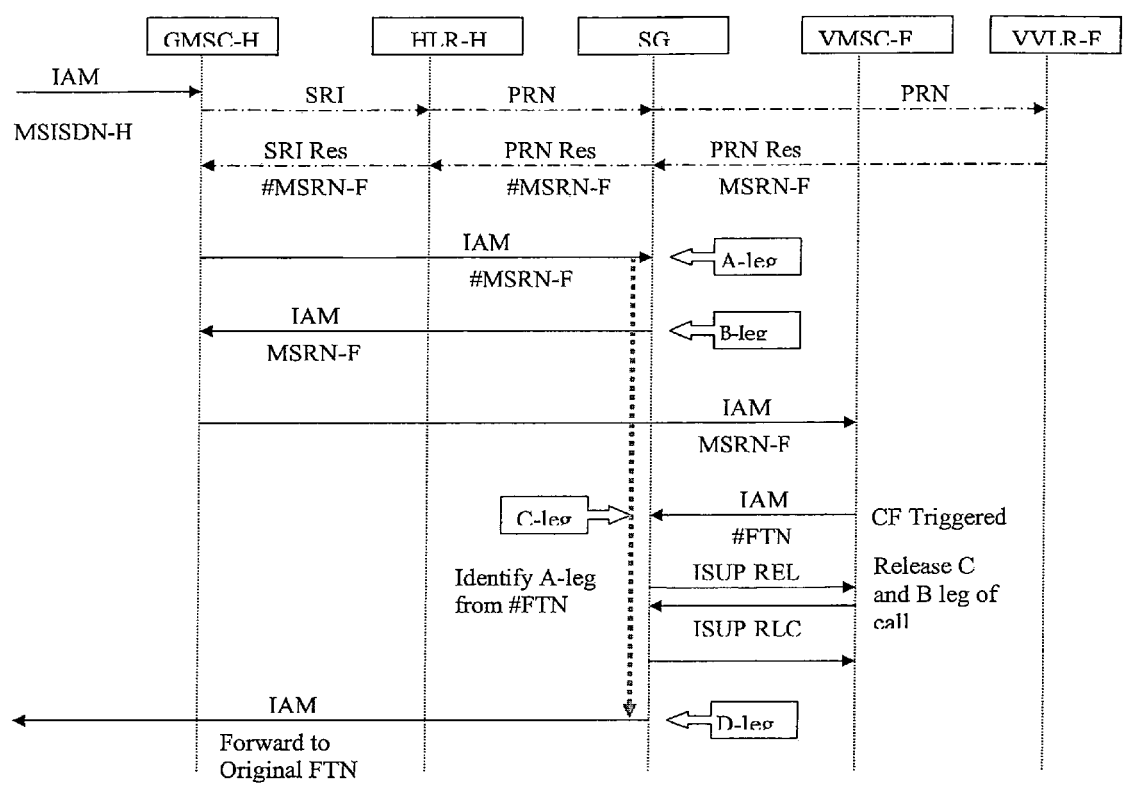
FIG. 38 shows a signal flow for conditional call forwarding with IMSI attached: MIMM subscriber in FPMN: Calls to MSISDN-H.

The call state is copied to the shared memory of the DB server. In the event of failure of the chosen signal gateway in the set up of the ISUP loopback call, the other gateway takes over the signaling. The call state also includes periodic (e.g. a configurable X seconds) duration update. When the call is released, the call state is cleared after it is used to build CDR in the database. A call flow is illustrated in FIG. 38.

Two ways of implementing #FTN representation depend on FPMN switch capabilities. The first is to assign a different #FTN from a pool to each FTN value for each subscriber. This is switch independent, but would require a possibly large number of #FTNs from either FPMN or HPMN. The second is to assign a different #FTN for each condition forwarding type. It depends on the OCN/ODN support of both FPMN and HPMN.

One FTN for Each LCF Value for Each Subscriber

SG creates a mapping between the allocated MSISDN (#FTN) from a pool and the actual FTN. SG needs to manage this mapping as follows:

a) SG needs to delete this mapping and free the MSISDN whenever it gets Cancel Location from HLR for the VLR and when it gets another Insert Subscriber Data, either standalone or as part of update location transaction which removes the call forwarding.

b) In case the call forwarding is changed to a different number, Insert Subscriber Data will be issued by HLR and in that case SG needs to change the mapping. If Insert Subscriber Data has the same FTN as before, the mapping maintained in Signaling Gateway is not changed. Otherwise, the mapping will be to the new FTN in the Insert Subscriber Data message with the same #FTN as before.

c) There are two ways of creating the pool of FTN #s. One is to populate the pool with home MSISDN-H numbers; the other is to populate the pool with FPMN MSISDN-F numbers. The former has the advantage that it is less resource stressful to FPMN. However every GMSC (e.g. Beijing GMSC) in FPMN is configured to route the call to the GMSC-F (e.g. Guang Dong GMSC) that has the leased line to GMSC-H. The second has the advantage that LCF calls will guarantee to be routed to GMSC-F without any configuration on their GMSCs. Only GMSC-F that has the leased line connection is configured to route the call on #FTN over the leased line.

Note also that the pool of #FTNs is shared not split by SG1 and SG2. Besides, it is assumed MSC will route all ISUP and SCCP with called number=dedicated range of MSISDN-F and #FTN to SG1/SG2.

So just to avoid doubt, the Signaling Gateway does not send any ISUP or SCCP message with called number=same range of MSISDN-F or #FTN back to MSC.

Care is taken to make sure that only one Unanswered Call is in progress at any point in time; otherwise Signaling Gateway will not able to determine which incoming leg to be connected with the actual FTN when LCF event triggers.

One FTN for Each LCF Condition Type

Figure 39:
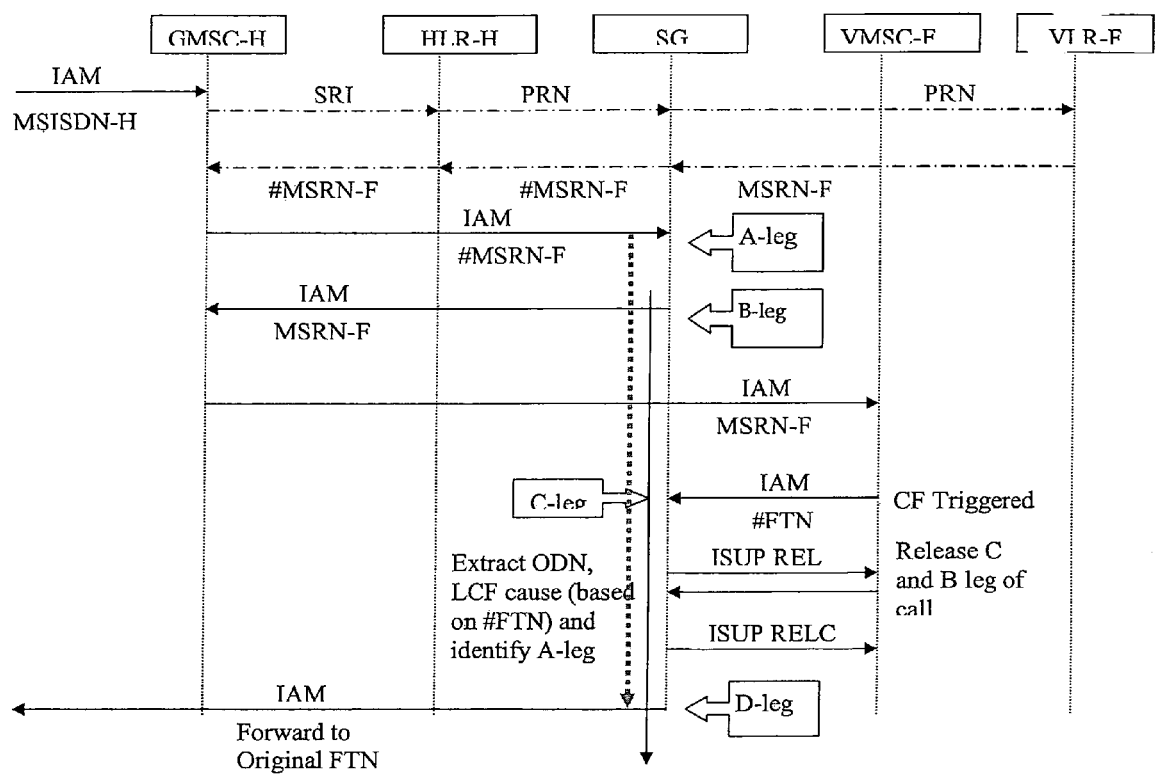
FIG. 39 shows a signal flow for conditional call forwarding with IMSI attached: MIMM subscriber in FPMN: Calls to MSISDN-H: One FTN for each LCF Condition type.

When the Insert Subscriber Data is routed via the Signaling Gateway, the gateway maintains a mapping between MSISDN-F, MSISDN-H and FTN values for CFB, CFNR and CFNR, as illustrated in Table 30 and the call flow of FIG. 39.

TABLE 30

| call-forwarding-table | | | |
|---|---|---|---|
| MSISDN-F | Call forwarding type | Call forwarding value | MSISDN-H |

It then substitutes the original FTN values with the corresponding value for each Call Forwarding event type in the translated Insert Subscriber Data message sent to VLR-F. When LCF event triggers at VMSC-F, VMSC-F looks up the FTN information from VLR-F and routes the call to the corresponding number. Note that the calls are routed to a common number for each type of condition forwarding and GMSC-H is configured to send the calls using loopback circuits with signaling through the Signaling Gateway. The Signaling Gateway function extracts the OCN or ODN value from the ISUP IAM; extracts the LCF event type based on the number the call was forwarded to. It then releases the current forwarded leg B (and C) of the call while still maintains the A-leg of the call. The original call leg (A) is then forwarded to the FTN number (D leg) retrieved by looking up the OCN/ODN values within the database containing original FTN numbers. This achieves optimal routing of Late-Call-Forwarding. It also generates a CF CDR. This approach does not require reserving a pool of MSISDN numbers from HPMN or FPMN.

The second implementation is recommended if OCN/ODN is supported by both HPMN and FPMN (egg. CSL and China Mobile satisfy this requirement. China Mobile uses ISUP for all core networks but TUP might be used in interworking. TUP also supports OCN although not Redirecting Number or Redirection Number). Unlike the CFU case where #FTN is only assigned from a pool when CFU happens not at registration time, the first implementation would require such an assignment from a pool at registration time whether LCF is triggered or not.

Each FPMN will be configured to apply one of the two implementations in LCF. For example, China Mobile can be configured to have the OCN implementation; while Macau FPMN can have the pool implementation.

Conditional Call Forwarding: IMSI Attached: MIMM Subscriber in FPMN: Calls to MSISDN-F When the user is called on MSISDN-F, the SRI-issuing VMSC-F or GMSC-F issues a SRI request to the Signaling Gateway with SCCP Called Party Address as MSISDN-F. The Signaling Gateway modifies the SRI message as shown in Table 31.

TABLE 31

| Send Routing Info from GMSC-F | | Message from Signaling Gateway to GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | GMSC-F | GT: | GMSC-F |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The HLR issues a PRN request that is also routed via the Signaling Gateway and is transformed as shown in Table 32.

TABLE 32

| Provide Roaming Number from HLR-H | | Message from Signaling Gateway to VLR-F via GMSC-H | |
|---|---|---|---|
| SCCP Called Address: | | SCCP Called Address: | |
| GT: | SG-VLR-F | GT: | VLR-F |
| SSN: | 7 | SSN: | 7 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSC address: | SG-VMSC-F | MSC address: | VMSC-F |
| IMSI: | IMSI-H | IMSI: | IMSI-F |
| MSISDN: | MSISDN-H | MSISDN: | MSISDN-F |

Note that MSISDN is an optional parameter and if present, it is replaced with MSISDN-F. Signaling Gateway also transforms the PRN response as shown in Table 33.

TABLE 33

| Provide Roaming Number Response from VMSC-F | | Message from Signaling Gateway to HLR-H via GMSC-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-F | GT: | SG-VLR-F |
| SSN: | 7 | SSN: | 7 |
| TT: | 0 | TT: | 0 |
| MAP level parameters: | | MAP level parameters: | |
| MSRN: | MSRN-F | MSRN: | #MSRN-F |

The #MSRN number is returned as SRI response to GMSC-F or the SRI-issuing VMSC-F. The SRI-issuing VMSC-F or GMSC-F routes the call to #MSRN-F over the leased line to GMSC-H. GMSC-H sets up the call with loopback circuits with signaling going through the signal gateway function. The signal gateway instructs GMSC-H to set up the call on the real MSRN-F.

When the LCF event triggers, VMSC-F forwards the call to the FTN sent as part of the Insert Subscriber Data message. The call flow is similar to the call on MSISDN-H in this case.

Figure 40:
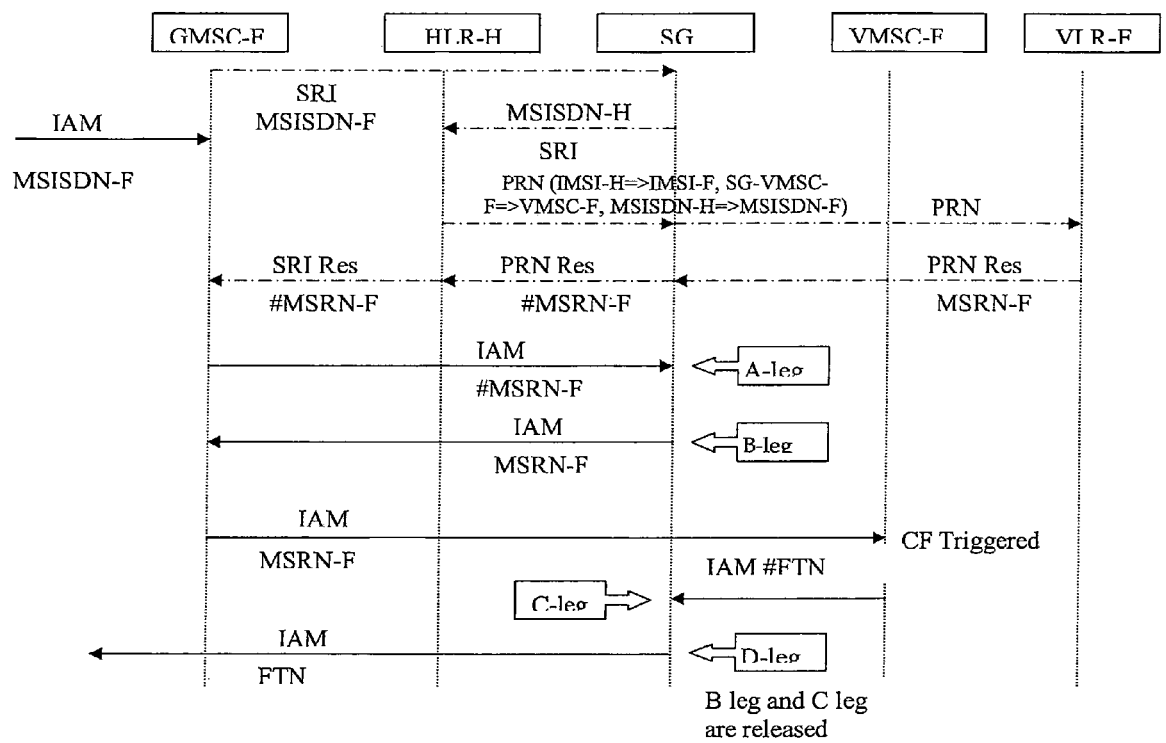
FIG. 40 shows a signal flow for conditional call forwarding with IMSI attached. MIMM subscriber in FPMN: Calls to MSISDN-F.

The detailed trace is depicted in FIG. 40.

Conditional Call Forwarding: IMSI Attached: MIMM Subscriber in VPMN with IMSI-H: Calls to MSISDN-H The normal GSM procedures apply to this scenario.

Conditional Call Forwarding: IMSI Attached: MIMM Subscriber in VPMN with IMSI-H: Calls to MSISDN-F The call flow is as described before. Since FTN is not changed during location update with IMSI-H, normal LCF handling applies.

Conditional Call Forwarding: IMSI Attached: MIMM Subscriber in VPMN with IMSI-F: Calls to MSISDN-H The call flow is as described before. If FTN is not modified during location update with IMSI-F at VPMN (e.g. in international roaming), then normal LCF applies.

If FTN is modified during location update with IMSI-F at VPMN (e.g. possibly in national roaming), then optimal routing can be performed on late call forwarding in a similar way as before. In this case, the LCF number will be going back to FPMN network. FPMN network will then issues ISUP loopback to the signal gateway which then performs optimal routing to the real FTN.

Figure 41:
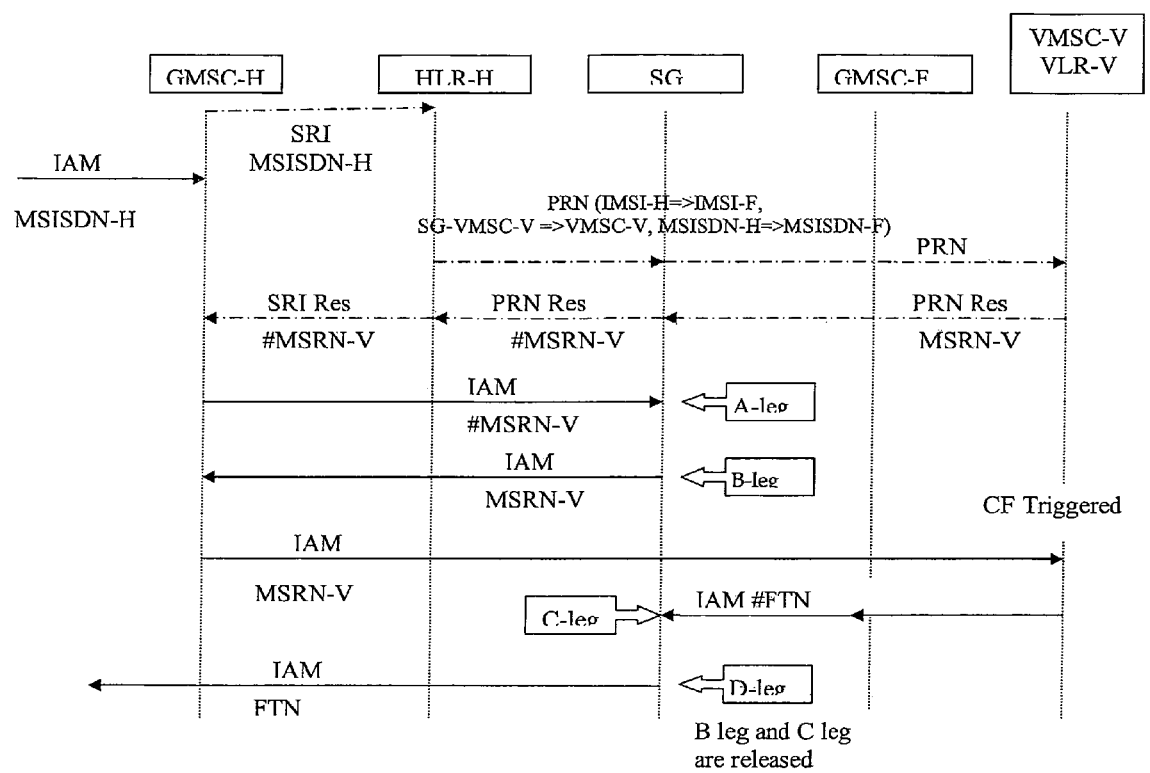
FIG. 41 shows a signal flow for conditional call forwarding: IMSI attached: MIMM subscriber in VPMN with IMSI-F: Calls to MSISDN-H.

The detailed trace is depicted in FIG. 41.

Conditional Call Forwarding: IMSI Attached: MIMM Subscriber in VPMN with IMSI-F: Calls to MSISDN-F The call flow is as described before. If FTN is not modified during location update with IMSI-F at VPMN (e.g. in international roaming), then normal LCF applies.

If FTN is modified during location update with IMSI-F at VPMN (e.g. possibly in national roaming), since the call was directly routed from FPMN to VMSC-V without going through HPMN, FTN will be handled normally, that is, no optimal routing.

Mobile Terminated SMS

It is envisaged that the MIMM subscriber will be able to receive SMS in any GSM network irrespective of it being sent to MSISDN-H or MSISDN-F. The SMS could be sent from any SMSC.

Mobile Terminated SMS: SMS to MSISDN-H when Subscriber in HPMN or XPMN with IMSI-H Normal GSM MT SMS operations apply irrespective of whether the SMS is sent by SMSC-H or SMSC-X. VMSC-X MT SMS CDR is used for SMS Inter-working settlements between HPMN and XPMN.

Mobile Terminated SMS: SMS to MSISDN-H when Subscriber in XPMN with IMSI-F

When the MIMM subscriber registers at XPMN with IMSI-F and the VMSC/SGSN address is modified to a signal gateway GT. To VLR-F, the signal gateway is the HLR for the subscriber and it also knows the VMSC-F of the subscriber. SMSC-X (SMSC-H, SMSC-F or SMSC-V) issues an SRI-SM to the HLR-H. HLR-H has the address of the Signaling Gateway as the serving MSC and returns it in SRI-SM response. SMSC-X issues a FSM to the Signaling Gateway.

The Signaling Gateway performs the translation as shown in Table 34.

TABLE 34

| MT FSM from SMSC-X | | Message from Signaling Gateway to VMSC-X via GMSC-H | |
|---|---|---|---|
| SCCP Called Address: | | SCCP Called Address: | |
| GT: | SG-VMSC-F | GT: | VMSC-X |
| SSN: | 8 | SSN: | 8 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |
| Map-level parameters: | | Map-level parameters: | |
| IMSI: | IMSI-H | IMSI: | IMSI-F |
| SM-RP-OA: | SMSC-X | SM-RP-OA: | SG-SMSC-X |

Note that the recipient address SM-RP-DA is based on IMSI-H (or LMSI), there is no need to worry about swapping MSISDN-H by MSISDN-F.

Note that the SCCP Calling Address has also been changed and hence the response also goes through the Signaling Gateway as shown in Table 35.

TABLE 35

| MT FSM Response from VMSC-X | | Message from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |
| SCCP Calling Address: | | SCCP Calling Address: | |
| GT: | VMSC-X | GT: | SG-VMSC-X |
| SSN: | 8 | SSN: | 8 |
| TT: | 0 | TT: | 0 |

Figure 42:
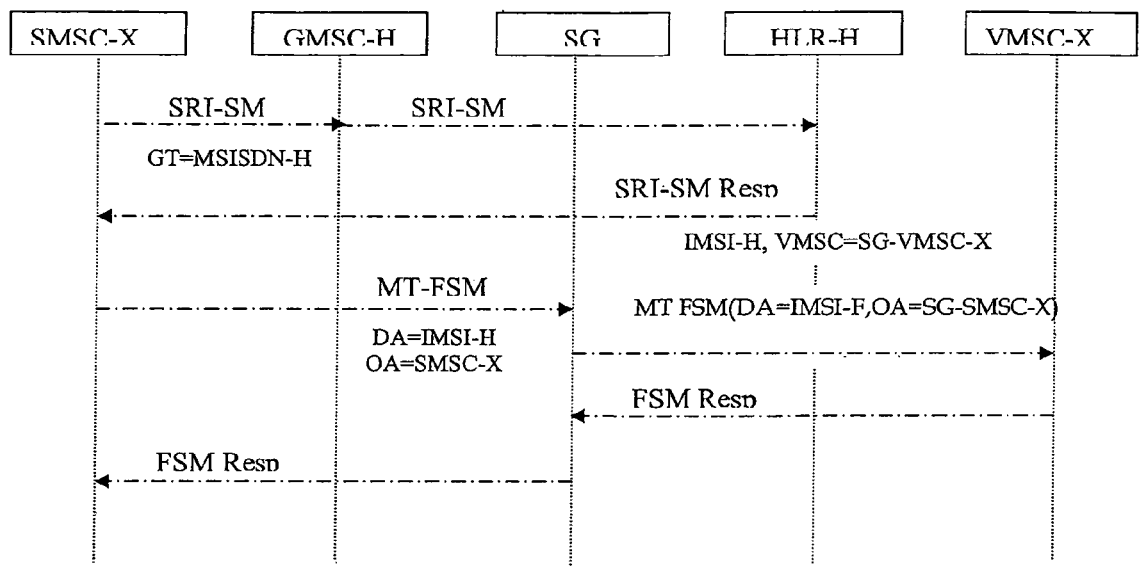
FIG. 42 shows a signal flow for mobile terminated SMS: SMS to MSISDN-H when Subscriber in XPMN with IMSI-F.

Signaling Gateway generates a CDR for this transaction and can be used to apply special charges/discounts. VMSC-X MT SMS CDR is used for SMS Inter-working settlement. Special rates may be negotiated for the specific FPMN IMSI-F range for a MIMM subscriber. A detailed trace is shown in FIG. 42.

Figure 43:
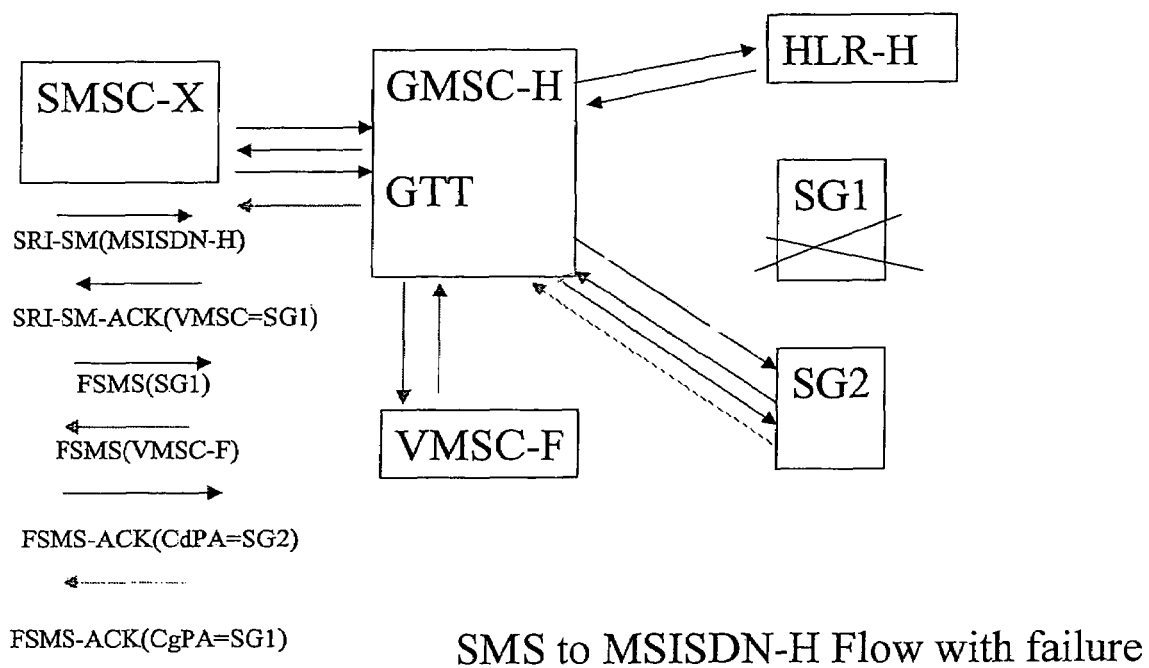
FIG. 43 shows a signal flow for a case in which the initially targeted Signaling Gateway fails after SMSC-X is told by HLR-H to forward an SMS to the targeted Signaling Gateway.

Now we examine the case where the initially targeted SG fails after SMSC-X is told by HLR-H to forward an SMS to the targeted SG. The following generic flow depicts this situation. When SMSC-X's MAP MT-SMS to SG1 reaches GMSC-H, since SG1 failed, SG2 SPC2 is the backup to SG1. GMSC-H forwards the MT-SMS to SPC2 of SG2. SG2 will relay MT-SMS to VMSC-F whose response is sent back SG2. SG2 then relays the response back to SMSC-X except that the calling GT is that of SG1 since SMSC-X has SG1 as the called GT when MT-SMS is initiated. A detailed trace is shown in FIG. 43.

Figure 44:
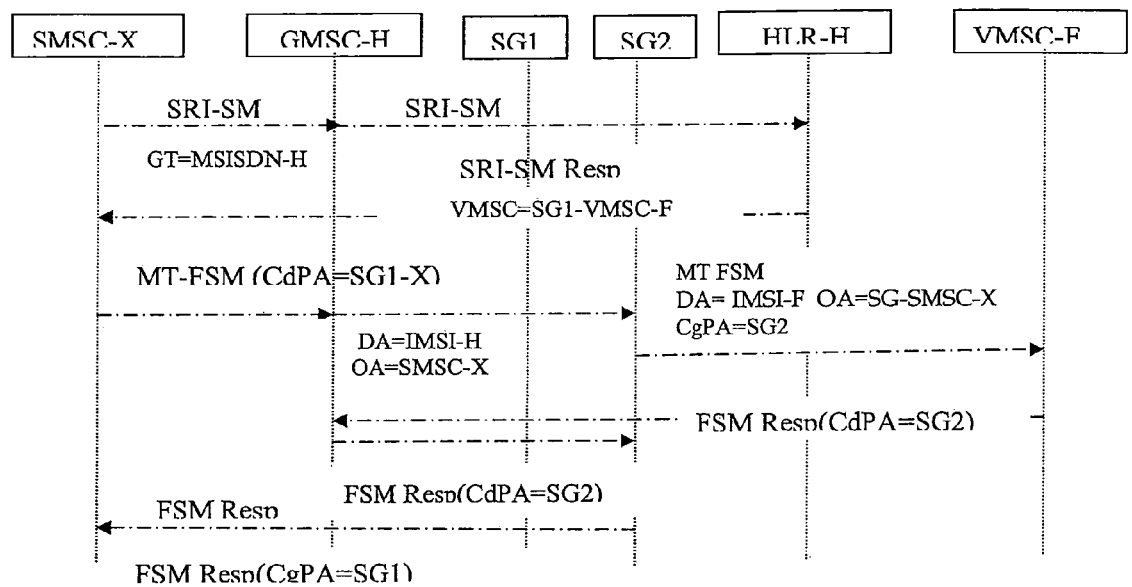
FIG. 44 shows a partial fail-over signal flow for a case in which the initially targeted Signaling Gateway fails after SMSC-X is told by HLR-H to forward an SMS to the targeted Signaling Gateway.

Note that this case is supported by partial fail-over since the MAP transaction between HLR-H and SMSC-X involves no on-going transaction with the signal gateway function. The signaling trace is depicted in FIG. 44.

Mobile Terminated SMS: SMS to MSISDN-F when Subscriber in XPMN with IMSI-F

Since MSISDN-F is from a specific range of numbers, GMSC-F is configured with GTT to route the CdPA=MSISDN-F SCCP message (e.g. SRI/SRI-SM) towards GMSC-H which then routes the message to the Signaling Gateway function. Note that GMSC-F can either route SCCP messages on MSISDN-F towards HPMN side via a ISC provider which is configured to route the CdPA=MSISDN-F towards the HPMN side or it is configured in its own GTT (of STP-F/GMSC-F) to translate CdPA=MSISDN-F to CdPA=Common-HPMN-GT-of-Signal-Gateway.

The Signaling Gateway could immediately return itself as the VMSC-F or SGSN-F. However to avoid recovery situation where HLR might have changed the VLR or SGSN address without the signal gateway knowing about it and there may be other indicators (e.g. message waiting indicators from MAP-Inform-Service-Center), so relaying the SRI-SM back to HLR-H on MSISDN-H by replacing MSISDN-F will be important.

Note here that irrespectively whether the signal gateway function passes VMSC/SGSN transparently or not when location update is sent from FPMN, the signal gateway function always return itself as the VMSC/SGSN address when the SRI-SM is issued on MSISDN-F rather than the real VMSC/SGSN address. This will allow special billing be down by the signal gateway function on MSISDN-F numbers.

Figure 45:
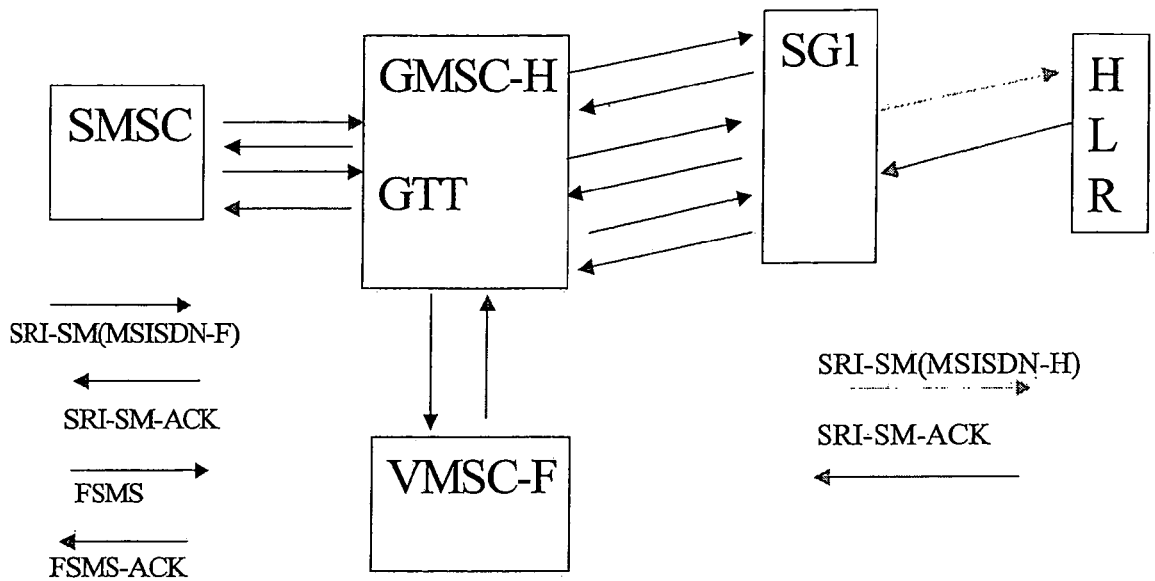
FIG. 45 shows a general flow of SMS to MSISDN-F when the subscriber is at FPMN in the case of mobile terminated SMS: SMS to MSISDN-F when Subscriber in XPMN with IMSI-F.

FIG. 45 depicts the general flow of SMS to MSISDN-F when the subscriber is at FPMN.

Signaling Gateway first maps the incoming SRI-SM message from SMSC-X to a new transaction of SRI-SM with HLR-H by replacing the MSISDN-F number by MSISDN-H. The transformation is as shown in Table 36.

TABLE 36

| SRI-SM from SMSC-X | | SRI-SM from Signaling Gateway to HLR-H via GMSC-H | |
|---|---|---|---|
| SCCP Called Address: | | SCCP Called Address: | |
| GT: | MSISDN-F | GT: | HLR-H |
| SSN: | 6 | SSN: | 6 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |
| Map-level parameters: | | Map-level parameters: | |
| MSISDN: | MSISDN-F | MSISDN: | MSISDN-H |

The Ack is transformed as shown in Table 37.

TABLE 37

| SRI-SM Ack from HLR-H to the SG | | Ack from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |

TABLE 37-continued

| SRI-SM Ack from HLR-H to the SG | | Ack from Signaling Gateway to SMSC-X via GMSC-H | |
|---|---|---|---|
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| VMSC: | SG-VMSC-F | VMSC: | SG-VMSC-F |
| IMSI: | IMSI-H | IMSI: | IMSI-F |

SMSC-X issues a FSM message to the Signaling Gateway. The message is transformed as shown I Table 38.

TABLE 38

| MT FSM from SMSC-X | | Message from Signaling Gateway to VMSC-F via GMSC-H | |
|---|---|---|---|
| SCCP Called Address: | | SCCP Called Address: | |
| GT: | SG-VMSC-F | GT: | VMSC-F |
| SSN: | 8 | SSN: | 8 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |
| MAP level parameters: | | MAP level parameters: | |
| SM-RP-OA: | SMSC-X | SM-RP-OA: | SG-VMSC-F |
| SM-RP-DA: | IMSI-F | SM-RP-DA: | IMSI-F |

Note that the signaling gateway has a HPMN Global Title so there is no need to worry about SM-RP-OA being national or international since the sending SMSC should have take care of this case by making the address indicator as international as if the subscriber is roaming, irrespective of what subscriber number the sender is sending to.

Since the Signaling Gateway also modifies the SCCP Calling Party Address, the confirmation message is also routed back the same way as shown in Table 39.

TABLE 39

| MT FSM Response from VMSC-F | | Message from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |
| SCCP Calling Address: | | SCCP Calling Address: | |
| GT: | VMSC-F | GT: | SG-VMSC-F |
| SSN: | 8 | SSN: | 8 |
| TT: | 0 | TT: | 0 |

Figure 46:
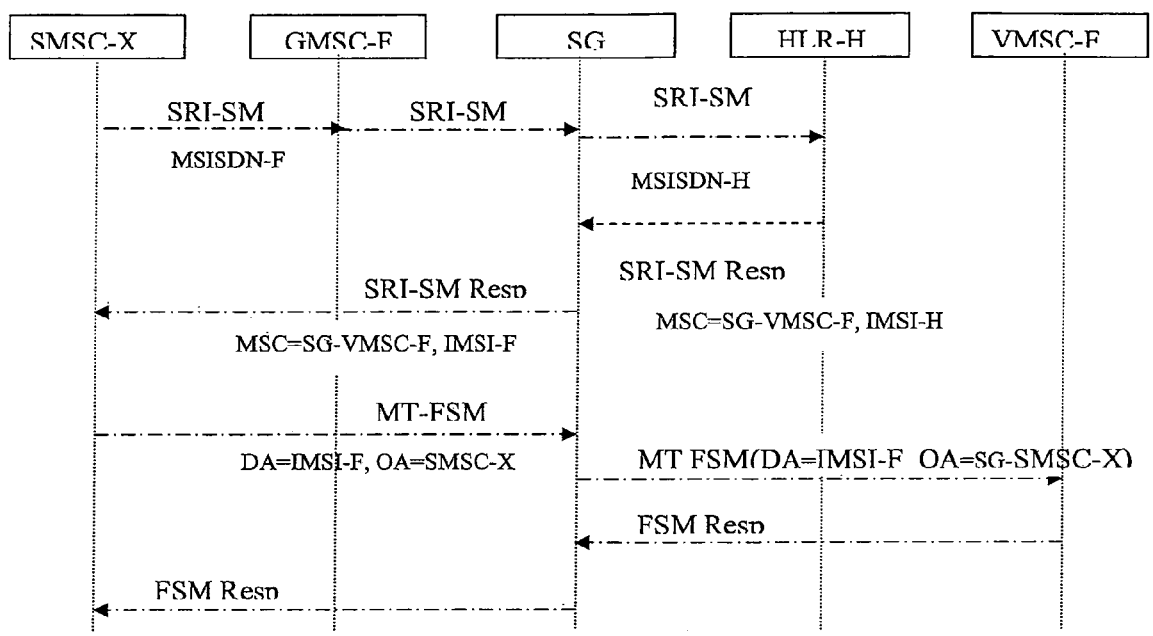
FIG. 46 shows a signal flow for another case of SMS to MSISDN-F when the subscriber is at FPMN in the case of mobile terminated SMS:SMS to MSISDN-F when Subscriber in XPMN with IMSI-F, including successful message delivery and Signaling Gateway generation of a CDR when a mobile terminated SMS is delivered successfully.

Signaling Gateway generates a CDR if the message was delivered successfully. This CDR may be used to apply a special discount for MIMM subscribers. FIG. 46 is the Signal Flow Diagram for this scenario.

Mobile Terminated SMS: SMS to MSISDN-F when Subscriber in XPMN with IMSI-H

Collectively, for the purposes of this scenario, HPMN and VPMN are referred to here as XPMN. Since MSISDN-F is from a specific range of numbers, GMSC-F is configured with GTT to route the SRI-SM request towards GMSC-H which then routes the SRI-SM to the Signaling Gateway with SCCP Called Party Address as MSISDN-F. The Signaling Gateway transforms the message as shown in table 40.

TABLE 40

| SRI-SM from SMSC-X | | Message from Signaling Gateway to HLR-H via GMSC-H | |
|---|---|---|---|
| SCCP Called Address: | | SCCP Called Address: | |
| GT: | MSISDN-F | GT: | MSISDN-H |
| SSN: | 6 | SSN: | 6 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The SRI-SM response is routed back to the Signaling Gateway since the SCCP Calling Party Address was modified too. The response is translated as shown in table 41.

TABLE 41

| SRI-SM Response from HLR | | Message from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG |
| SSN: | 6 | SSN: | 6 |
| TT: | 0 | TT: | 0 |
| MAP level parameters: | | MAP level parameters: | |
| IMSI: | IMSI-H | IMSI: | IMSI-F |
| MSC: | SG-VMSC-X | MSC: | SG-VMSC-X |

SMSC-X issues a FSM message to the Signaling Gateway. The message is transformed as shown in table 42.

TABLE 42

| MT FSM from SMSC-X | | Message from Signaling Gateway to VMSC-X via GMSC-H | |
|---|---|---|---|
| SCCP Called Address: | | SCCP Called Address: | |
| GT: | SG-VMSC-X | GT: | VMSC-X |
| SSN: | 8 | SSN: | 8 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |

TABLE 42-continued

| MT FSM from SMSC-X | | Message from Signaling Gateway to VMSC-X via GMSC-H | |
|---|---|---|---|
| MAP level parameters: | | MAP level parameters: | |
| SM-RP-OA: | SMSC-X | SM-RP-OA: | SG-SMSC-X |

Since the Signaling Gateway also modifies the SCCP Calling Party Address, the confirmation message is also routed back the same way as shown in table 43.

TABLE 43

| MT FSM Response from VMSC-X | | Message from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |
| SCCP Calling Address: | | SCCP Calling Address: | |
| GT: | VMSC-X | GT: | SG-VMSC-X |
| SSN: | 8 | SSN: | 8 |
| TT: | 0 | TT: | 0 |

Figure 47:
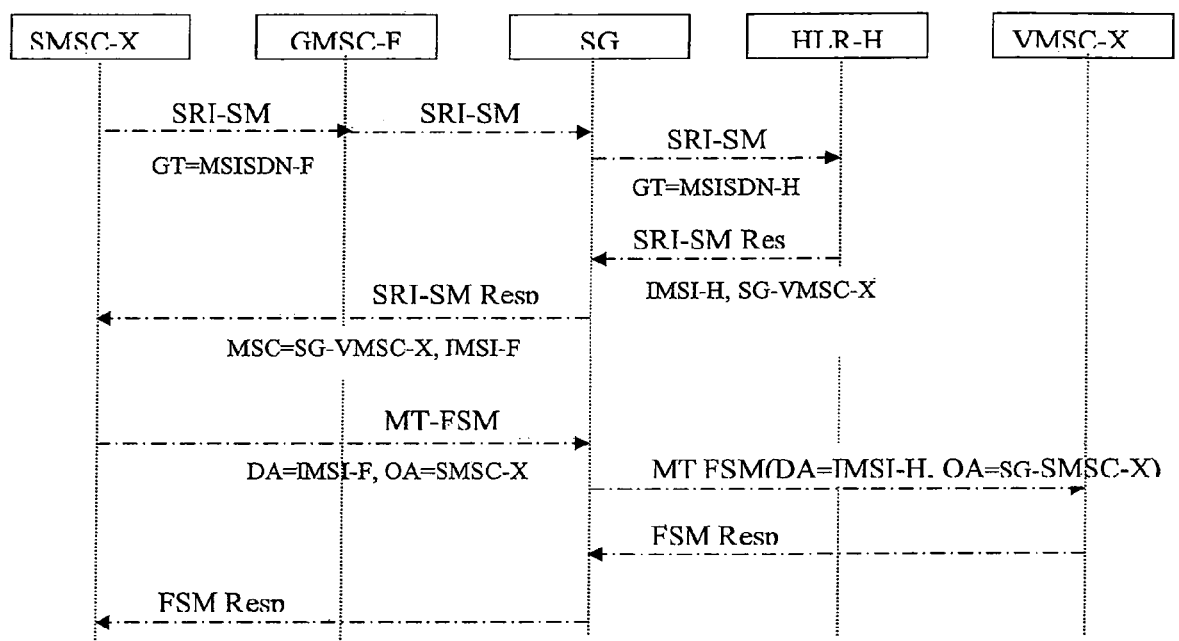
FIG. 47 shows a signal flow for another case of SMS to MSISDN-F when the subscriber is at FPMN in the case of mobile terminated SMS:SMS to MSISDN-F when Subscriber in XPMN with IMSI-H, including successful message delivery and Signaling Gateway generation of a CDR when a mobile terminated SMS is delivered successfully.

Signaling Gateway generates a CDR if the message was delivered successfully. This CDR may be used to apply a special discount for MIMM subscribers. FIG. 47 is a Signal Flow Diagram for this scenario.

Mobile Originated SMS

For all practical purposes, it is assumed that the MIMM subscriber uses one of the HPMN SMSC for sending mobile originated SMS messages. When IMSI-H is registered with a network, the sender's address is always MSISDN-H and the SMSC address is SMSC-H. Normal MO-SMS procedure applies.

When IMSI-F is registered with a network, SMSC-S-H is a special HPMN SMSC address to be used as a SMSC address. In the Insert Subscriber Data message routed from HPMN to a PMN where IMSI-F is registered (e.g. when subscriber is roaming in FPMN), MSISDN-H was changed to MSISDN-F. Hence, all SMS messages originating from such a PMN with IMSI-F registration will have MSISDN-F as the sender address.

Figure 48:
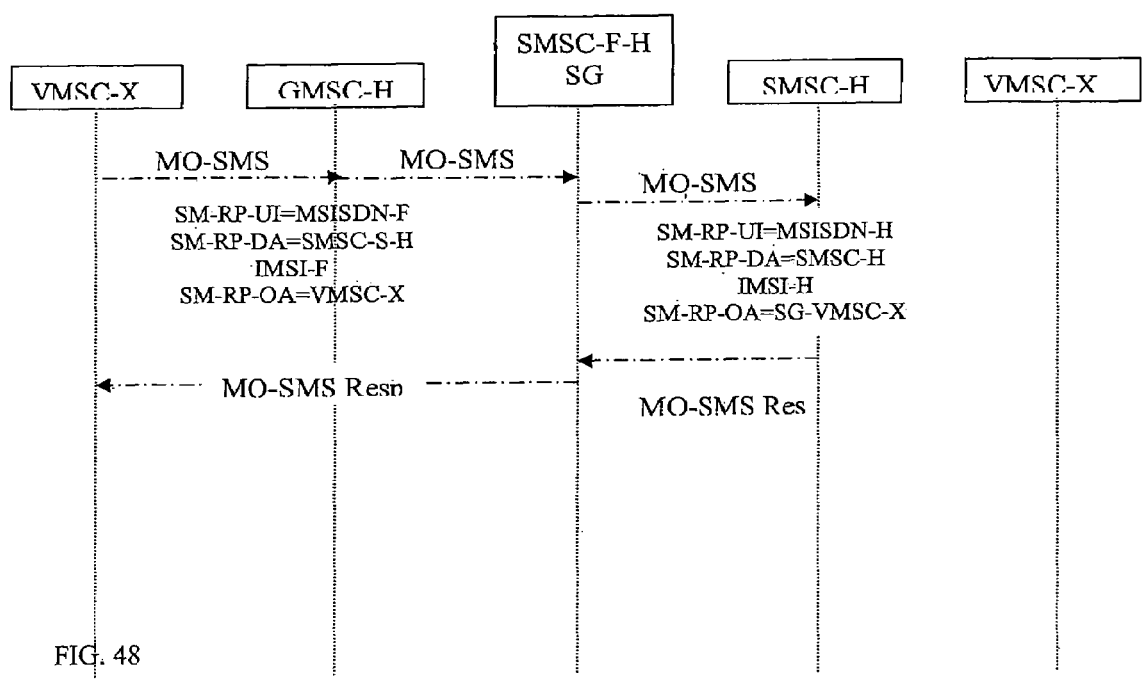
FIG. 48 shows a signal flow for a mobile generated SMS.

When the MIMM subscriber registered with IMSI-F sends a SMS to a non-FPMN country number, the sender address should be changed to MSISDN-H unless subscriber sets the option otherwise. When IMSI-F is registered, SMSC-S-H is used instead of SMSC-H when IMSI-H is registered. The SMSC-S-H is a GT that HPMN GMSC-H/GTT translates to a signal gateway. When an IMSI-F registered MIMM subscriber sends a MO-SMS to SMSC-S-H. The MO-SMS reaches the signal gateway. The signal gateway then relays it to the real SMSC-H after converting IMSI-F to IMSI-H and MSISDN-F to MSISDN-H and others. A signal flow for this scenario is shown in FIG. 48.

SMS Re-Delivery Management

For SMS sent to the MSISDN-H number by a SMSC-X, because the signal gateway always forward SMS delivery status back to the SMSC-X, SMSC-X will only need to inform HLR-H for delivery report (e.g. to set message waiting data). Subsequent interactions regarding Alert Service Center and Inform Service Center will be between the HLR-H and the SMSC-X directly. The signal gateway function may only be involved in SMS delivery or relay.

Ready-For-SMS map message on IMSI-H for a MIMM subscriber will not involve the signal gateway function.

However, because the signal gateway functions like a virtual HLR to the MSISDN-F number of a MIMM subscriber, when SRI-SM was sent on CdPA=MSISDN-F, the signal gateway function is the responding entity or HLR to the SMSC-X. This means that delivery report status due to failure will be sent by the SMSC-X to the Signaling Gateway. Subsequent interactions regarding Alert-Service-Center and Inform-Service-Center will also between SMSC-X and the signal gateway.

Ready-For-SMS map message on IMSI-F for a MIMM subscriber will be transparently handled by the signal gateway function.

The Signaling Gateway first maps the incoming ReportSM Delivery message from SMSC-X to a new transaction of ReportSM with HLR-H by replacing the MSISDN-F number by MSISDN-H. The transformation is as shown in Table 44.

TABLE 44

| ReportSM from SMSC-X | | ReportSM from Signaling Gateway to HLR-H via GMSC-H | |
|---|---|---|---|
| SCCP Called Address: | | SCCP Called Address: | |
| GT: | MSISDN-F | GT: | HLR-H |
| SSN: | 6 | SSN: | 6 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |
| MAP level parameters: | | MAP level parameters: | |
| MSISDN: | MSISDN-F | MSISDN: | MSISDN-H |

The Ack is transformed as shown in Table 45.

TABLE 45

| ReportSM Ack from HLR-H to the SG | | Ack from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSISDN-alert: | MSISDN-H | MSISDN-alert: | MSISDN-H |

Figure 49:
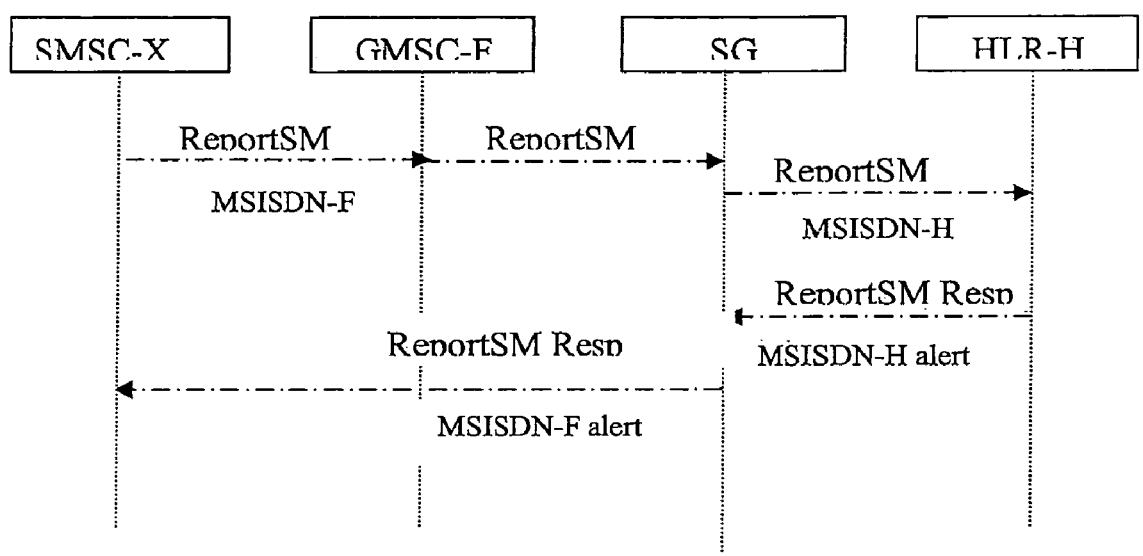
FIG. 49 shows a signal flow for a case of SMS re-delivery management.

FIG. 49 is a Signal Flow Diagram for this scenario.

To HLR-H in this case, the Signaling Gateway that sent the ReportSM-Delivery will be the SMSC-X to send Alert-Service-Center when ready-for-SM is received. Similar actions for Inform-Service-Center will also be performed when SRI-SM is issued from the signal gateway to the HLR-H. This is illustrated in Table 46.

TABLE 46

| AlertSC from HLR-H | | AlertSC from the Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSISDNAlert: | MSISDN-H | MSISDNAlert: | MSISDN-F |

Figure 50:
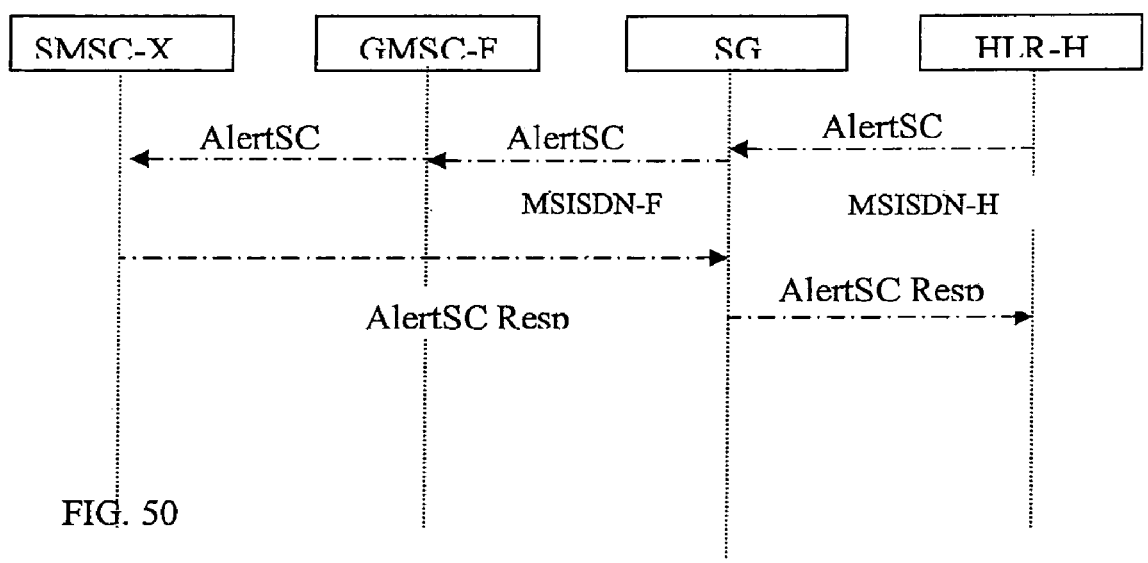
FIG. 50 shows a further signal flow for a case of SMS re-delivery management.

FIG. 50 is a Signal Flow Diagram for this scenario.

Numerous GSM scenarios involving embodiments of the Signaling Gateway method and apparatus have been described in detail.

Miscellaneous interfaces to the Signaling Gateway will now be discussed.

Number Portability Considerations

The number portability domain considered is within a country. Subscribers who port out a MIMM service number to another operator will no longer have access to this service. Their IMSI-H, IMSI-F and all MSISDN-H to MSISDN-F mappings are deleted from the Signaling Gateway. Other operations like removing the subscriber from the HLR, adding entry to Number Portability database etc. will be performed independent of the Signaling Gateway. Since the ported-out MSISDN will now be associated with the IMSI of another operator, the MGT based routing will never be received at HPMN. However, the HPMN GMSC will still need to perform Number Portability lookup and routing of calls to the PMN currently serving the ported-out MSISDN.

Subscribers will be allowed to port-in their existing numbers from other operators in the country of the HPMN. Normal operations like adding a new subscriber (by assigning a SIM with IMSI-H in the MIMM range) in the HLR and associating the ported-in number; adding the ported-in number to the Number Portability database etc. are outside the scope of Signaling Gateway. Through the Signaling Gateway provisioning interface, this IMSI will be mapped to MSISDN-H and MSISDN-F at the Signaling Gateway subscriber DB.

For signaling messages (Update Location, for example) routed on MGT for this subscriber, since the IMSI-H belongs to HPMN and IMSI-F belongs to FPMN, the messages will get routed to HPMN. The ported-in MSISDN-H will be returned in the Insert Subscriber Data message and substituted with MSISDN-F when subscriber is roaming in FPMN or registered with IMSI-F. For signaling messages routed on MSISDN-H (when not routed via the Signaling Gateway), the HPMN GMSC will handle them normally.

For signaling messages routed on MSISDN-F/MGT-F, there are various options available:

a) Signaling Gateway routes the messages directly to the HLR by mapping the MSISDN-F/MGT-F to MSISDN-H/MGT-H and looking up corresponding IMSI-H/MGT-H range mapping to HLR.
 b) Signaling Gateway maps MSISDN-F/MGT-F to MSISDN-H/MGT-H and routes the message via the HPMN GMSC/STP. The GMSC/STP is responsible for looking up the Number Portability database and forwarding the signaling message.
 c) Signaling Gateway maps MSISDN-F/MGT-F to MSISDN-H/MGT-H; interfaces to the Number Portability database; retrieves the routing number and sends it to GMSC/STP for further routing. This approach may require development of an interface to the Number Portability Database.

If MSISDN-F is ported out, FPMN GMSC will be responsible for handling the signaling in the normal way for a ported out number (e.g. don't route messages on CdPA=ported-out-MSISDN-F towards GMSC-H and the Signaling Gateway function) and hence these messages will never reach the Signaling Gateway. If a number in FPMN is ported-in and needs to be part of the MIMM service, then the FPMN GMSC will need configuration to route the signaling messages for this MSISDN to the Signaling Gateway. This is similar to the case where FPMN ports one number from a HLR to another HLR. The Signaling Gateway is the port-in HLR in this case. Signaling Gateway simply adds the ported in number to its subscriber DB.

Location-Based Services

This section is again to assure that the MIMM service should not affect subscribers' normal roaming location-based services when these are rolled out.

Location-based services consist of SMLC and GMLC. SMLC is like a VLR. It determines the positioning method and determines the position of a MS based on MS's measurements of LMUs. These location measurement units are to SMLC like a VMSC to VLRs. GMLC provides a location interface for LCS (location service) clients to request location information about a targeted MS.

SRI-LCS is a MAP message between GMLC and HLR. It operates on IMSI and MSISDN to locate the VMSC to request location information of a MS. If the message is on MSISDN-H, it has nothing do with the signal gateway function except returning SG as VMSC if the MIMM subscriber is registered on FPMN or with IMSI-F registration at VPMN. However if the message is on MSISDN-F, then the signal gateway will map the message by replacing MSISDN-F by MSISDN-H when relaying the message to HLR-H. It also returns the signal gateway itself to the GMLC.

PSL (Provide Subscriber Location) is a MAP message between GMLC and VMSC to request location information of a target MS. It again operates on IMSI and MSISDN. When the MIMM subscriber is registered in FPMN or with IMSI-F, the VMSC to GMLC will be the Signaling Gateway SG itself. Thus in this case, if the message is on MSISDN-H, the Signal gateway will need to map the message by replacing MSISDN-H by MSISDN-F, IMSI-H by IMSI-F and impersonating the GMLC to the real VMSC; while if the message is on MSISDN-F, the signal gateway will simply relay the message to the real VMSC.

The SRI-LCS and PSL are analogous to SRI and PRN for call services. However there is no analogy for SLR service which arises when a request for location is either implicitly administered or made at some earlier time by PSL. For Subscriber Location Report service between VMSC and GMLC which also operates on MSISDN and IMSI, special handling is also required when the subscriber registers at FPMN. In this case, when message is sent to the Signaling Gateway by VMSC-F on MSISDN-F, the signal gateway will replace the MSISDN-F by MSISDN-H before relaying on to the original requesting GMLC if the original requesting GMLC is asking location information on MSISDN-H; while it is not replaced, if the original requesting GMLC is asking location information on MSISDN-F.

Multiple HPMN Support

Figure 51:
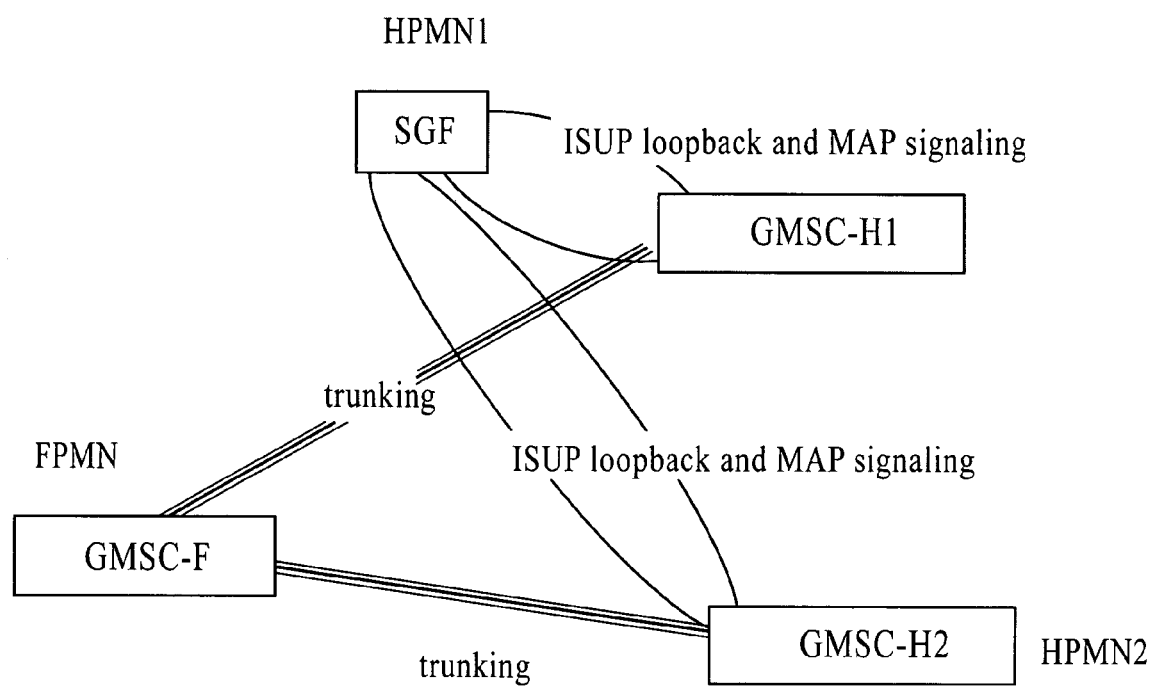
FIG. 51 is a block diagram of a Signaling Gateway that supports multiple HPMNs in addition to multiple FPMNs.

The signal gateway function is also able to support multiple HPMNs in addition to multiple FPMNs. With reference to FIG. 51, the platform will be hosted in one HPMN or by a third party service provider. The platform however must have access to SS7 networks of each HPMN. Where there are signal protocol variants, special signaling conversion over leased line will need be performed. Furthermore, GTT configuration between the hosting network and the targeting network must be performed to pass messages routed on CdPA=MSISDN-F/MSISDN-H and CdPA=MGT-F/MGT-H.

Voice trunk calls could still happen directly between FPMN and HPMN, not necessarily via the other HPMN although that is also possible. In both cases, the ISUP loopback or IN signaling however can all go through the common platform hosted in one HPMN or by a third party service provider.

Signaling Gateway Recovery Procedure

When a MIMM subscriber registers at FPMN, the Signaling Gateway maintains the information on the true VMSC-F and VLR-F the roamer is currently in. Additional dynamic information that needs to be maintained is between original FTN and the temporary, substituted FTN sent to the VLR-F in Insert Subscriber Data message. The data is maintained in memory; and also stored on DB of mirrored disks. It is also periodically backup into a non-volatile storage.

Since the Signal gateway is a virtual VLR and a virtual HLR, all information maintained at the signal gateway is transitional and can be established by interactions with VLR-F and HLR-H. There will be no indicators about the status of real VLR stored in the signal gateway. The signal gateway will just map whatever incoming messages to the real destinations. Also since the HLR information is always obtained upon a location update at FPMN by the signal gateway function, VLR restoration procedure at the signal gateway is unnecessary. The MAP-Reset to the real VLR-F by the faulty signal gateway's recovery procedure will be sufficient to automatically obtain the HLR data.

The recovery of signal gateway is a concern, but not the VLR or the HLR. When VLR fails, the VLR will issue MAP-Restore on an affected IMSI. For MAP-Restore on a MIMM IMSI, the signal gateway simply relays the message to the corresponding HLR-H. Similarly when HLR fails, MAP-Reset will be issued to the signal gateway when the MIMM subscriber registers at FPMN. The gateway thus relays the MAP-Reset message to the real VLR-F.

Now after a recovery/restart operation of the signal gateway, all roaming records affected in the system are marked as "Not Updated". For all MIMM subscribers, the Signaling Gateway issues a SRI-SM using SCCP Called Party Address as MSISDN-H. The HLR returns the IMSI and MSC address. If the MSC address is not in FPMN, the corresponding record in the Signaling Gateway is deleted. If the MSC address is the Signaling Gateway address, the corresponding record is marked as "Not Updated". This is because we only need to worry about MIMM subscribers in FPMN. However the SRI-SM part could flood the HLR-Hs, it is only treated as an option and does not affect the overall recovery procedure.

For each IMSI of a "Not Updated" record, if the VLR address of the record is not null, it is put in the set of Reset-VLR and if the SGSN address of the record is not null, it is put in the set of Reset-SGSN. For each VLR in Reset-VLR, the Signaling Gateway issues a MAP-Reset to the VLR with SG as the HLR number in the MAP-Reset message. This causes the VLR-F to issue Updatelocation after radio contact is established. This will also cause HLR-H to insertSubData to the signal gateway function. For each SGSN in Reset-SGSN, the Signaling Gateway issues a MAP-Reset to the SGSN with SG as the HLR number in the MAP-Reset message. This will cause the SGSN-F to issue UpdateGPRSlocation after radio contact is established. This will also cause HLR-H to insertSubData to the signal gateway function.

Alternatively for each IMSI of a "Not Updated" record, the Signaling Gateway issues a MAP-Reset to the VLR if the VLR field is not empty and issues a MAP-Reset to the SGSN if the SGSN field is not empty. In both cases, either HLR number or HLR number list containing the IMSI could be used in the MAP-reset message. This will cause the VLR-F/SGSN-F to issue Updatelocation/UpdateGPRSlocation after radio contact is established. This will also cause HLR-H to insertSubData to the signal gateway function.

Unlike a real VLR, upon receipt of a MAP_PROVIDE_ROAMING_NUMBER indication from a HLR-H for an IMSI that is unknown in the SG's roamer record, the signal gateway simply issues error ack back to the HLR-H. If the IMSI is known, since there is no status indicator at the signal gateway, the signal gateway issues PRN to the real VLR-F if known. After that, normal restoration procedure and status indicator management at the real VLR-F take place.

The SG restoration procedure forces updating of VMSC-F number, VLR-F number, SGSN number and, if provided by the VLR-F, LMSI in the SG. Consistency of subscriber data that are stored in the VLR-F for an MS that has been affected by a SG fault with the subscriber data stored in the SG for this MS will be achieved.

As an implementation option, a notification can be forwarded to the MS to alert the subscriber to check the parameters for supplementary services that allow subscriber controlled input (MAP_FORWARD_CHECK_SS_INDICATION service). If the VLR-F or SGSN-F receives this notification from the SG it shall forward the notification to the MS. The figure below illustrates the signaling sequence for SG restoration.

After a restart, the signal gateway performs the following actions for the subscriber data records that have been affected by the SG fault:
  reload the all roamer data from a non-volatile backup
  if the MAP_FORWARD_CHECK_SS_INDICATION service is required, mark each subscriber record "SS Check Required" by setting the "Check SS" indicator;
  send a MAP_RESET request to the VLR-Fs or SGSNs where its MSs are located;

The MAP_RESET request contains the SG number and optionally the HLR Identity List. When receiving a MAP_RESET indication, the VLR-F will derive all involved MSs of that SG either from the HLR Identity List (if present), or from the SG number. The VLR-F will then mark these MSs with the indicator "Location Information Confirmed in HLR" set to "Not Confirmed" and will deactivate all subscriber tracings for these MSs.

The status "Not Confirmed" of the indicator "Location Information Confirmed in HLR" forces the VLR-F to invoke the MAP_UPDATE_LOCATION service after establishment of authenticated radio contact with the MS concerned.

When the MAP_UPDATE_LOCATION procedure is performed, after receipt of the MAP_UPDATE_LOCATION acknowledge containing the SG number, the status of the indicator "Location Information Confirmed in HLR" is changed to "Confirmed".

Figure 52:
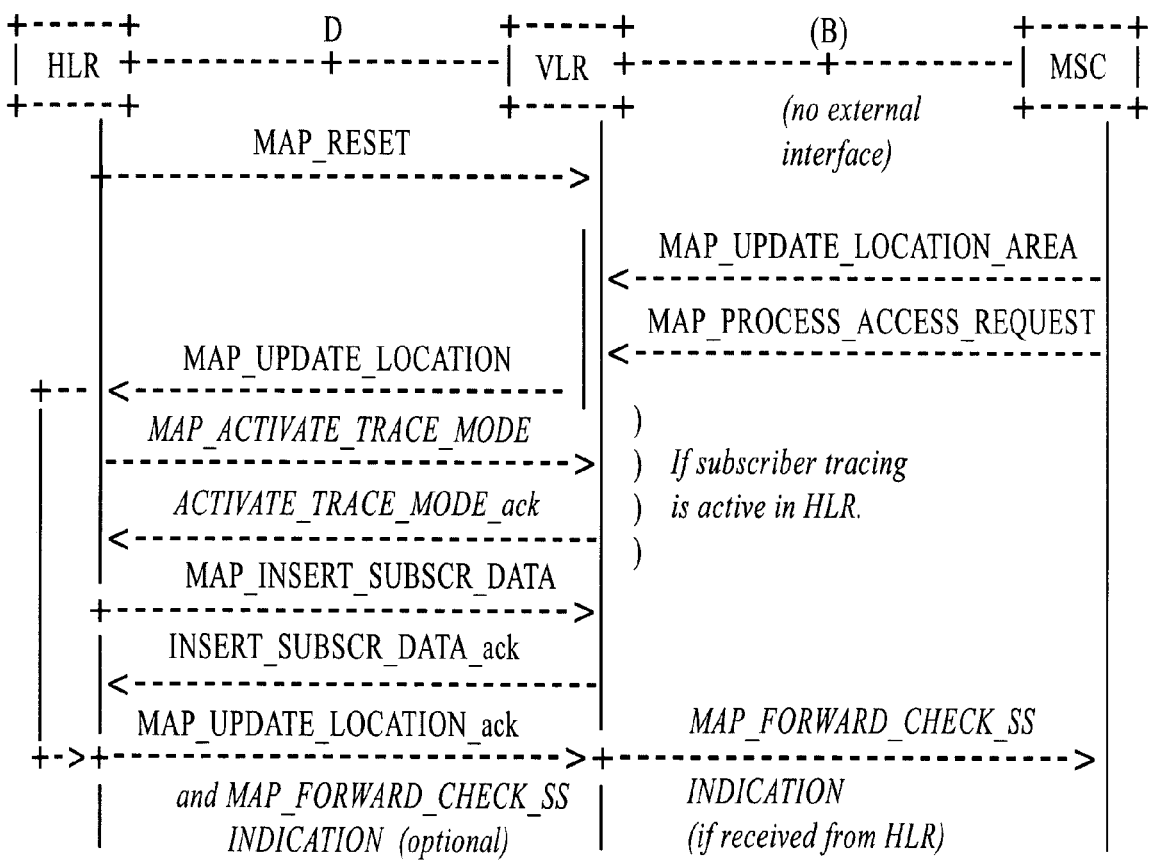
FIG. 52 shows a signal flow for an embodiment of a Signaling Gateway recovery procedure.

If the MAP_UPDATE_LOCATION procedure is unsuccessful for any reason, the status of the indicator "Location Information Confirmed in HLR" remains unchanged except for the case that the IMSI record in the VLR-F is deleted because either of the errors "Unknown Subscriber" or "Roaming Not Allowed" has been received from the SG in response to a MAP_UPDATE_LOCATION request. A signal trace for this scenario is shown in FIG. 52.

For "Not Updated" records, if Signaling Gateway receives an Update Location message, the MSC and VLR address are extracted; stored in the Signaling Gateway and the record status is changed to "Updated". A log of all recovery messages attempted and received is generated.

Compliance

The signal gateway complies with the following specifications:

3GPP TS 09.02 v7.7 R1999/3GPP TS29.002

Q711-716 SCCP

Q761-764 Q767

3GPP TS 23.003 V3.9.0 (2001-06)

GSM 03.60 version 6.6.1 Release 1997

GSM 03.90 version 7.0.0 Release 1998

GSM 03.40 version 7.4.0 Release 1998/3GPP TS 03.40 V7.5.0 (2001-12)

GSM 03.18 version 6.6.0 Release 1997/3GPP TS 23.018 V3.10.0 (2002-01)

OFTA spec 2202/2204.

There may be parameters missed in the current implementation due to unforeseeable considerations. These will be handled as part of the free-upgrade and support in the maintenance contract.

The signal gateway handles the mapping between MSISDN-H stored in HPMN HLR and MSISDN-F stored in the signal gateway function. There are many data service (circuit switch, HSCSD, GPRS) which MSISDN may not be involved. And there are SS and USSD service which shall reach HPMN real HLR according to IMSI. In all these situations, the signal gateway function:

1. either relays them to the real destinations at the first interaction. Subsequent interactions will be directly between the two parties without further participation from the signal gateway; or
2. maps them to the real destination by initiating a new transaction and subsequent iterations will go through the signal gateway function.

For example, all the procedures shown in Table 47 are handled by the signal gateway.

TABLE 47

| Message |
|---|
| MAP_Send_Routing_Info_For_SM request |
| MAP_Send_Routing_Info_For_SM response |
| MAP_Forward_Short_Message MO-request |
| MAP_Forward_Short_Message MO-response |
| MAP_Forward_Short_Message MT-request |
| MAP_Forward_Short_Message MT-response |
| MAP_Report_SM_Delivery_Status request |
| MAP_Report_SM_Delivery_Status response |
| MAP_Ready_For SM request |
| MAP_Ready_For_SM response |
| MAP_Alert_Service_Centre request |
| MAP_Alert_Service_Centre response |
| MAP_Activate_Trace_Mode request |
| MAP_Activate_Trace_Mode response |
| MAP_Deactivate_Trace_Mode request |
| MAP_Dectivate_Trace_Mode response |
| MAP_Purge_MS request |
| MAP_Purge_MS response |
| MAP_Send_Authentication_Info request |
| MAP_Send_Authentication_Info response |
| MAP_Delete_Subscriber_Data request |
| MAP_Delete_Subscriber_Data response |
| MAP_Register_SS request |
| MAP_Register_SS response |
| MAP_Activate_SS request |
| MAP_Activate_SS response |
| MAP_Deactivate_SS request |
| MAP_Deactivate_SS response |
| MAP_Interrogate_SS request |
| MAP_Interrogate_SS response |
| MAP_Purge_MS request |
| MAP_Purge_MS response |
| MAP-Reset request |
| MAP-Restore request |
| MAP-Restore response |
| MAP-Forward-SS Check indication |
| MAP-UpdateGPRSLocation |
| MAP-Register-CC entry |
| MAP-Erase-CC entry |
| MAP-processUSSDrequest |
| MAP-UssdRequest |
| MAP-SSInvokeNotify |
| etc |

In summary, all MAP messages going through the signal gateway will not be affected by the signal gateway for the normal services.

For ISUP messages, the signal gateway is compliant with OFTA-2202-3 and 2204.

GPRS

If the MIMM subscriber uses IMSI-H registration in an operator, GPRS service is completely the same as a normal subscriber. However when IMSI-F is used, although GPRS map signaling of the MIMM subscribers will be supported by the current signal gateway function, GPRS data transport will require additional functions from the signal gateway. The signal gateway will then need be data relay router too. We only address the MAP signaling aspect of GPRS here.

Since UpdateGPRSLocation with IMSI-F is routed with CdPA=MGT-of-IMSI-H by the SGSN-X, when the message reaches at GMSC-F, possibly GMSC-H, the GTT will direct the message to a signal gateway. The Signal gateway will modify the CgPA address to SG-SGSN-X and the CdPA to the GT of the HLR-H corresponding to the MGT of IMSI-H by issuing a new transaction between the signal gateway and the HLR-H. In particular, SG becomes the SGSN number to HLR-H. The HLR-H interacts with the SG and SG with SGSN-X subsequently (e.g. insertSubData, acks etc) with their corresponding transaction contexts.

When CancelLocation is issued by HLR-H due to an UpdateGPRSLocation from another SGSN, the message will be sent directly to the SG which will then maps to the real SGSN-F by issuing a new transaction. When SRI-SM with GPRS support indicator issued by a SMSC to HLR-H that also supports GPRS, then SG will be returned as the SGSN node to the SMSC which will then forward the message to the SG which will then forward the message to the real SGSN. The Signaling Gateway produces billing records as an interceptor here.

The behavior of GPRS MAP signaling will be very similar to the voice and SMS signaling except that SGSN plays the role of VMSC or VLR and hence the signal gateway will double as the SGSN when the mobile station registers with GPRS at FPMN.

On IMSI-F registration, we will only illustrate the case of updateGPRSLocation by SGSN-X and SRI-SM by a SMSC that supports GPRS. SGSN SSN is 1001-0101 or 95 BCD. This case is illustrated in Table 48.

TABLE 48

| updateGPRSLoc from SGSN-X to the signal gateway function via GMSC-F/GMSC-H GTT | | Message from Signaling Gateway to HLR-H via GMSC-H | |
|---|---|---|---|
| SCCP Called Address: | | SCCP Called Address: | |
| GT: | MGT-F | GT: | HLR-H |
| SSN: | 6 | SSN: | 6 |
| TT: | 0 | TT: | 0 |
| SCCP Calling Address: | | SCCP Calling Address: | |
| GT: | SGSN-X | GT: | SG-SGSN-X |
| SSN: | 95 | SSN: | 95 |
| TT: | 0 | TT: | 0 |
| MAP level parameters: | | MAP level parameters: | |
| SGSN: | SGSN-X | SGSN: | SG-SGSN-X |
| IMSI: | IMSI-F | IMSI: | IMSI-H |

Note however since SMS will be forwarded to whatever the HPMN-HLR will return when it receives a SRI-SM (MSISDN-H), then when MIMM subscriber registers at a FPMN via SGSN, the signal gateway can present at least one of the following options:

a) Its HPMN GT to a HPMN HLR for SGSN imitations; or b) Its FPMN GT to a HPMN HLR for SGSN imitations in which case, the FPMN STP is configured to translate the FPMN GT in CdPA to the HPMN GT of the signal gateway. This will not be a problem if FPMN hosts the signal gateway.

On Insertsubdata, since the data session set up also involves MSISDN, MSISDN-H from HLR-H must be modified to MSISDN-F. Similarly, the HPMN based APN-H need be mapped to their corresponding special APN-F. In this way, the SGSN-X can set up the PDP context through the data enhanced signal gateway (not here yet today). Also on MIMM subscriber's handset, when IMSI-F is registered, subscribers must use APN-F instead. This case is illustrated in Table 49.

TABLE 49

| Insert Subscriber Data from HLR-H | | Message from Signaling Gateway to SGSN-F via GMSC-H | |
|---|---|---|---|
| SCCP Called Address: | | SCCP Called Address: | |
| GT: | SG-SGSN-X | GT: | SGSN-X |
| SSN: | 95 | SSN: | 95 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |
| MAP level parameters: | | MAP level parameters: | |
| MSISDN: | MSISDN-H | MSISDN: | MSISDN-F |

Figure 53:
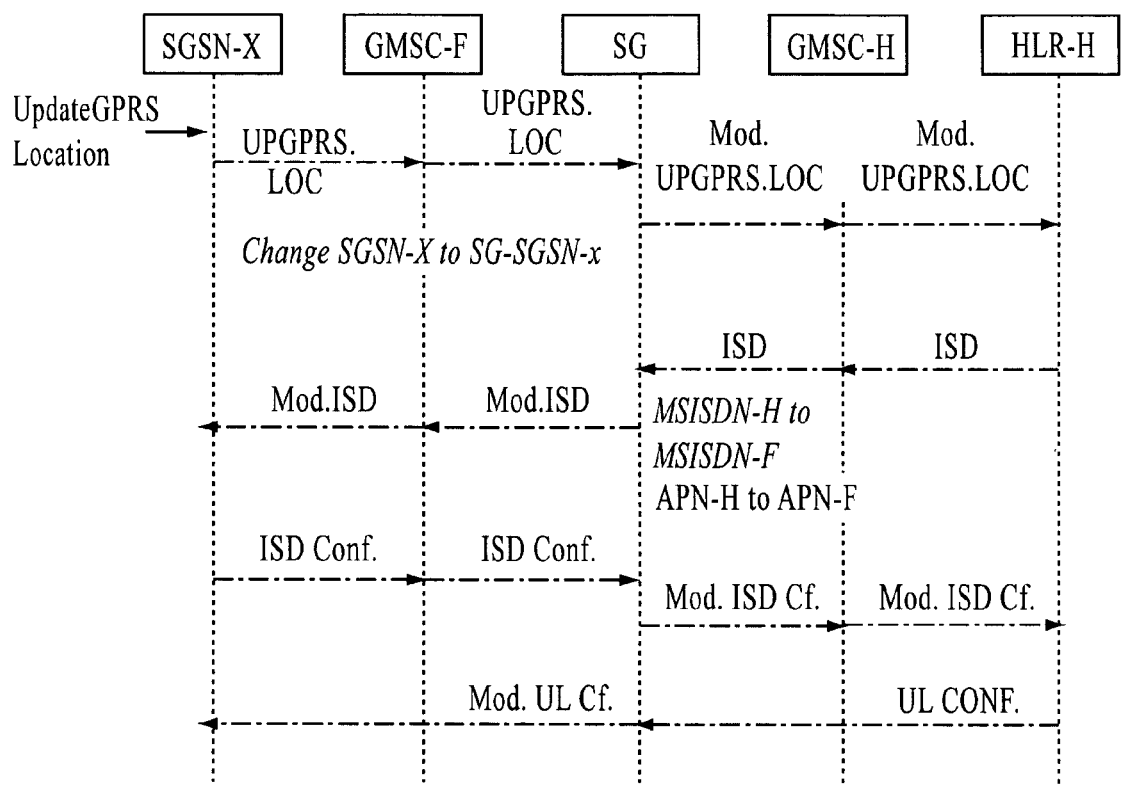
FIG. 53 shows a signal flow for an embodiment of an update location procedure.

The trace is illustrated in FIG. 53.

Note that F-SG is not used to represent the SGSN at the HLR-H when the signal gateway is presenting itself to HLR-H for updateGPRSLocation. This is because: a) SGSN will be returned to SMSC that supports GPRS in which case SMSC will not be able to route if SGSN is F-SG; and b) VLR address is still F-SG which really influence the insertSubData parameters while roaming. This problem does not arise if the signal gateway is hosted at FPMN network since F-SG will not be needed in this case.

For GPRS service, there may also be combined IMSI/GPRS attachment involving combined location and routing area update. However since this involves two separate updates from VLR an SGSN to HLR respectively, the signal gateway can distinguish when to swap the MSISDN-H by MSISDN-F when the MIMM subscriber is registering in FPMN.

The combined update is achieved by an association created between SGSN and MSC/VLR to provide for interactions between SGSN and MSC/VLR. The association is created when the VLR stores the SGSN number and the SGSN stores the VLR number. The association is used for co-coordinating MSs that are both GPRS-attached and IMSI-attached.

The association supports the following actions:
  IMSI attach and detach via SGSN. This makes combined GPRS/IMSI attach and combined GPRS/IMSI detach possible, thus saving radio resources;
  Co-ordination of LA update and RA update, including periodic updates, thus saving radio resources. A combined RA/LA update is sent from the MS to the SGSN. SGSN forwards the LA update to the VLR;
  Paging for a CS connection via the SGSN;
  Alert procedures for non-GPRS services;
  Identification procedure; and
  MM Information procedure.

The SGSN-MSC/VLR association is created at the following occasions:
  Combined IMSI/GPRS attach;
  GPRS attach when the MS is already IMSI-attached;
  Combined RA/LA update when the MS performs IMSI attach and is already GPRS-attached; and
  Combined RA/LA update when an IMSI and GPRS-attached MS changes from an area of network operation mode II or III to an area of network operation mode I.

The association is initiated by the SGSN. The SGSN creates an association by sending a BSSAP+ message concerning a particular MS to the VLR. To get the VLR number, the SGSN translates the current RAI to a VLR number via a translation table. During a CS connection, an MS in class-B mode of operation cannot perform GPRS attach nor routing area updates, only MSs in class-A mode of operation can perform these procedures. If a GPRS attach was made during a CS connection, the association shall be initiated by a combined RA/LA update after the CS connection has been released.

The association is updated on the following occasions:
  When an MS changes VLR;
  When an MS changes SGSN; and The association is not updated during a CS connection.

Figure 54:
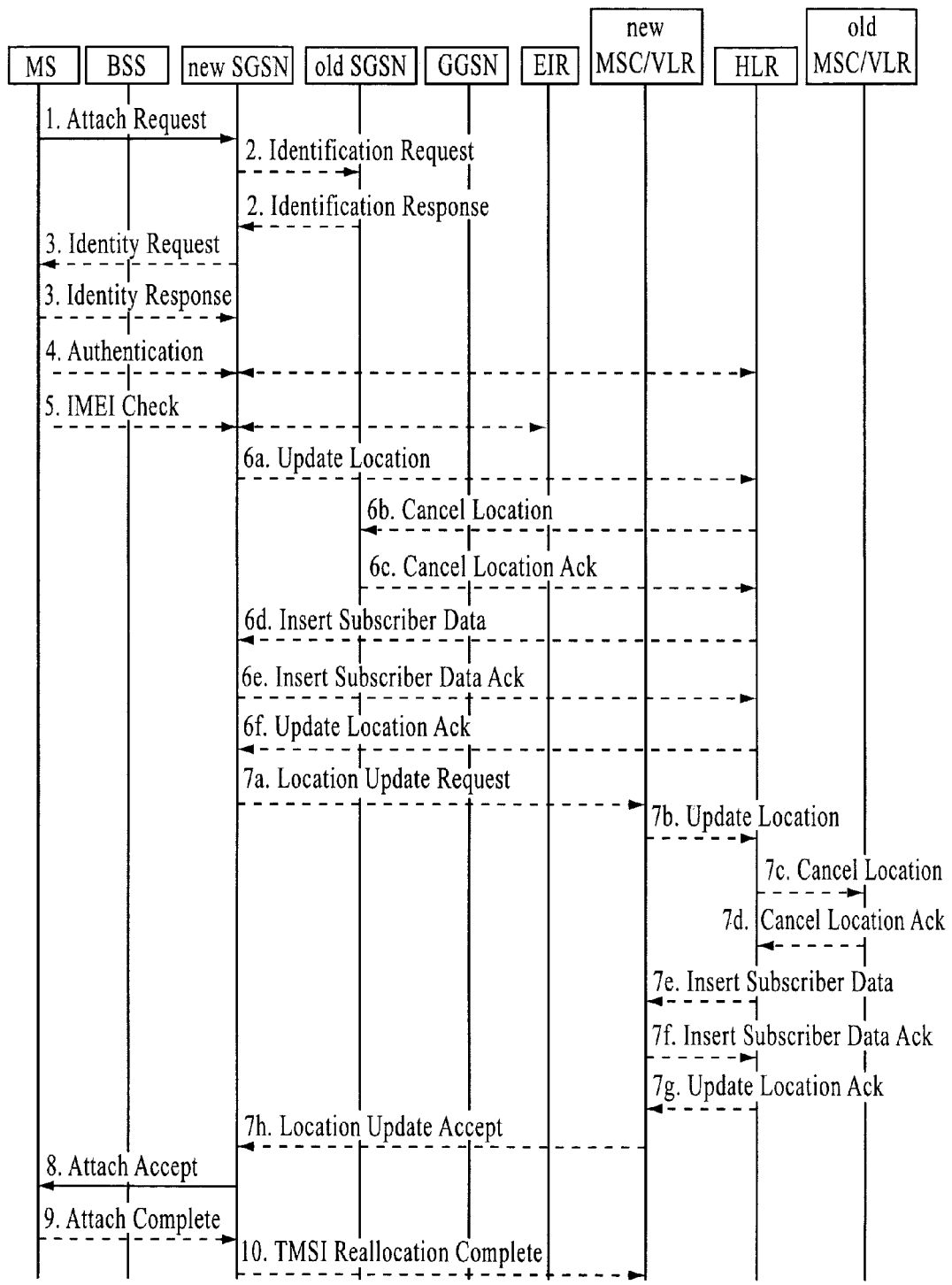
FIG. 54 shows a further signal flow for an embodiment of an update location procedure.

When the MS is in idle mode (see GSM 03.22), the association is updated with the combined RA/LA updates procedure. A signal trace is shown in FIG. 54.

Now consider the MT SMS example to MSISDN-H when the subscriber is registered at SGSN-X with IMSI-F. SMSC-X (SMSC-H, SMSC-F or SMSC-V) issues an SRI-SM MSISDN-H with GPRS support to the HLR-H with GPRS support. HLR-H has the address of the Signaling Gateway as the SGSN and returns it in SRI-SM response. SMSC-X issues a FSM to the Signaling Gateway.

Signaling Gateway performs the following as shown in Table 50.

TABLE 50

| MT FSM from SMSC-X | | Message from Signaling Gateway to SGSN-X via GMSC-H | |
|---|---|---|---|
| SCCP Called Address: | | SCCP Called Address: | |
| GT: | SG-SGSN-X | GT: | SGSN-X |
| SSN: | 8 | SSN: | 8 |
| TT: | 0 | TT: | 0 |
| SCCP Calling Address: | | SCCP Calling Address: | |
| GT: | SMSC-X | GT: | SG-SMSC-X |
| SSN: | 8 | SSN: | 8 |
| TT: | 0 | TT: | 0 |
| MAP-LEVEL Parameters: | | MAP-Level Parameters: | |
| SM-RP-DA: | IMSI-H | SM-RP-DA: | IMSI-F |
| SM-RP-OA: | SMSC-X | SM-RP-OA: | SG-SMSC-X |

The Sending SMSC address and the recipient address in the MAP message are also changed.

Note that the SCCP Calling Address has also been changed and hence the response also goes through the Signaling Gateway as shown in Table 51.

TABLE 51

| MT FSM Response from SGSN-X | | Message from Signaling Gateway to SMSC-X via GMSC-H | |
|---|---|---|---|
| SCCP Called Address: | | SCCP Called Address: | |
| GT: | SG-SMSC-X | GT: | SMSC-X |
| SSN: | 8 | SSN: | 8 |
| TT: | 0 | TT: | 0 |

TABLE 51-continued

| MT FSM Response from SGSN-X | | Message from Signaling Gateway to SMSC-X via GMSC-H | |
|---|---|---|---|
| SCCP Calling Address: | | SCCP Calling Address: | |
| GT: | SGSN-X | GT: | SG-SGSN-X |
| SSN: | 8 | SSN: | 8 |
| TT: | 0 | TT: | 0 |

Figure 55:
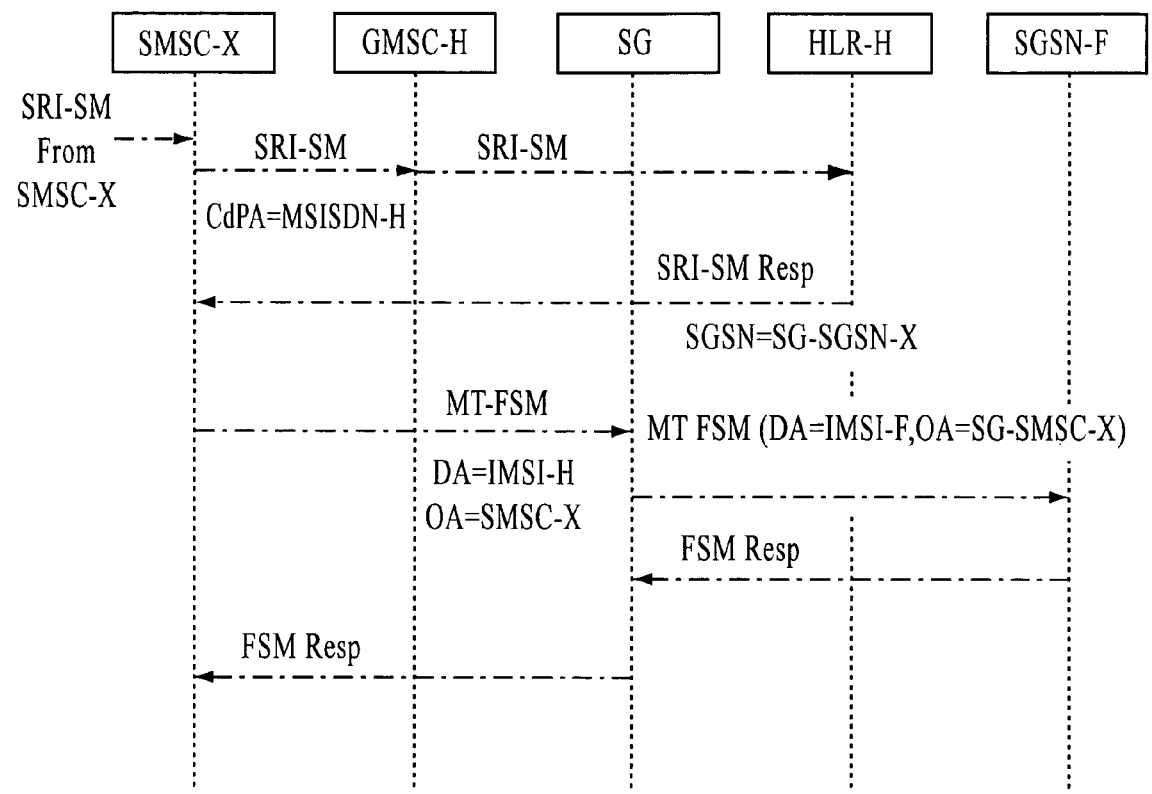
FIG. 55 shows a further signal flow for an embodiment of an update location procedure when the MS is in idle mode.

Signaling Gateway generates a CDR for this transaction and can be used to apply special charges/discounts. SGSN-F MT SMS CDR is used for SMS Inter-working settlement. Special rates may be negotiated for the specific HPMN IMSI range for Multiple MSISDN subscriber. A signal trace for this scenario is shown in FIG. 55.

Send Authentication, USSD and Supplementary MAP Services on IMSI-F

All MAP messages on Authentication services, supplementary services and ussd services are based on IMSI. They can be initiated by MS, e.g. a MO call can trigger for authentication service. These services are conducted between VMSC and VLR, between VLR and HLR, and between HLR and SCF. Since the signal gateway is only a virtual HLR/VLR/GMSC/VMSC, the only time the signal gateway will be involved is between VLR and HLR communication.

When the MAP messages on Send-Authentication, supplementary services and USSD services are routed on MGT-F between a VLR-X in XPMN and HLR-H via the signal gateway, they are redirected to the signal gateway function based on GTT on MGT-F at the GMSC-F and GMSC-H. The chosen signal gateway relays the messages to HLR-H that corresponds to the MGT-F by replacing the called MGT-F with the corresponding MGT-H or HLR-H GT. Subsequent interactions will be proxied through the Signaling Gateway.

Note when SG proxies these services to HLR-H, SG need to presents its FPMN SG GT to the HLR-H so that corresponding HLR procedures might be performed. For example, if a subscriber is not allowed to make changes to call forwarding numbers while roaming, the SG must present the FPMN GT to HLR-H. Hosting the signal gateway at FPMN will not have this problem.

This is illustrated in Table 52 using RegisterSS as an example.

TABLE 52

| RegisterSS from VLR-X with IMSI-F | | Message from Signaling Gateway to HLR | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-X | GT: | SG-VLR-X |
| SSN: | 7 | SSN: | 7 |
| TT: | 0 | TT: | 0 |

The reason that a FPMN GT of SG is introduced is because HPMN HLR procedure could be based on the subscriber network location. For example, sometimes call forwarding and call barring services registration may be not allowed while roaming.

If the HLR procedures can be configured based on VLR GT ranges, then there will not be a need to assign two types of GTs: HPMN and FPMN, to a signal gateway. The HPMN GTs of the signal gateways are simply regarded as roaming GTs by the HLR procedure configuration. As a result, for a signal gateway, its FPMN GT will be the same as its HPMN GT. For example, to support national roaming, a HLR is configured to indicate which address is a roaming GT. The SG GT can be configured like a roaming GT as if it is a roaming GT in national roaming.

Alternatively, if the HPMN network wants to regard a FPMN network as if it is an extended home network, then again there is no need for the FPMN type of GT for the signal gateway function for the FPMN network. This is illustrated in Table 53.

TABLE 53

| RegisterSS from HLR-H | | Message from Signaling Gateway to VLR-X via GMSC-H | |
|---|---|---|---|
| SCCP Called Address: | | SCCP Called Address: | |
| GT: | SG-VLR-X | GT: | VLR-X |
| SSN: | 7 | SSN: | 7 |
| TT: | 0 | TT: | 0 |
| SCCP Calling Address: | | SCCP Calling Address: | |
| GT: | HLR-H | GT: | SG-HLR-H |
| SSN: | 6 | SSN: | 6 |
| TT: | 0 | TT: | 0 |

Figure 56:
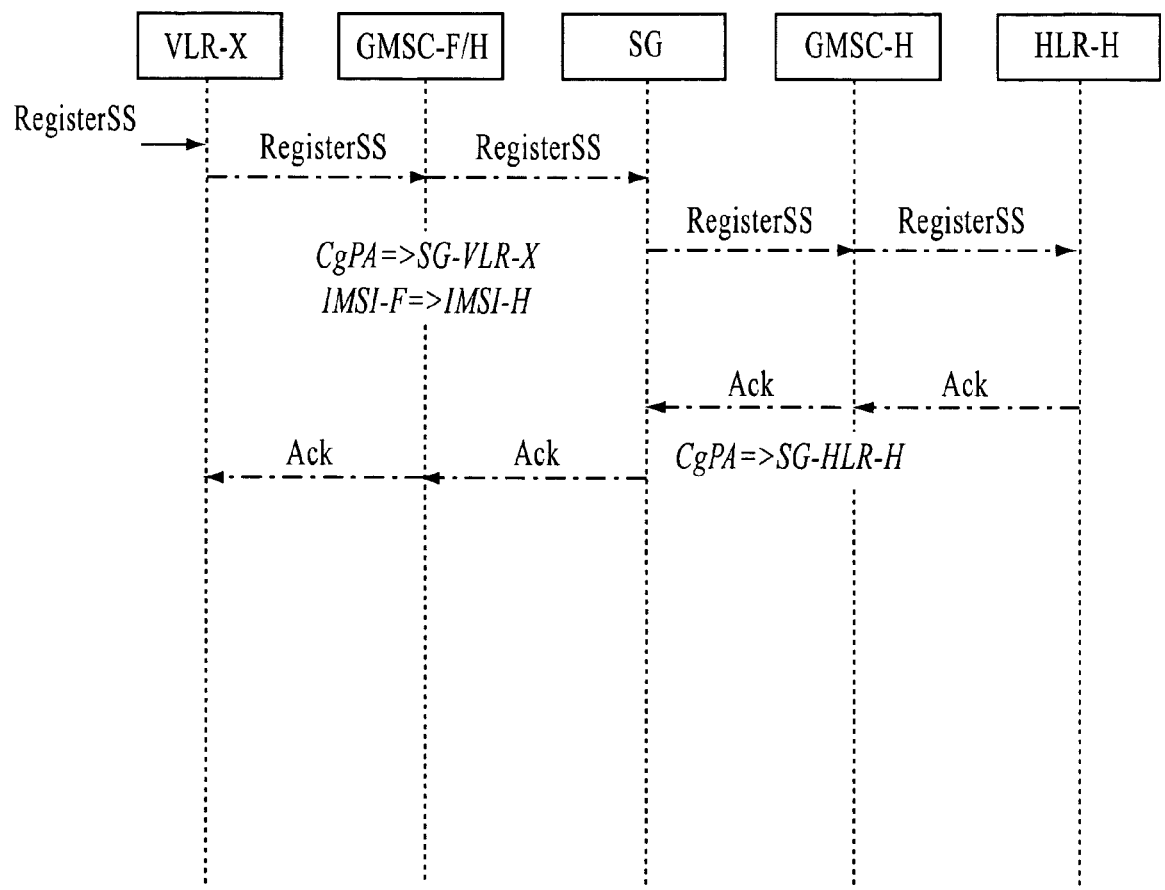
FIG. 56 shows a signal flow for an embodiment of: Send Authentication, USSD and supplementary MAP services on IMSI-F.

The signal trace is shown in FIG. 56.

TABLE 54

| MAP Service | Reference Type | Use of the Parameter |
|---|---|---|
| MAP-REGISTER-SS | IMSI | Subscriber identity |
| MAP-ERASE-SS | IMSI | Subscriber identity |
| MAP-ACTIVATE-SS | IMSI | Subscriber identity |
| MAP-DEACTIVATE-SS | IMSI | Subscriber identity |
| MAP-INTERROGATE SS | IMSI | Subscriber identity |
| MAP-REGISTER-PASSWORD | IMSI | Subscriber identity |
| MAP-PROCESS-UNSTRUCTURED-SS-REQUEST | IMSI | Subscriber identity |
| MAP-UNSTRUCTURED-SS-REQUEST | IMSI | Subscriber identity |
| MAP-UNSTRUCTURED-SS-NOTIFY | IMSI | Subscriber identity |
| MAP-FORWARD-SHORT-MESSAGE | IMSI (NOTE) | Subscriber identity |
| MAP-REGISTER-CC-ENTRY | IMSI | Subscriber identity |
| MAP-ERASE-CC-ENTRY | IMSI | Subscriber identity |

NOTE:
Only when the IMSI and the LMSI are received together from the HLR in the mobile terminated short message transfer Table 54 is a supplementary list. USSD MAP services from GSM9.02. MAP-Process-USSD request is the only request for which content may be modified where the optional MSISDN-F parameter in the MAP message from FPMN is changed to MSISDN-H when the message is going through the signal gateway. This is because MSISDN-H may be used to address subscriber data in gsmSCF if the USSD is further sent by HLR to gsmSCF for processing. This is illustrated in Table 55.

TABLE 55

| ProcesssUSSD from VLR-X to the signal gateway function via GMSC-F/H GTT | | Message from Signaling Gateway to HLR-H via GMSC-H | |
|---|---|---|---|
| SCCP Called Address: | | SCCP Called Address: | |
| GT: | SG-HLR-H | GT: | HLR-H |
| SSN: | 6 | SSN: | 6 |
| TT: | 0 | TT: | 0 |
| SCCP Calling Address: | | SCCP Calling Address: | |
| GT: | VLR-X | GT: | SG-VLR-X |
| SSN: | 7 | SSN: | 7 |
| TT: | 0 | TT: | 0 |
| MAP level parameters: | | MAP level parameters: | |
| IMSI: | IMSI-F | IMSI: | IMSI-H |
| MSISDN: | MSISDN-F | MSISDN: | MSISDN-H |

Figure 57:
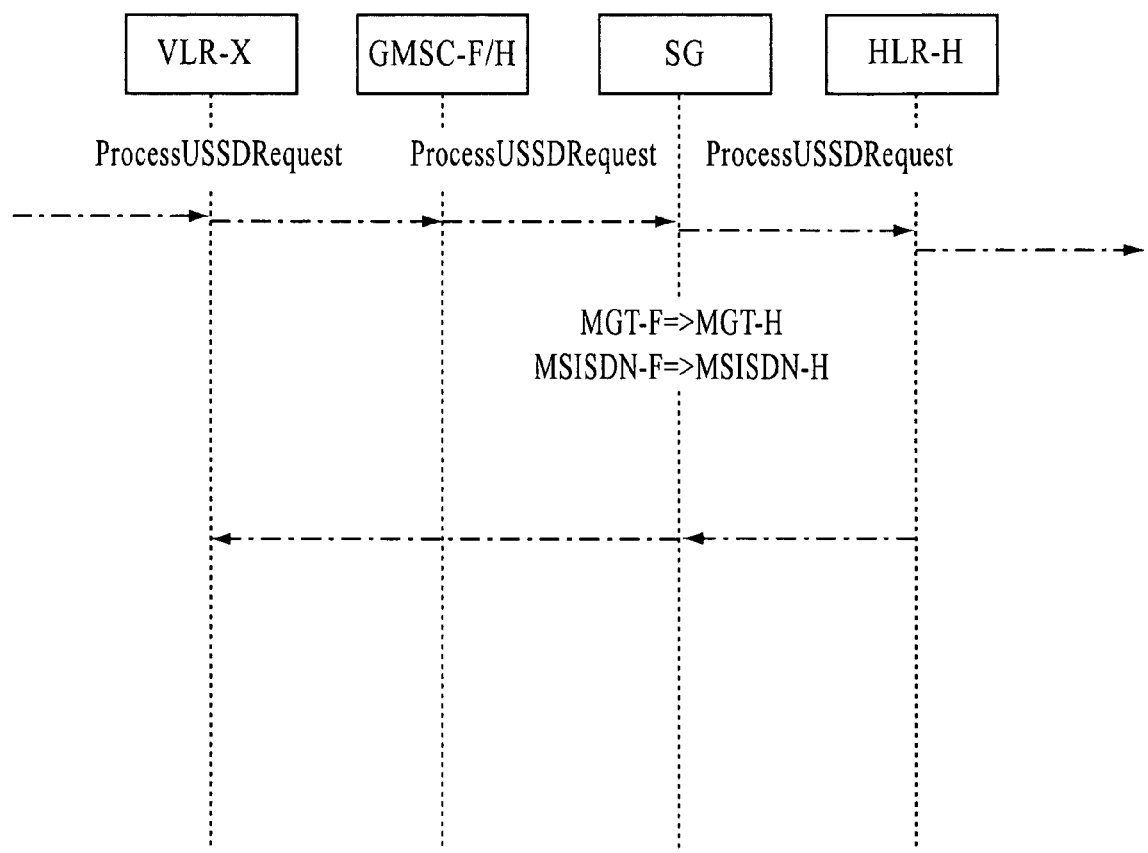
FIG. 57 shows a further signal flow for an embodiment of: Send Authentication, USSD and supplementary MAP services on IMSI-F.

A Signal Flow Diagram for this scenario is shown in FIG. 57.

Similarly, when a network-initiated USSD (e.g. USSDRequest, USSDNotify) is sent by the HLR directly towards a signal gateway which is treated as the VLR of the MIMM subscriber when the subscriber registers at XPMN with IMSI-F, the signal gateway will not only modify the CdPA from the signal gateway to the real VLR-X but also the CgPA to the signal gateway in a new transaction. The response from VLR-X to the signal gateway will be relayed by the signal gateway back to the HLR-H. This is shown in Table 56.

TABLE 56

| USSDRequest from HLR-H to the signal gateway function | | Message from Signaling Gateway to VLR-X | |
|---|---|---|---|
| SCCP Called Address: | | SCCP Called Address: | |
| GT: | SG-VLR-X | GT: | VLR-X |
| SSN: | 7 | SSN: | 6 |
| TT: | 0 | TT: | 0 |
| SCCP Calling Address: | | SCCP Calling Address: | |
| GT: | HLR-H | GT: | SG-HLR-H |
| SSN: | 6 | SSN: | 7 |
| TT: | 0 | TT: | 0 |
| Map-level-parameters: | | Map-level-parameters: | |
| IMSI: | IMSI-H | IMSI: | IMSI-F |

Figure 58:
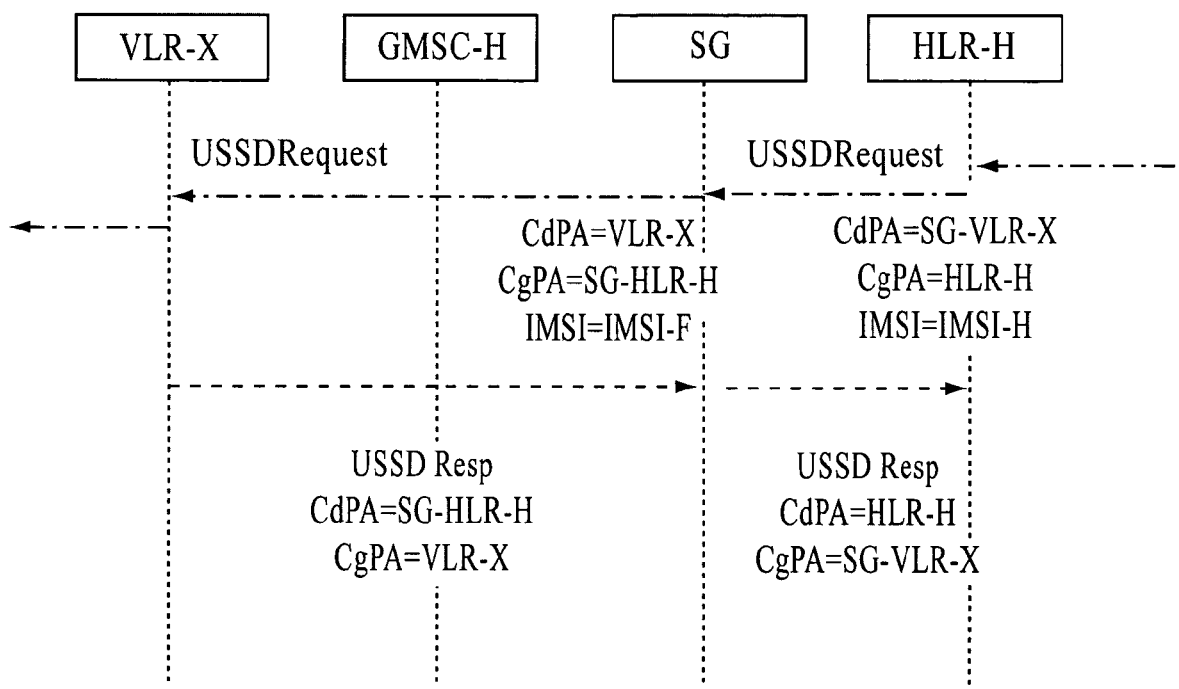
FIG. 58 shows a further signal flow for an embodiment of: Send Authentication, USSD and supplementary MAP services on IMSI-F.

FIG. 58 is a Signal Flow Diagram for this scenario.

CSD/FAX

Since the IMSI is still a HPMN IMSI and no CSD/Fax related numbers got changed, these services will be same as a normal subscriber for MIMM subscribers.

MMS, IN/Camel and 3 G on IMSI-F Registration

These services are same as normal when IMSI-H is registered with an operator. Here we are only concerned with these services when IMSI-F is registered with an operator. This is outside the scope of this document and is mentioned here purely for discussion purpose.

For MMS, MMS roaming is essentially the same as GPRS roaming. It will in general require MMS data session to be relayed through the signal gateway to reach the HPMN network. However MMS interworking will introduce further complicacies.

For IN/Camel, during registration exchange on Camel triggers, different HPMN gsmSCF address will be dynamically mapped to different FPMN GTs allocated from a pool of special FPMN GTs. All the Camel/IN signaling requests and instructions will be proxied by the signal gateway. It is not anticipated to have any problem here.

For the SS7 part of 3 G, additional parameters will require further changes.

Logging and Reports

The system has logging function in real-time on SS7 transaction history, roamer history, provisioning transactions etc. Each can be turned on/off based on configuration options.

The system will generate the following reports:
a) List of IMSI, MSISDN-H to MSISDN-F mapping and other subscriber data per FPMN configured in system
b) Number of SS7 messages handled with details on individual message statistics (number of Update Location, Insert Subscriber Data, SRI, SRI-SM etc per FPMN)
c) Roamer statistics at FPMN such as average number of roamers in FPMN (can be divided down to provincial networks) at any time, average number of #FTN assigned at any time, average # of calls made and received through the signal gateway per subscriber, etc
d) Traffic report such as Call traffic and signaling message traffic
e) Current number of MAP transactions and ISUP calls. Total number of these transactions in a hour
f) Unsuccessful calls are also logged with reason of failure. The failure may be due to MAP signaling (e.g. error message is returned when SRI is sent to HLR) or ISUP (e.g. congestion, MIMM subscriber does not answer etc).

The reports can be conducted daily, weekly and monthly. Customized reports can be built based on customer requirements.

For generating monthly report, Roamware will process the daily log files rather than holding the 1-month data in the DB. Each daily statistics will be saved to calculate monthly statistics.

Transactional history data (such as MAP/IUSP transactions, roamer history information) will be logged in separate disk drive from CDR data to improve drive-write performance even though both sets of data could be mirrored in each other's drive.

SRI and SRI-SM logs will be in both transaction history data and in CDR data. When they are in CDR data, they use CDR format although a different call-type from the other call types (ROAM, FORW, SMS-MT etc). They will also have a separate DB table from other call types CDR.

There will also a configuration option ON/OFF to control whether ISUP/SMS unsuccessful calls are logged or not in the CDR data. However all transaction data will be logged separately in the transaction history data.

Transaction logging based on transaction type (e.g. Send-Parameters no need to log, Location update yes, ISUP yes, SRI logging only OR-routed, provisioning transactions, maintenance transactions etc) can also be turned on/off based on switch options.

OAMP (Operation, Administration, Maintenance and Provisioning), Access Control and Overloading The system supports provisioning interface (including browser and HTTP API, text file, XML file, stored procedures for DB etc) where the administrator can configure System configuration, Global Titles, Participating PMN based configuration, different pools of #s, OR-allow tables etc. Mapping between MSISDN-H and MSISDN-F will also be maintained using this interface. It will also be possible to define network capabilities and specify the various FPMN that are participating in this service deployment. If the subscriber opts-out of the service, they should surrender their SIM cards even though they will be able to keep the same HPMN MSISDN (where number portability applies). The FPMN MSISDN will be quarantined—suggestion is to quarantine it for one month instead of normal three months.

The signal gateway provides a web interface for administrator to define user groups and their associated rights on different operators of the signal gateway configurations. Only administrators will be allowed to access directly the signal gateway function via a unix system console.

Signaling Gateway publishes SNMP v1 traps in case of critical failures or warnings. The MIB also supports set and get SNMP methods to retrieve and set run-time information. System can be shutdown remotely, if required.

The system monitors the critical processes of the system. If any process fails, the process is automatically re-spawned or the system switches over to another node (if it is running in active-standby mode). Each node is dimensioned to support the total load although only 40% will only be used in normal mode. In case of switchover, the new node can take over the total load. There is a means to display the active-standby status of the system components.

There are also means to display the status of different physical interfaces. The interfaces cover the system signaling links for sending and receiving SS7 message, the ISUP loopback signaling and the external database. In case of major breakdown of these interfaces, there will be alert to the maintenance staff. If any in-service signaling links is down, there should be minor alarm. If all of them are down, there should be Critical alarm. The signaling links carry both MAP and ISUP messages. If the database connection fails (e.g. due to LAN failure, database shutdown), the system is able to re-establish the database connection when the database is up. Alarm will be generated to indicate DB connection is down.

There are also other performance and capacity related indications such as CPU, memory, MAP transaction rate, BHCA and SS7 loading etc.

Any call duration longer than a configurable timer, (e.g. 1 hour) will be specially handled. It can be continued with an alarm flag or released depending on a control flag.

The system can be integrated with HP-OpenView environment.

Provisioning and maintenance transactions can also be logged via ON/OFF switch.

The signal gateway function also tracks the transaction loading of the system. Alarm will be generated when memory, CPU, and transaction rate exceeding certain threshold, say 80%. In this case, the signal gateway can choose to reject certain type of SS7 messages, e.g. SMS so that the sending SMSC can queue it at its end. The signal gateway can also reject messages based on FPMN. The signal gateway can also choose to relay for new LUP messages so the MIMM subscribers can be handled as normal roamers as if the signal gateway function failed. This relay can be applied based on FPMN too in time of system overloading.

Call Detail Record

CDR are generated for ISUP calls, SMS and their associated MAP transactions. They are stored in the database after each call. For long duration calls, periodical update of CDR in DB also takes place. Duplicated and missing CDR are safe-guarded by a sequence number. Long records will share the same sequence number but using additional intermediate sequence numbers to relate them.

CDR records are converted to files of any switch (e.g. Nokia) format based on the ASN.1 format of the switch CDR. Transmission of CDR files to external systems can be physically delivered or via FTP.

A separate billing related document will be prepared in the customization process with CSL. Here is just a summary. Key information elements captured in the call detail record include the elements listed in Table 57.

TABLE 57

| Information Element | Information Element |
| --- | --- |
| Call Type | Signaling Gateway ID |
| Start Date [DD MM YY] | Start Time [HH MM SS] |
| Call Setup Duration [HH MM SS] | Effective Call Duration [HH MM SS] |
| Incoming Group/Trunk Id | Outgoing group/Trunk Id |
| Calling Party Details | Called Party Details |
| Backward Call Indicator | Forward Call Indicator |
| Call Reference | Additional Called Party Details |
| Call End Reason | IMSI-X |
| MSISDN-F | MSISDN-H |
| Originating SRI-issuing MSC | Terminating VLR |
| MSRN | #MSRN |
| FTN | #FTN |
| Original called party number | Original calling party number |
| SMSC | Message length |
| Terminating VMSC | Call Forwarding Reason |
| Intermediate Sequence # | Sequence number |
| Delivery time | etc |

The call type will indicate different CDR type, such as Roaming call, forwarding call, SRI, SRI-SM. Only MTC (call or SMS including call forwarding, call transfer, call re-routing due to roaming) types of records are generated. MO records (call or SMS), SUPS (supplementary services) and USSD service records are not the responsibilities of the Signaling Gateway function.

The original called party number will indicate whether MSISDN-F or MSIDN-H was originally called or SMSed. The originating SRI-issuing MSC will indicate which network GMSC issued the SRI query so to determine where the call originates from FPMN or HPMN. The additional called party details are those captured in the IAM messages. The forwarding indicators might contain charge indicators.

The FTN and Call Forwarding Reason fields will indicate whether call forwarding/transfer has taken place or not and whether it is early/unconditional/transfer call forwarding or late call forwarding. The SRI event can be configured to log on only cases where optimal routing has been applied.

All MAP transactions and ISUP transactions can also be logged. All call/sms records can also be generated for unsuccessful cases as well as successful ones depending on configuration options.

The CDR will be customized based on HPMN mediation system requirements. The Signaling Gateway CDRs might need to be mapped to the different call types (e.g. FORW for forwarding, ROAM for roaming, MO, transit, MO-SMS, LOCA for location update, HLRI for locating subscriber etc) of the HPMN CDR types (e.g. Nokia CDR). Other HPMN CDR specific parameters (e.g. tariff class, charging zone, charging type, call type etc) might also need be deduced from the Signaling Gateway CDRs. There will also be many fields that the signal gateway will not know such as IMEI, Cell ID, Location Area, IN and Camel related etc. These will be filled with blanks when converting to the HPMN specific CDRs.

Support for Optimal Routing

It is possible to add Optimal Routing Support for voice routing when the Calling and Called party/the forward-to party are in the same country. An example case is when both the calling party and called party in the same FPMN network.

There are several cases of optimal routing which will be described below.

Figure 59:
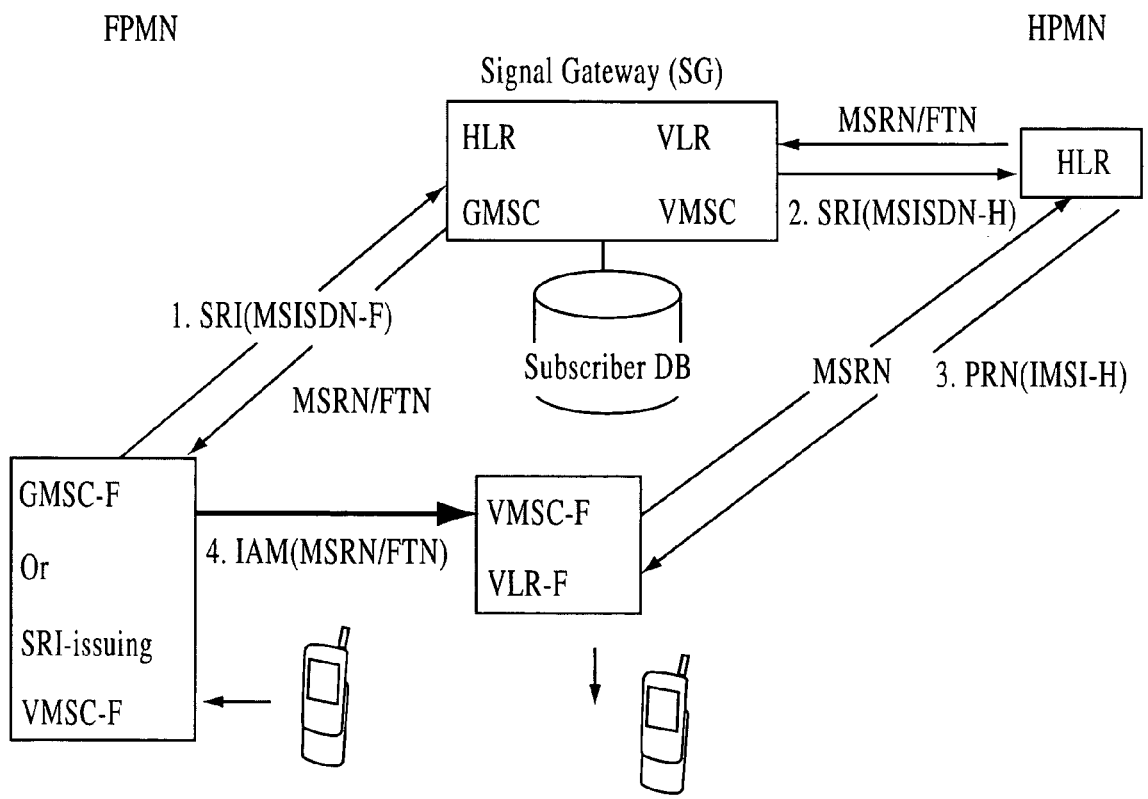
FIG. 59 is a block diagram of an embodiment in which optimal routing occurs when a FPMN network user (local or roamer) calls MSISDN-F of a MIMM subscriber when the subscriber is also on FPMN network.

One case of optimal routing occurs when a FPMN network user (local or roamer) calls MSISDN-F of a MIMM subscriber when the subscriber is on FPMN network too. This is illustrated in FIG. 59.

In this case, the signal gateway function addresses the optimal routing on MSRN and ECF/CFU forward-to number by maintaining a table of OR-allowed records (as shown in Table 58) each of which contains a MSISDN-F number, a GMSC-F or SRI-issuing VMSC-F number, and a destination number which can be MSRN, FTN, VMSC numbers. The value of each field can just be a range or a prefix. If the call on MSISDN-F is to be routed from the GMSC-F/VMSC-F to a MSRN/FTN that is satisfied by a record in the FPMN-OR-allowed table, then the call can be optimally routed. If the call is OR routable, then the signal gateway function will return the MSRN/FTN directly to the SRI-issuing VMSC-F/GMSC-F. The Signaling Gateway will not be able to generate a duration CDR in both cases although the MAP transaction record is generated.

TABLE 58

| FPMN-OR-allowed | | |
|---|---|---|
| MSISDN-F | SRI-issuing MSC-F | Destination # |

Note that the table can allow an OR call for a MIMM subscriber in one part of FPMN network and disallow an OR call in another part when MSISDN-F is called even though the caller is on the same FPMN switch in both cases. For example, a MIMM subscriber with a Beijing Mobile number is registered in Beijing network. A call originated from a Beijing network could be optimally routed to the subscriber because the OR-allowed table allows such a case. While the same MIMM subscriber with a Beijing Mobile number later registered in Shanghai network. A call originated from a Beijing network might not be optimally routed to the subscriber since the OR-allowed table does not have a supporting record.

Figure 60:
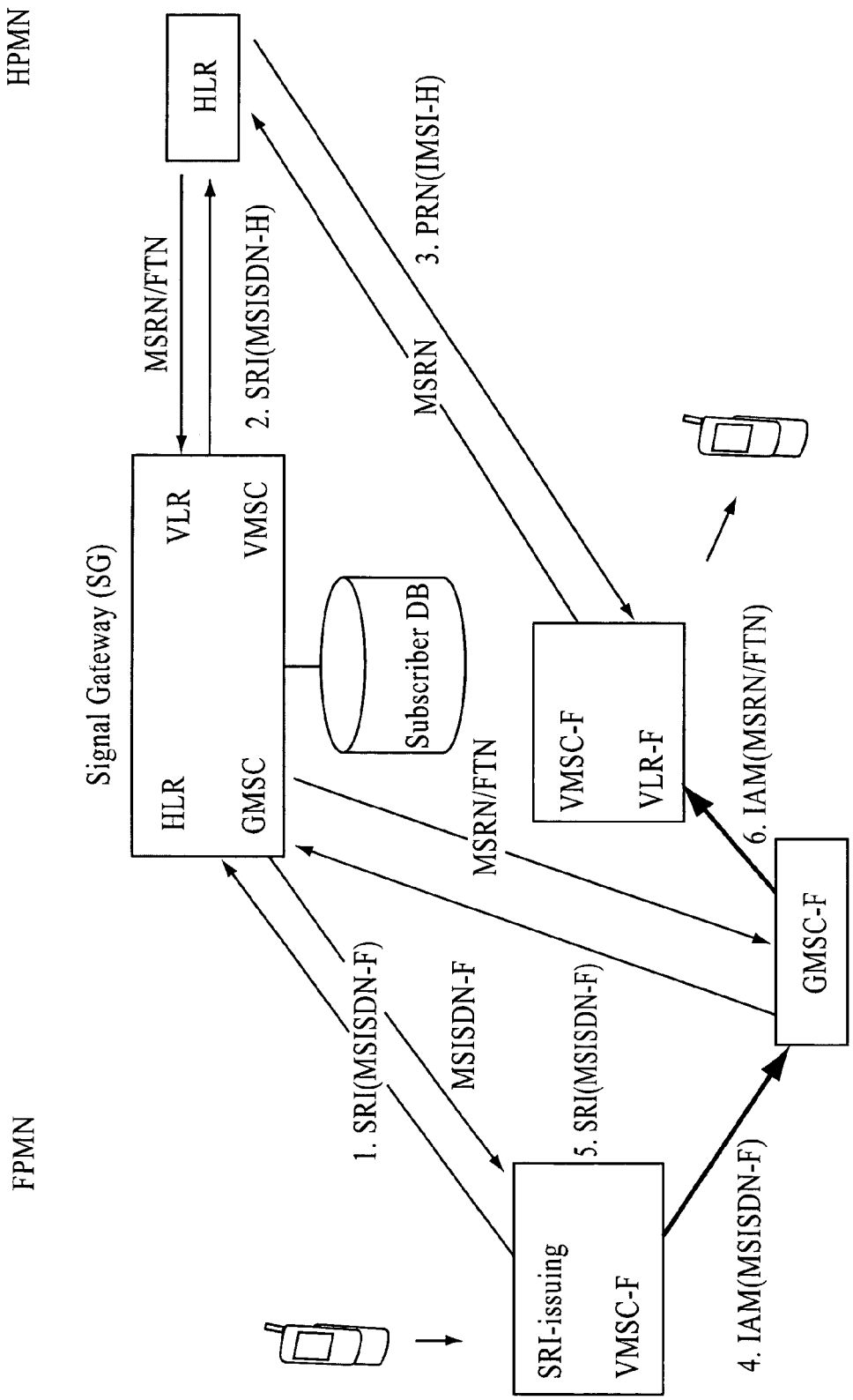
FIG. 60 is a block diagram of an embodiment in which the SRI-issuing MSC on MSISDN-F is not allowed for optimal routing to a VMSC-F/MSRN but the GMSC-F for MSISDN-F is allowed for optimal routing.

As illustrated in FIG. 60, it is also possible that the SRI-issuing MSC on MSISDN-F is not allowed for optimal routing to a VMSC-F/MSRN but the GMSC-F for MSISDN-F is allowed for optimal routing. In this case, the signal gateway can return the original MSISDN back to the SRI-issuing MSC which can then route the call nationally to GMSC-F which can then issue SRI on MSISDN-F to the signal gateway function. The signal gateway function can then obtain MSRN/FTN and return it directly to the GMSC-F which can then optimally route the call to the destination MSRN or FTN.

For example, when a Beijing Mobile caller calls the MIMM subscriber's GMCC number when the caller is in Beijing and the subscriber is registered at Guang Dong, even though a direct optimal routing is not allowed, it is possible to route the call to Guang Dong first. Afterwards, GMSC-F at GMCC can route the call to the VMSC-F at Beijing rather than routing the call through GMSC-H with loopback signaling through the signal gateway.

Figure 61:
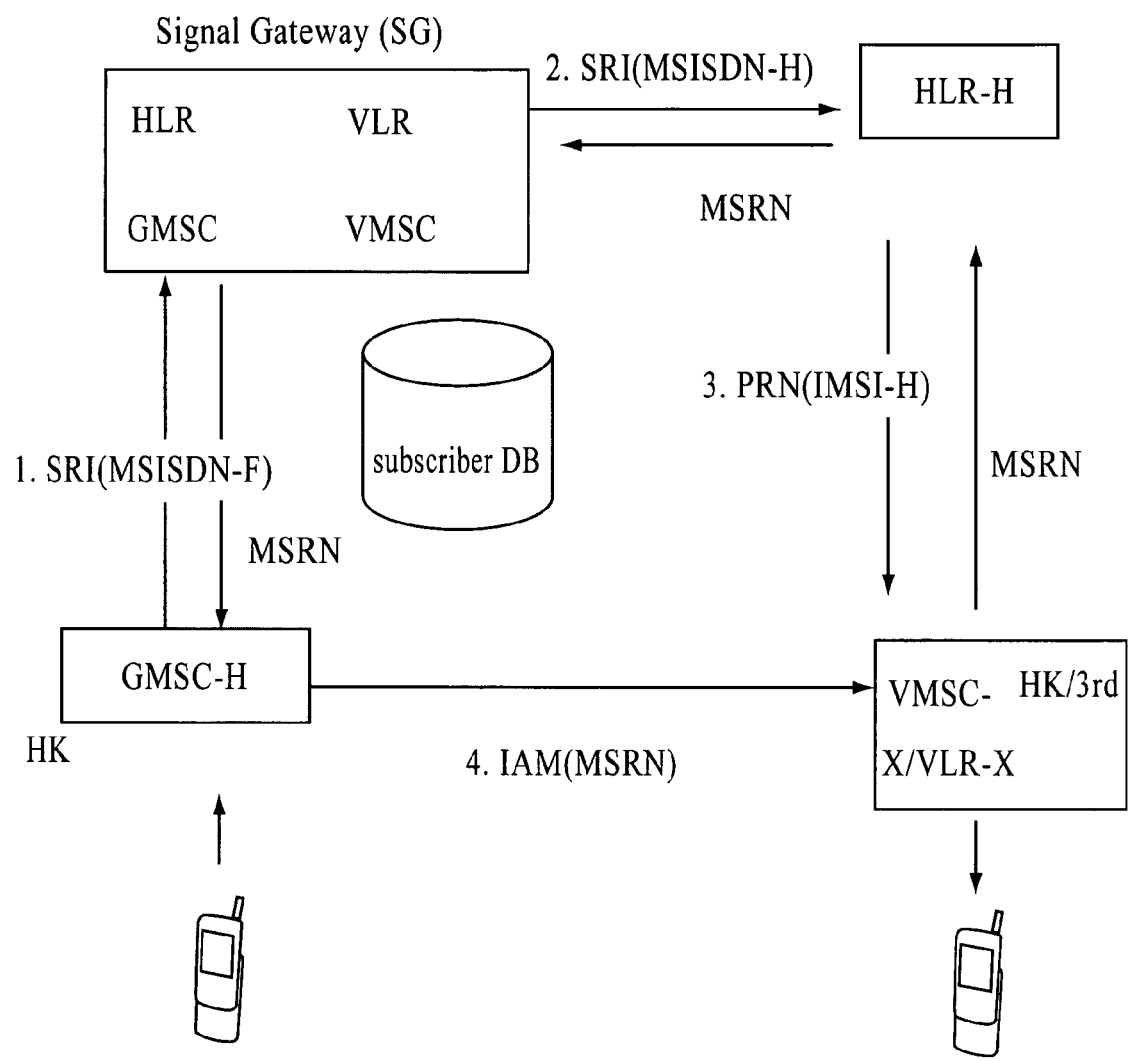
FIG. 61 is a block diagram of an embodiment in which optimal routing occurs when a HPMN network user (local or roamer) calls MSISDN-F of a MIMM subscriber when the subscriber is also on HPMN network.

Another case of optimal routing occurs when a HPMN network user (local or roamer) calls MSISDN-F of a MIMM subscriber when the subscriber is on HPMN network too. This is illustrated in FIG. 61.

In this case, GMSC-H is configured to issue SRI-query on the MSISDN-F to the signal gateway. The signal gateway function maintains a list of MSISDN-Fs that are allowed (e.g. may be offered as a subscription) to OR route the call for the case.

Figure 62:
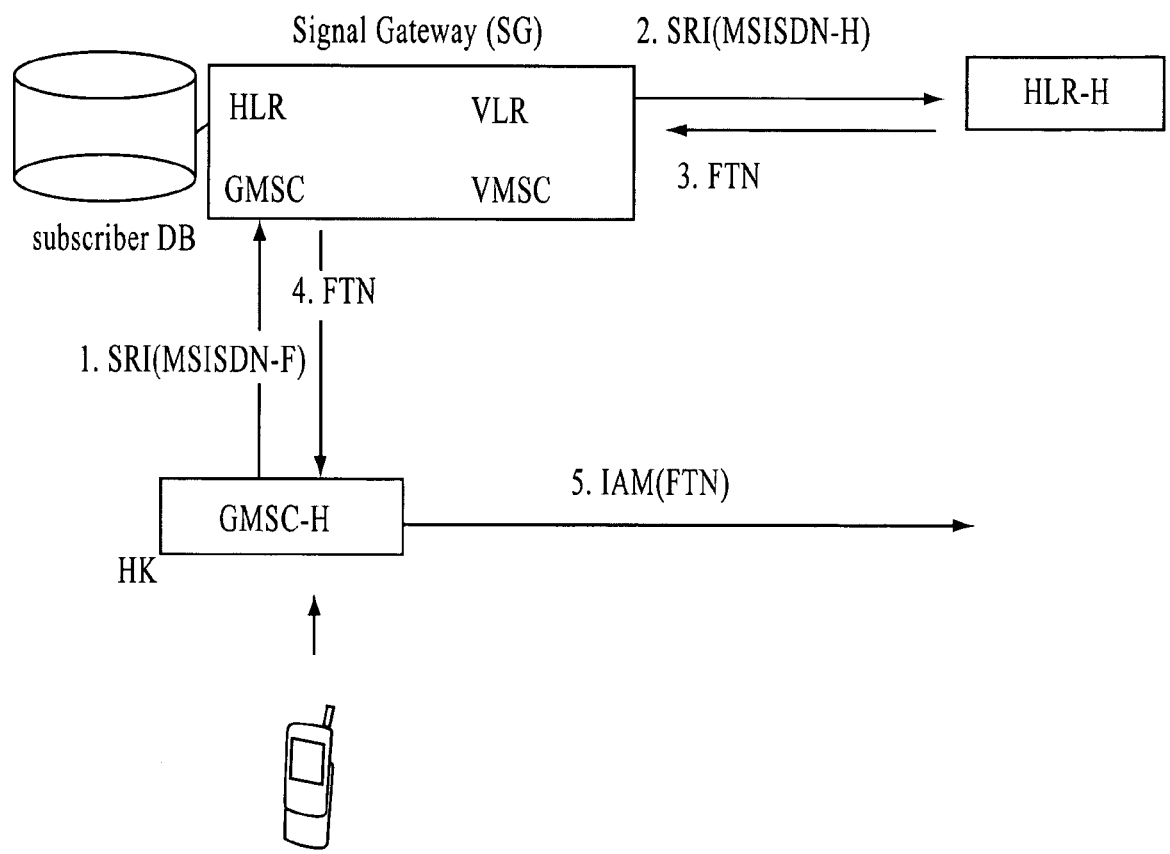
FIG. 62 is a block diagram of an embodiment in which an SRI query is received at a Signal Gateway, and the Signal Gateway checks if the SRI-issuing GT is a HPMN GT.

When a SRI query is received at a signal gateway, as shown in FIG. 62, the gateway checks if the SRI-issuing GT is a HPMN GT; if it is, it checks the MSISDN-F in the query against the HPMN-OR-allowed table. If there is a match, the real MSRN/FTN (after finding it) is returned; otherwise the original MSISDN-F is returned.

Note that the MIMM subscribers can get OR calls from either a local or a roamer in HPMN. The MIMM receiving party might be charged a subscription fee or a markup for reduced phone rate due to optimal routing.

While the signal gateway will have a SRI query record, the Signaling Gateway will not be able to generate the CDR. However this service can either be offered as a subscription service or a one time fixed charge, then the SRI query record will be sufficient. The MTC record for the MIMM subscriber that received such an OR-routed call will be as if his/her HPMN number had been called.

TABLE 59

| HPMN-OR-allowed |
|---|
| MSISDN-F |

The simple HPMN-OR-allowed table (Table 59 above) can be further extended to cover more fine-grained cases where destination # can be FTN, MSRN, VMSC/VLR # ranges, as shown in Table 60.

TABLE 60

| HPMN-OR-allowed | | |
|---|---|---|
| MSISDN-F | SRI-issuing MSC-H | Destination # |

Figure 63:
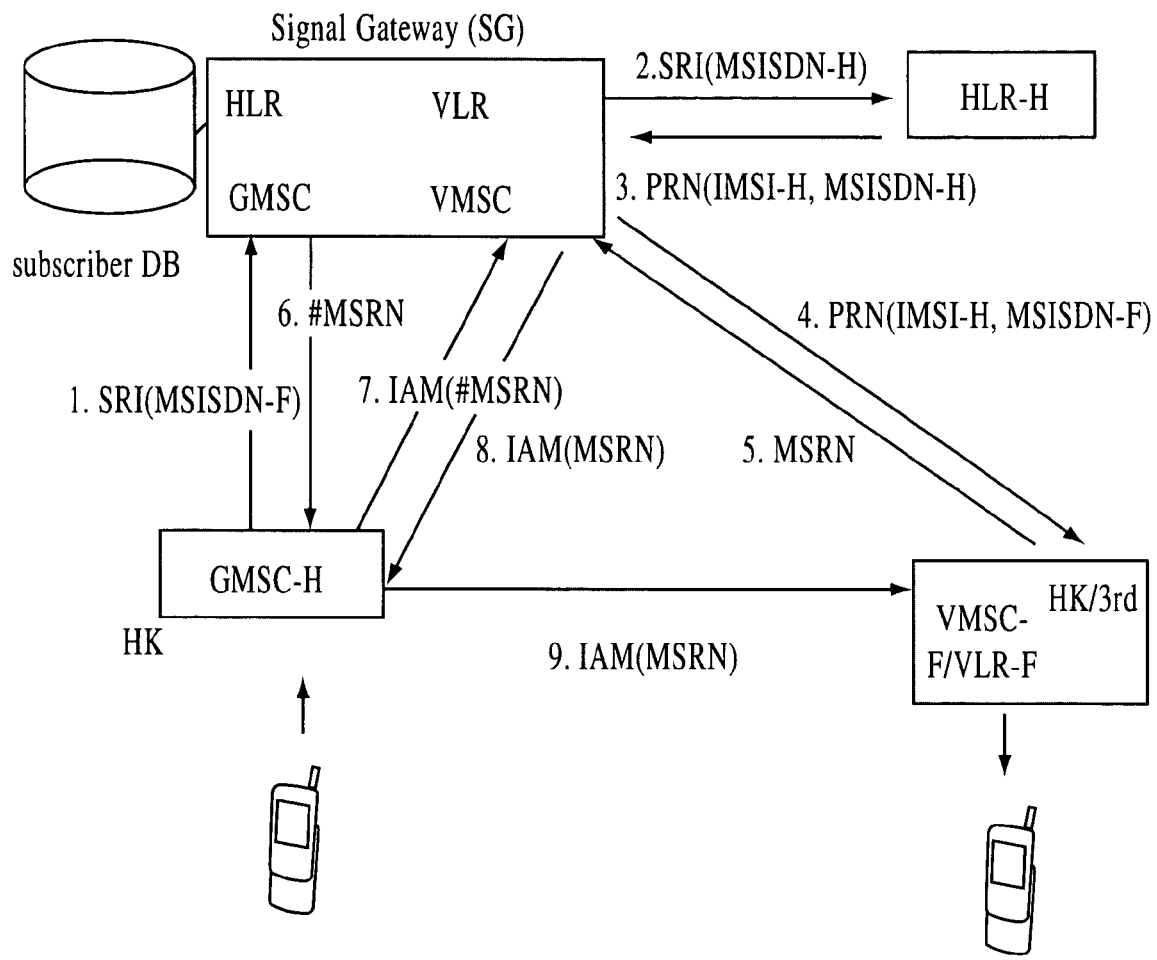
FIG. 63 is a block diagram of an embodiment in which a HPMN-OR-allowed table is extended.

However if destination # is FPMN, ISUP loopback will be used as if the subscriber's MSISDN-H is called when the subscriber is registered at FPMN even OR is allowed. This is illustrated in FIG. 63.

Figure 64:
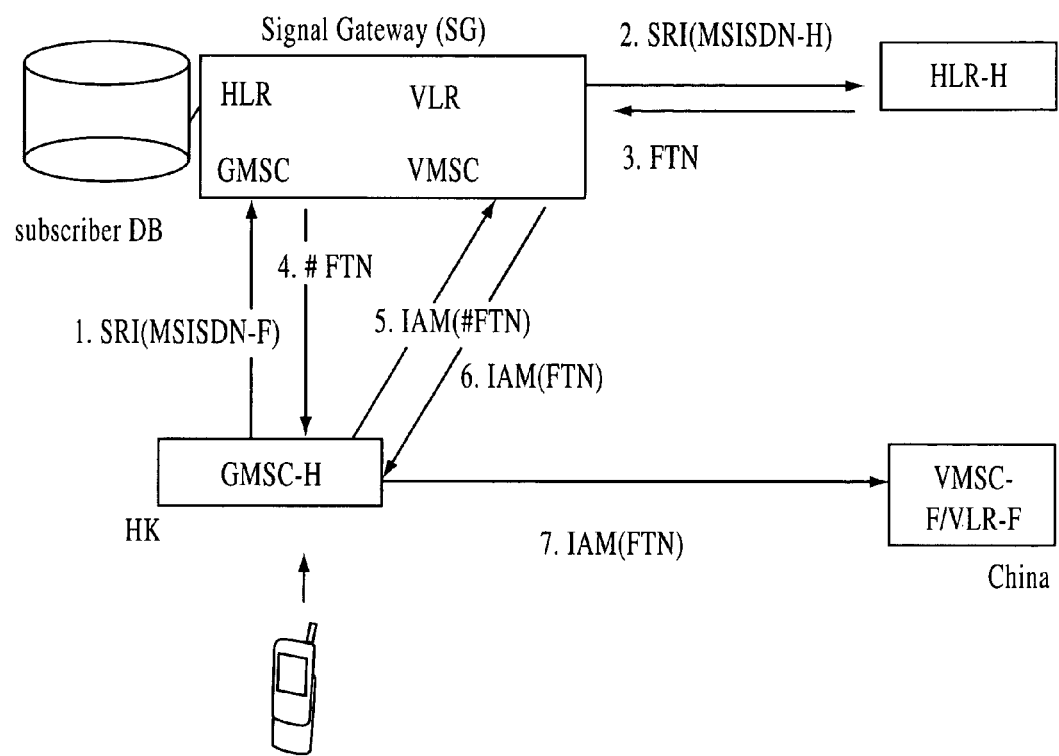
FIG. 64 is a block diagram of an embodiment in which CFU/ECF forwarding is optimally addressed when the FTN is a FP

Similar CFU/ECF forwarding can also be optimally addressed when the FTN is a FPMN number. The signal gateway produces CDR similar to the case as if the subscriber's MSISDN-H is called when the subscriber is registered at FPMN except that the CDR indicates it is the MSISDN-F that is originally called. In this way, HPMN can choose to charge a mark-up if so desired. This is illustrated in FIG. 64.

Exceptional Case: IMSI-F/MSISDN-H/F not Found in DB

If there is a Location Update/processUSSD request/SS related messages (routed by MGT-F) received by the SG but the IMSI data is not found in the DB. This may happen when the subscriber de-subscribes the MIMM service but refuses to go to the operator shop to replace the SIM card. There will be a configuration option for HPMN to select one of the two following actions:

SG to reject the request; or

SG passes the message to the HLR by just modifying the SCCP called party address to HLR and keep the VLR-X as the SCCP calling party address. There is a table which maps the IMSI-F range to the corresponding HLR. If the IMSI-H does not match with, it can map to a default HLR.

In both actions, an error log will be generated. If the whole SG function goes down, a MIMM subscriber will no longer have special services, but only normal services from IMSI-H.

Various embodiments of a Signaling Gateway method and apparatus including a MIMM service have been described. Details of particular embodiments are given for illustrative purposes, and are not meant to limit the scope of the invention.

The above description of illustrated embodiments of the Signaling Gateway method and apparatus including a MIMM service is not intended to be exhaustive or to limit the invention to the precise form disclosed. While specific embodiments of, and examples for, the Signaling Gateway method and apparatus including a MIMM service are described herein for illustrative purposes, various equivalent modifications are possible within the scope of the invention, as those skilled in the relevant art will recognize. The teachings of the Signaling Gateway with a MIM service provided herein can be applied to other communications systems and networks, not only for those communications systems and networks described above.

The elements and acts of the various embodiments described above can be combined to provide further embodiments. These and other changes can be made to the embodiments described in light of the above detailed description.

For example, the foregoing description of particular embodiments of a Signaling Gateway method and apparatus including a MIMM service is applicable to embodiments of a Multiple IMSI Single MSISDN (MISM) service in a single SIM for multiple roaming partners. In the case of the latter (MISM) service, only HPMN MSISDN (MSISDN-H) is used in all the call and signal flows where MSISDN-F is mentioned. Like MIMM for multiple roaming partners, the MISM service for multiple roaming partners also involves HPMN IMSI (IMSI-H) and FPMN IMSIs (IMSI-F) in a single SIM. However when IMSI-F is registered with a network, instead of MSISDN-F being sent to the network, only MSISDN-H is sent to the network.

The MISM service for multiple roaming partners extends the roaming coverage by pooling the roaming relationships of partner networks. This can be limited to national roaming only, or per country per network. The MISM service for multiple roaming partners provides a local IMSI at the partner network. This option can be easily enabled or disabled based on operator requirements. However no matter where the MISM subscriber is, there is always a single phone number (i.e. MSISDN-H) associated with the subscriber.

A MISM family of solutions is built on top of a common Signaling Gateway which also supports Single IMSI Multiple MSISDN (SIMM) and Multiple IMSI Multiple MSISDN (MIMM) within the same operator or between different operators (across different countries) and within a single SIM or on multiple SIMs.

The MISM service for multiple roaming partners allows roamers to make cheaper local calls, while having a single HPMN number to receive calls and SMS.

Aspects of the communication system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communication system include: microcontrollers with memory (such as electronically erasable programmable read only memory (EEPROM)), embedded microprocessors, firmware, software, etc. Furthermore, aspects of the communication system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the communication system is not intended to be exhaustive or to limit the system to the precise form disclosed. While specific embodiments of, and examples for, the communication system are described herein for illustrative purposes, various equivalent modifications are possible within the scope of the communication system, as those skilled in the relevant art will recognize. The teachings of the communication system provided herein can be applied to other processing systems and communication systems, not only for the communication system described above.

The elements and acts of the various embodiments described above can be combined to provide further embodiments. These and other changes can be made to the communication system in light of the above detailed description.

In general, in the following claims, the terms used should not be construed to limit the communication system to the specific embodiments disclosed in the specification and the claims, but should be construed to include all processing and communication systems that operate under the claims to provide the communication system. Accordingly, the communication system is not limited by the disclosure, but instead the scope of the system is to be determined entirely by the claims.

What is claimed is:

1. A method for mobile communication in multiple mobile communications networks, the method comprising:
a Foreign Public Mobile Network (FPMN) allocating at least one local Mobile Subscriber Identity (IMSI) to a Home Public Mobile Network (HPMN) for the use of subscribers of a multiple IMSI multiple Mobile Subscriber Integrated Services Digital Network number (MSISDN) service (MIMM) of the HPMN when roaming outside of the HPMN, wherein the FPMN is a partner network of the HPMN, and wherein the FPMN allocates a designated range of local IMSIs to the HPMN for the HPMN to provision to its MIMM subscribers; and when a MIMM subscriber roams outside of the HPMN,
the HPMN performing registration of one of the FPMN local IMSIs at the HPMN, such that a MIMM subscriber device appears as a roaming device in the FPMN, even though the FPMN local IMSI is used; and the HPMN performing authentication of the FPMN local IMSI at the HPMN using a HPMN Ki, such that the MIMM subscriber device appears as a roaming device in the FPMN, even though the FPMN local IMSI is used.

2. The method of claim 1, further comprising the MIMM subscriber choosing one of the at least one FPMN local IMSIs to use when roaming outside of the HPMN, wherein the chosen IMSI is not local to a network in which the MIMM subscriber is roaming, wherein the FPMN of the selected IMSI has a roaming relationship with the network and has a relatively inexpensive roaming rate with the network.

3. The method of claim 1, wherein performing registration further comprises using an IMSI allocated by the partner FPMN to register the MIMM subscriber device in a Visited Public Mobile Network visited (VPMN) that is not a FPMN partner network of the HPMN.

4. The method of claim 1, further comprising adding local IMSIs and local MSISDNs to a SIM of the MIMM subscriber device via an over-the-air (OTA) interface.

5. The method of claim 1, further comprising determining whether a new IMSI is needed when the location of the MIMM subscriber device changes.

6. The method of claim 1, wherein all calls to and from the MIMM subscriber device, regardless of a location of the MIMM subscriber device, are routed through a signaling gateway that functions as a virtual HLR, a virtual visited location register (VLR), a virtual gateway mobile switching center (GMSQ), a virtual short message service center (SMSQ), and a virtual service node.

7. The method of claim 1, further comprising storing roaming information about the MINIM subscriber at a FPMN.

8. The method of claim 1, further comprising routing signaling on any calls to or from the MINIM subscriber device, regardless of which of multiple MSISDNs assigned to the MIMM subscriber is called, through the HPMN regardless of the location of the MIMM subscriber device, wherein the physical routing of the call is optimized between the network that has the associated MIMM subscriber MSISDN that is called, and the network where the MIMM subscriber device is located, and wherein all IMSIs and all MSISDNs available to the MIMM subscriber device are active at all times.

9. The method of claim 1, further comprising routing any calls to or from the MIMM subscriber device through the HPMN regardless of the location of the device, and regardless of which of multiple MSISDNs assigned to the MIMM subscriber is called, and wherein all IMSIs and all MSISDNs available to the MIMM subscriber device are active at all times.

10. The method of claim 9, further comprising the HPMN maintaining a voicemail system such that calls to the MIMM subscriber device on an unlimited number of phone numbers associated with the MIMM subscriber device are routed to the voicemail system at all times.

11. The method of claim 9, further comprising the HPMN maintaining a short message service (SMS) system such that SMSs to the MIMM subscriber device on an unlimited number of phone numbers associated with the MIMM subscriber device are routed to the SMS system at all times.

12. The method of claim 1, further comprising the MIMM subscriber selecting an IMSI to use when roaming outside of the HPMN.

13. The method of claim 12, wherein the selected IMSI is an IMSI in the designated range of local IMSIs allocated to the HPMN, wherein the HPMN has provisioned the selected IMSI for the MIMM subscriber to use when roaming.

14. The method of claim 13, wherein the selected IMSI is registered at a Visited Public Mobile Network (VPMN), which is not a FPMN, and wherein the VPMN has a roaming relationship with the FPMN such that a more favorable roaming rate may be available with the use of the selected IMSI.

15. The method of claim 1, further comprising providing services to the 2 MIMM subscriber in an identical manner whether or not the user is roaming, wherein the services comprise a general packet radio service (GPRS), an unstructured supplementary service data (USSD) service, and a short message service (SMS) service.

16. The method of claim 15, further comprising routing USSD messages to a signaling gateway, wherein the signaling gateway acts as a home location register (HLR) of a local IMSI.

17. The method of claim 16, further comprising:
modifying the USSD messages as necessary; and
relaying the USSD messages from the signaling gateway to a "real" HLR, wherein a "real" HLR is a HLR of the HPMN.

18. A computer-readable medium having instruction stored thereon which, when executed in a mobile communication system, cause a method to be performed in the system, the method comprising:
a Foreign Public Mobile Network (FPMN) allocating at least one local Mobile Subscriber Identity (IMSI) to a Home Public Mobile Network (HPMN) for the use of subscribers of a multiple IMSI multiple Mobile Subscriber Integrated Services Digital Network number (MSISDN) service (MIMM) of the HPMN when roaming outside of the HPMN, wherein the FPMN is a partner network of the HPMN, and wherein the FPMN allocates a designated range of local IMSIs to the HPMN for the HPMN to provision to its MIMM subscribers; and
when a MIMM subscriber roams outside of the HPMN,
the HPMN performing registration of one of the FPMN local IMSIs at the HPMN, such that a MIMM subscriber device appears as a roaming device in the FPMN, even though the FPMN local IMSI is used; and the HPMN performing authentication of the FPMN local IMSI at the HPMN using a HPMN Ki, such that the MIMM subscriber device appears as a roaming device in the FPMN, even though the FPMN local IMSI is used.

19. The medium of claim 18, further comprising the MIMM subscriber choosing one of the at least one FPMN local IMSIs to use when roaming outside of the HPMN, wherein the chosen IMSI is not local to a network in which the MIMM subscriber is roaming, wherein the FPMN of the selected IMSI has a roaming relationship with the network and has a relatively inexpensive roaming rate with the network.

20. The medium of claim 18, wherein performing registration further comprises using an IMSI allocated by the partner FPMN to register the MIMM subscriber device in a Visited Public Mobile Network visited (VPMN) that is not a FPMN partner network of the HPMN.

21. The medium of claim 18, further comprising adding local IMSIs and local MSISDNs to a SIM of the MIMM subscriber device via an over-the-air (OTA) interface.

22. The medium of claim 18, further comprising determining whether a new IMSI is needed when the location of the MIMM subscriber device changes.

23. The medium of claim 18, wherein all calls to and from the MIMM subscriber device, regardless of a location of the MIMM subscriber device, are routed through a signaling gateway that functions as a virtual HLR, a virtual visited location register (VLR), a virtual gateway mobile switching center (GMSC), a virtual short message service center (SMSC), and a virtual service node.

24. The medium of claim 18, further comprising storing roaming information about the MIMM subscriber at a FPMN.

25. The medium of claim 18, further comprising routing signaling on any calls to or from the MINIM subscriber device, regardless of which of multiple MSISDNs assigned to the MINIM subscriber is called, through the HPMN regardless of the location of the MINIM subscriber device, wherein the physical routing of the call is optimized between the network that has the associated MINIM subscriber MSISDN that is called, and the network where the MINIM subscriber device is located, and wherein all IMSIs and all MSISDNs available to the MIMM subscriber device are active at all times.

26. The medium of claim 18, further comprising routing any calls to or from the MIMM subscriber device through the HPMN regardless of the location of the device, and regardless of which of multiple MSISDNs assigned to the MIMM subscriber is called, and wherein all IMSIs and all MSISDNs available to the MIMM subscriber device are active at all times.

27. The medium of claim 26, further comprising the HPMN maintaining a voicemail system such that calls to the MIMM subscriber device on an unlimited number of phone numbers associated with the MIMM subscriber device are routed to the voicemail system at all times.

28. The medium of claim 26, further comprising the HPMN maintaining a short message service (SMS) system such that SMSs to the MIMM subscriber device on an unlimited number of phone numbers associated with the MIMM subscriber device are routed to the SMS system at all times.

29. The medium of claim 18, further comprising the MIMM subscriber selecting an IMSI to use when roaming outside of the HPMN.

30. The medium of claim 29, wherein the selected IMSI is an IMSI in the designated range of local IMSIs allocated to the HPMN, wherein the HPMN has provisioned the selected IMSI for the MIMM subscriber to use when roaming.

31. The medium of claim 30, wherein the selected IMSI is registered at a Visited Public Mobile Network (VPMN), which is not a FPMN, and wherein the VPMN has a roaming relationship with the FPMN such that a more favorable roaming rate may be available with the use of the selected IMSI.

32. The medium of claim 18, further comprising providing services to the MIMM subscriber in an identical manner whether or not the user is roaming, wherein the services comprise a general packet radio service (GPRS), an unstructured supplementary service data (USSD) service, and a short message service (SMS) service.

33. The medium of claim 32, further comprising routing USSD messages to a signaling gateway, wherein the signaling gateway acts as a home location register (HLR) of a local IMSI.

34. The medium of claim 33, further comprising:
modifying the USSD messages as necessary; and
relaying the USSD messages from the signaling gateway to a "real" HLR, wherein a "real" HLR is a HLR of the HPMN.

* * * * *